United States Patent
Yahagi

(10) Patent No.: US 8,116,770 B2
(45) Date of Patent: Feb. 14, 2012

(54) MOBILE COMMUNICATIONS SYSTEM AND CONTROL METHOD THEREOF

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 1070 days.

(21) Appl. No.: 11/954,585

(22) Filed: Dec. 12, 2007

(65) Prior Publication Data

US 2008/0254799 A1    Oct. 16, 2008

(30) Foreign Application Priority Data

Dec. 18, 2006    (JP) .................................. 2006-339939

(51) Int. Cl.
    *H04W 36/00* (2009.01)
(52) U.S. Cl. ........ 455/436; 370/331; 370/332; 370/333; 370/334; 455/437; 455/438; 455/439; 455/440; 455/441; 455/442; 455/443; 455/444
(58) Field of Classification Search .......... 370/331–334; 455/436–444
    See application file for complete search history.

(56) References Cited

U.S. PATENT DOCUMENTS

| | | | | |
|---|---|---|---|---|
| 7,706,477 | B2* | 4/2010 | Larsson | 375/340 |
| 2003/0171118 | A1* | 9/2003 | Miya | 455/442 |
| 2006/0240826 | A1* | 10/2006 | Shinozaki | 455/436 |
| 2006/0256884 | A1* | 11/2006 | Tomioka et al. | 375/260 |
| 2009/0023447 | A1* | 1/2009 | Hagerman et al. | 455/436 |

FOREIGN PATENT DOCUMENTS

| | | |
|---|---|---|
| JP | 2000013289 A | 1/2000 |
| JP | 2001237753 A | 8/2001 |
| JP | 2007300458 A | 11/2007 |
| WO | 02102109 A | 12/2002 |

OTHER PUBLICATIONS

Japanese Office Action for JP2006-339939 issued Aug. 24, 2011.

* cited by examiner

*Primary Examiner* — Patrick Edouard
*Assistant Examiner* — Shantell L Heiber

(57) ABSTRACT

Disclosed is a mobile communications system including a plurality of base station apparatuses which are located at geographically dispersed locations and perform a wireless communication with a mobile device. The system further includes a maximum ratio combining unit which performs maximum ratio combining processing regarding a signal the base station apparatuses receive from the mobile device, and a selection combining unit which performs selection combining processing regarding the signal from the mobile device. A selection unit included in the system selects one or both of the maximum ratio combining unit and the selection combining unit according to at least one of an external factor and a change of a distribution state of the mobile device under communication.

28 Claims, 39 Drawing Sheets

NOTE:
□ : MOBILE TERMINAL
■ : BASE STATION APPARATUS SELECTING MRC

| MOBILE TERMINAL | BASE STATION APPARATUS #1 | BASE STATION APPARATUS #2 | BASE STATION APPARATUS #3 | BASE STATION APPARATUS #4 |
|---|---|---|---|---|
| 1011 | 2021 | 2031 | 2041 | - |
| 1012 | 2021 | 2041 | 2051 | - |
| 1013 | 2041 | 2051 | - | - |

| MOBILE TERMINAL | BASE STATION APPARATUS#1 | BASE STATION APPARATUS#2 | BASE STATION APPARATUS#3 | BASE STATION APPARATUS#4 | MRC-P |
|---|---|---|---|---|---|
| 1011 | 2021 | 2031 | 2041 | – | 3051 |
| 1012 | 2021 | 2041 | 2051 | – | 3052 |
| 1013 | 2041 | 2051 | – | – | 3053 |

| MOBILE TERMINAL | BASE STATION APPARATUS #1 | BASE STATION APPARATUS #2 | BASE STATION APPARATUS #3 | | MRC-P | SC-P |
|---|---|---|---|---|---|---|
| 1011 | 2031 | 2041 | – | | 3051 | |
| 1011 | 2021 | | | | 3051 | 3061 |

| BASE STATION APPARATUS # | EVALUATION STATE | SETTING STATE | RESERVATION MODE |
|---|---|---|---|
| BS#2011 | M | S | - |
| BS#2021 | M | M | - |
| BS#2031 | S | S | - |
| BS#2041 | M | S | M |
| BS#2051 | M | M | - |
| BS#2061 | M | M | - |
| BS#2071 | M | M | - |
| BS#2081 | S | S | - |

| BASE STATION APPARATUS# | EVALUATION STATE | SETTING STATE | RESERVATION MODE |
|---|---|---|---|
| BS#2011 | M | M | - |
| BS#2021 | S | S | - |
| BS#2031 | S | M | - |
| BS#2041 | S | M | S |
| BS#2051 | M | M | - |

| BASE STATION APPARATUS# | EVALUATION STATE | SETTING STATE | RESERVATION MODE |
|---|---|---|---|
| BS#2011 | S | S | - |
| BS#2021 | S | M | S |
| BS#2031 | S | M | S |
| BS#2041 | S | M | S |
| BS#2051 | S | M | S |
| BS#2061 | S | M | S |
| BS#2071 | M | S | M |
| BS#2081 | M | M | - |
| BS#2091 | S | M | S |
| BS#2101 | M | S | M |
| BS#2111 | M | S | M |
| BS#2121 | S | S | - |
| BS#2131 | M | S | M |
| BS#2141 | M | S | M |
| BS#2151 | S | S | - |

Fig.41

| BASE STATION APPARATUS# | EVALUATION STATE | SETTING STATE | RESERVATION MODE |
|---|---|---|---|
| BS#2 | M | M | - |

Fig.42

MOBILE COMMUNICATIONS SYSTEM AND CONTROL METHOD THEREOF

INCORPORATION BY REFERENCE

This application is based upon and claims the benefit of priority from Japanese Patent Application No. 2006-339939, filed on Dec. 18, 2006, the disclosure of which is incorporated herein in its entirety by reference.

BACKGROUND OF THE INVENTION

1. Technical Field

The present invention relates to a technical field of signal combining in a mobile communications system.

2. Background Art

In the mobile communications system, a mobile terminal carried by a user and a base station apparatus are connected with each other by a communication line using a wireless communication medium (i.e. radio wave). The user of the mobile terminal can communicate with others while moving. Since the feature is attractive to the user, the mobile communications system is becoming widely used.

Generally, an important issue in the mobile communications system is to realize a communication system which uses energy (i.e. electric power) as little as possible when transmitting a signal via a wireless communication medium. In other words, it is a very important issue to reduce a required electric power when establishing a communication line via a wireless communication medium i.e. wireless communication link. That reason is that interference between a wireless communication link used by the user and a wireless communication link used by another user can be reduced by establishing the wireless communication link that uses a minimum electric power. As a result, an increase of a communication capacity can be advantageously obtained in a limited communication band.

As one of methods for reducing the required electric power in the wireless communication link, there is the method of improving the reception efficiency in the base station apparatus. An improvement of a reception efficiency means that an electric power of a transmission side (i.e. mobile terminal) that is required for obtaining a necessary signal-to-noise ratio (S/N ratio) can be reduced.

A so-called third generation mobile telecommunications system employs a code division multiple access (CDMA) communication method. A CDMA communication system employs a communication form that is different from a conventional access method (for example, frequency division multiplex access (FDMA) communication system, time division multiplex access (TDMA) communication system, or the like).

That is, in the CDMA communication system, a plurality of wireless communication links are simultaneously established between the mobile terminal and the base station apparatus. In such communication, generally, an operation called as "soft handover" or "soft handoff" is performed.

A communication link between the mobile terminal and the base station apparatus includes "a down link" and "an up link". The down link is a communication link for transmitting a wireless signal to the mobile terminal from the base station apparatus. On the other hand, the up link is a link for transmitting the wireless signal to the base station apparatus from the mobile terminal.

In a connection mode of the down link in the CDMA communication system, each of a plurality of base station apparatuses transmits a radio wave. One mobile terminal receives radio waves transmitted from the plurality of base station apparatuses. Since the above mentioned connection mode is used, a so-called RAKE reception method is employed in the CDMA communication system.

The mobile terminal employing the RAKE reception method receives signals from a plurality of base station apparatuses and one or more circuits therein separate received signals individually. The mobile terminal performs an adjustment so that the signals have the same arrival time, and also weight received signals so as to obtain a maximum reception gain. After that, the mobile terminal despreads the weighted signal to obtain a decoded baseband signal.

On the other hand, in a connection mode of the up link in the CDMA communication system, a radio wave transmitted by one mobile terminal is received by a plurality of base station apparatuses which exist around the mobile terminal. In the CDMA communication system, there are several methods for processing a wireless signal received by the base station apparatus with respect to an internal configuration of each base station apparatus.

In a first method, a plurality of base station apparatuses that are located at geographically dispersed locations individually receive a signal transmitted from the mobile terminal and also despread a received signal to obtain the decoded baseband signal. The signal that is individually decoded in each base station apparatus in the method is selected based on signal quality thereof. The method is called as "soft handoff". After quality of each of a plurality of received signals in the process mentioned above is individually evaluated, only a normal signal is selected and the selected signals are combined to obtain a baseband signal. Such processes are called as "selection combining (SC)".

A second method is a method using a so-called "sector base station". A sector base station includes a plurality of antenna elements that is called as a sector antenna. A plurality of sector antennas of the sector base station individually receive a wireless signal transmitted from the mobile terminal and the sector base station adjusts the signal so that each arrival time of the signal received by the sector antenna becomes equal to each other. After that, the sector base station combines received signals whose arrival times are adjusted to be equal to each other. The second method is, in principle, the approximately same as RAKE method in a connection mode of the down link mentioned above (that is, a method in which downlink signals received from a plurality of base station apparatuses are combined in one mobile terminal). The method is called as "softer handoff". Each of received signals whose arrival times are adjusted to be equal to each other is weighted so as to maximize reception gain. Such processes is called "maximum ratio combining (MRC)". Each of received signals which is weighted in the sector base station is decoded to obtain the baseband signal.

Japanese Patent Application Laid-Open No. 2000-13289 discloses a method in which a soft handoff (selection combining) and a softer handoff (maximum ratio combining) are combined. In the method, signals received by a plurality of sector antennas (sector base stations) which employ a RAKE reception method is decoded to obtain the baseband signal. The decoded signal is compared with a signal decoded from the baseband signal based on a received signal in another base station apparatus. In the method, one of the decoded signals that are compared with each other is selected based on quality of the decoded signals. That is, a reception form of the RAKE reception method in the method is a reception form in which the softer handoff and the soft handoff in which a signal obtained by the softer handoff or a signal obtained by another base station apparatus is chosen according to quality information are combined.

A technology of which a wireless signal transmitted from one mobile terminal is received by a plurality of base station apparatuses or a plurality of sector antennas in the up link is called a diversity technology. By employing the diversity technology, even if a reception power level of a signal received by the base station apparatus of a plurality of base station apparatuses is temporarily reduced due to buildings or the like, a signal transmitted from the mobile terminal can be efficiently received by a signal received by another base station apparatuses. An effect in such diversity technology is called a space diversity effect.

However, with respect to a reception gain (reception efficiency) of the base station apparatus, an effect of the selection combining (SC) differs from that of the maximum ratio combining (MRC). Hereinafter, the two cases will be compared.

First, a first reception form is a case in which two base station apparatuses that are located at geographically dispersed locations receive a wireless signal, respectively, and perform selection combining processing based on the received wireless signals. A second reception form is a case in which two sector antennas provided in one sector base station receive a wireless signal, respectively and maximum ratio combining processing is performed based on the received wireless signals.

When selection combining (SC) processing is performed, it is necessary that a received power in at least one base station apparatus of a plurality of base station apparatuses meets a predetermined reception level that is required for a reception.

On the other hand, when maximum ratio combining processing (MRC) is performed, signal combining is performed by adding a plurality of received signals received by each sector antenna in one sector base station. For this reason, the maximum ratio combining (MRC) has feature, there is no necessity that a level of a signal before a combining that is received by each sector antenna meets the above predetermined reception level for the selection combining (SC).

In other words, the above feature means that in the up link, a reception gain of the maximum ratio combining method is generally higher than that of the selection combining method. That is, in a maximum ratio combining method, a good quality communication can be realized even if a transmission power of the mobile terminal for satisfying a required signal level is low in comparison with a required transmission power for the selection combining.

Accordingly, when the maximum ratio combining method is extensively used, a transmission power of the mobile terminal can be reduced. As a result, a capacity of the up link can be increased.

The maximum ratio combining method has an advantage of a high reception gain. However, when the maximum ratio combining processing (MRC) is performed, a communication line in the base station side which is used in order to perform signal combining has to be a high-speed line which is capable of transferring a signal without reducing a transmission rate of a signal in a wireless section. Since there are such restrictions, the maximum ratio combining method cannot be used for all the connection patterns between the mobile terminal and the base station apparatus (or a sector antenna). Here, the above restrictions will be described more specifically.

In a selection combining method, a signal with a several MHz bandwidth in a high frequency band in a wireless section is decoded, and also the baseband signal with about ten and several kHz bandwidth obtained by a decoding is produced. In the selection combining method, it is enough to transfer the baseband signal and a signal in which some amount of quality information is added to a point where a judgment of selection combining is performed. That is, in the selection combining method, a communication line with about ten and several kHz bandwidth is enough to transfer a signal to the point where a judgment of selection combining is performed.

In contrast, in the maximum ratio combining method, first, each sector antenna receives a signal with a several MHz bandwidth in the high frequency band in the wireless section. In the maximum ratio combining method, it is necessary to transfer the signal in the high frequency band to a point where a maximum ratio combining process is performed, without changing a transmission rate or with keeping the signal to be in an equal bandwidth. This is because, it is necessary to adjust an arrival time of each received signal and weight a reception gain as mentioned above in the maximum ratio combining method. For this reason, in the maximum ratio combining method, a high speed line whose speed is almost the same as that of the above wireless section is required for a communication line of a base station side.

Accordingly, for the reason mentioned above, generally, the maximum ratio combining method is employed in one base station (sector base station) which is capable of handling signals individually received by a plurality of antenna elements (sector antennas) with keeping a speed of the signal almost the same as a high speed signal in the wireless section. That is, the maximum ratio combining method is not employed for a plurality of base station apparatuses that are located at geographically dispersed locations.

However, in an actual situation, there are few cases in which a mobile terminal is located only in an area which is controlled by one base station and is overlapped with neighboring sectors (the area is a coverage area of the base station). In fact, a mobile terminal is frequently located in a coverage area of a plurality of base station apparatuses which face each other across the mobile terminal. That is, it is considered that it is often the case in which a mobile terminal is located in a plurality of base station areas that are located at geographically dispersed locations. Accordingly, in case that a mobile terminal exists in a plurality of base station areas, if a reception gain can be improved, as a result, a capacity of an up link can be increased.

Accordingly, it is technically possible to connect between a plurality of base station apparatuses that are located in geographically dispersed points with a high speed line whose transmission speed is almost the same as that of the wireless section, in order to increase a capacity of an up link. However, it is impractical to connect between all the neighboring base station apparatuses with the high speed line in a mesh when cost is taken into consideration.

However, a system configuration in which in an up link which transfers a signal from a mobile terminal to a base station apparatus, the maximum ratio combining (MRC) method is employed only between sector antennas that are adjacently arranged in one base station apparatus (sector base station) and meanwhile, the selection combining (SC) method is employed between different base station apparatuses that are located at other locations should be improved from a view point of improving an efficiency of a reception gain of an up link. Here, a present status and an issue of combining processing that is employed in such system configuration will be described more in detail with reference to FIG. 45, FIGS. 46A to 46C and FIGS. 47A to 47C.

FIG. 45 is a figure illustrating a system configuration in which various kinds of base station apparatuses are connected with each other in a related mobile communications system and a processing procedure of a received signal.

In FIG. 45, a base station apparatus 12020 is a sector base station having three sector antennas 12011, 12012 and 12013. The base station apparatus 12020 forms a base station area 121 as a coverage area by the three sector antennas.

On the other hand, a base station apparatus 12021 is a base station apparatus having a non-directional antenna (for example, omni-directional antenna etc.) and forms a base station area 122 as a coverage area.

When two base station apparatuses 12020 and 12021 are located at geographically dispersed locations as shown in FIG. 45, a mobile terminal 101 is located at a point on a boundary between the base station area 121 and the base station area 122. The mobile terminal 101 exists in an overlapped coverage area of two sector antennas 12012 and 12013 in the base station area 121, and also exists in a coverage area of the base station apparatus 12021 (base station area 122). Received signals from the sector antennas 12012 and 12013 are processed inside of the one base station apparatus (sector base station) 12020. Since a high speed line can be used for the received signals from the sector antennas inside the base station apparatus, a signal combining by the maximum ratio combining method can be applied.

More specifically, a maximum ratio combiner (CMB) 1301 is installed in the base station apparatus 12020 whose coverage area is the base station area 121. The maximum ratio combiner 1301 performs maximum ratio combining processing based on received signals from the three sector antennas (in a case shown in FIG. 45, received signals from the two sector antennas 12012 and 12013). The maximum ratio combiner 1301 decodes a baseband signal based on an output of maximum ratio combining processing and also adds predetermined quality information to the decoded signal. An output signal of the maximum ratio combiner (CMB) 1301 is transferred to a diversity handover trunk (DHT) 1302 in order to perform selection combining with a signal from an antenna provided in another base station apparatus.

On the other hand, in order to perform selection combining with a signal from an antenna provided in another base station apparatus, the base station apparatus 12021 decodes a signal received in the base station area 122 into a baseband signal, and also adds predetermined quality information to the decoded signal. An output signal of the base station apparatus 12021 is transferred to the diversity handover trunk (DHT) 1302.

The diversity handover trunk 1302 receives a baseband signal decoded in the base station apparatus covering the base station area 121 and receives a baseband signal decoded in the base station apparatus covering the base station area 122. Moreover, by referring to the quality information that attaches to each received baseband signal, the diversity handover trunk 1302 selects one of two received baseband signals based on the quality information. The selected signal is sent to a RNC (radio network controller) 1307.

In case of an example shown in FIG. 45, with respect to quality of a signal transmitted from the mobile terminal 101, it is necessary that a quality of either one or both of two signals that are inputted to the diversity handover trunk 1302 has to satisfy a predetermined level. Here, the two signals include a signal obtained by a process in which signals received by the sector antennas 12012 and 12013 are processed by a maximum ratio combining and the processed signal is decoded into a baseband signal and a signal obtained by a process in which a signal received by the base station apparatus 12021 is decoded into a baseband signal.

However, a higher reception gain can be obtained by combining all the signals received by the sector antennas 12012 and 12013 and the base station apparatus 12021 by using the maximum ratio combining method. A reason why such method can not be actually applied is that a high speed line which can perform maximum ratio combining processing in an external apparatus for a plurality of base station apparatuses which are installed at geographically dispersed locations is not available.

That is, in an up link, in order to perform maximum ratio combining (MRC) processing based on outputs from receiving antennas as many as possible (output signal of a base station apparatus), it is desirable to prepare all the high speed lines in advance by considering all connection patterns that are configured between a mobile terminal and a base station apparatus or a sector antenna according to a location of a mobile terminal that exists in a service area.

In this case, a base station apparatus having a non-directional antenna or a base station having a sector antenna (hereinafter, it is abbreviated as "base station apparatus group") to be connected by a high speed line forms a connection pattern of which a plurality of coverage areas formed by the base station apparatus group are neighboring. As another connection pattern, in the base station apparatus group which should be connected by a high speed line, one or more base station apparatus groups exist between neighboring coverage areas and as a result, a connection pattern is a pattern of which all the coverage areas are close.

However, when a connection pattern of the base station apparatus group is selected according to the above judgment criteria, even when it is visually judged that both coverage areas are neighboring or close, actually, there is a case that it is not effective to perform maximum ratio combining processing caused by an influence of a position or a height of a structure which can be an obstacle to a radio wave.

Accordingly, it is not cost-effective to prepare an expensive high speed line in advance by considering all the connection patterns. Moreover, if these high speed lines are permanently established, communication lines are wastefully left almost unused. Accordingly, it is required to establish only a high speed line truly required.

Generally, an area where a mobile communications system is largely used is a congested urban area or a densely populated area. However, in the areas, a distribution condition of users of a mobile terminal changes at every moment. For example, since users move for their reasons according to some conditions such as in a weekday morning, in a daytime, in an evening, late at night, a weekend or a special event, a distribution condition of a plurality of mobile terminals changes according to the movement of users. For this reason, it is necessary to reduce an interference power of an up link by realizing a reception using the maximum ratio combining method among base station apparatuses having the non-directional antenna and base stations having the sector antenna as many as possible according to a movement or distribution conditions of users (mobile terminals).

Here, in the mobile communications system shown in FIG. 45, a transition of a connection state of a communication line when a mobile terminal moves will be described with reference to FIGS. 46A to 46C and FIGS. 47A to 47C.

FIGS. 46A to 46C are figures generally illustrating a connection mode of a maximum ratio combiner and a selection combiner in a mobile communications system shown in FIG. 45. Further, in FIGS. 46A to 46C, the maximum ratio combiner (CMB) 1301 shown in FIG. 45 is represented as a maximum ratio combining point (MRC-P) 1305. The diversity handover trunk (DHT) 1302 shown in FIG. 45 is represented as a selection combining point (SC-P) 1306.

FIG. 46A shows a situation in which the mobile terminal 101 approaches sector antennas 12012 and 12013 and also approaches the base station apparatus 12021. In such a case, the maximum ratio combining point 1305 provided in the sector base station 12020 performs maximum ratio combining processing to signals received by the sector antennas 12012 and 12013. The selection combining point 1306 performs selection combining processing based on a signal combined by the maximum ratio combining point 1305 and a signal received by the base station apparatus (base station apparatus having a non-directional antenna) 12021.

Next, FIG. 46B shows a situation in which the mobile terminal 101 moves to another position that is different from the position shown in FIG. 46A. That is, in FIG. 46B, the mobile terminal 101 slightly moves away from the coverage areas by base station apparatus 12021 compared with the position shown in FIG. 46A and it is located on a boundary between coverage areas by sector antennas 12012 and 12013. In this case, it is effective to apply maximum ratio combining processing to the signals received by the sector antennas 12012 and 12013 in the maximum ratio combining point 1305. However, in the situation, it is not effective to perform selection combining processing using an output signal of the maximum ratio combining point 1305 and an output signal of the base station apparatus 12021. Thus, in the situation shown in FIG. 46B, an output signal of the base station apparatus 12021 is excluded from an input source for a signal combining.

FIG. 46C shows a situation in which the mobile terminal 101 moves to another position that is different from the position shown in FIG. 46A and FIG. 46B mentioned above. FIG. 46C shows the situation in which the mobile terminal 101 is located on a boundary of the base station area 122 of the base station apparatus 12021 and on a boundary of the sector antenna 12013 (base station area 121), further, it is located on a position which is away from the sector antenna 12012. Then, the selection combining point 1306 performs selection combining processing based on an output signal of the sector antenna 12013 and a signal received by the base station apparatus 12021.

Hereinafter, a difference in signal processing for respective situations that are shown in FIGS. 46A to 46C mentioned above will be described with reference to FIGS. 47A to 47C.

FIGS. 47A to 47C are figures logically illustrating a relation of a communication connection of base station apparatuses 12020 and 12021, the maximum ratio combining point 1305 and the selection combining point 1306 in the situation shown in FIGS. 46A to 46C.

FIG. 47A is a figure logically showing a connection situation shown in FIG. 46A mentioned above. In FIG. 47A, a bold line connecting the sector antennas 12012, 12013 and the maximum ratio combining point 1305 represents a high speed line which can transfer a signal for performing maximum ratio combining processing. That is, a high speed line is used for a communication line which connects each sector antenna and the maximum ratio combining point 1305 in the sector base station 12020.

Here, the high speed line (i.e. the bold line in FIG. 47A) provided in the sector base station 12020 is a line which has almost the same performance as a transmission link which is capable of transmitting a signal with a several MHz bandwidth in a high frequency band in a wireless section as mentioned in a description of the maximum ratio combining method.

The maximum ratio combining point 1305 performs maximum ratio combining processing based on a signal received by the sector antennas 12012 and 12013 and also transfers a signal that represents a result of the processing to the selection combining point 1306. The selection combining point 1306 performs selection combining processing based on a signal received from the maximum ratio combining point 1305 and a signal received from the base station apparatus 12021. Since it is a precondition that a low speed line is used for each communication line which transfers a signal used for selection combining, the communication line is indicated by a thin line.

Here, a low speed line indicated by a thin line is a line whose transmission speed is very low compared with that of a high speed line with a several MHz bandwidth as mentioned above in a description of the selection combining method.

FIG. 47B is a figure logically illustrating a connection situation shown in FIG. 46B mentioned above. In this case, since maximum ratio combining processing is performed by using a signal received from the sector antennas 12012, 12013, a line connecting the sector antenna and the maximum ratio combining point 1305 is expressed by the same bold line as FIG. 47A. However, a signal received by the base station apparatus 12021 is excluded from an input source due to a positional relation of the mobile terminal 101 shown in FIG. 46. Thus, a communication line (low speed line) between the maximum ratio combining point 1305 and the selection combining point 1306 is not established. That is, the selection combining point 1306 does not perform selection combining processing.

FIG. 47C is a figure logically illustrating a connection situation shown in FIG. 46C mentioned above. Only a signal received by the sector antenna 12013 is used in the sector base station 12020 due to a positional relation of the mobile terminal 101 shown in FIG. 46C. Then, a low speed line which connects the sector antenna 12013 and the selection combining point 1306 and the low speed line which connects the base station apparatus 12021 and the selection combining point 1306 are established. The selection combining point 1306 performs selection combining processing based on signals received via the low speed lines.

In FIGS. 47A to 47C, a high speed line (bold line) which transfers a signal used for maximum ratio combining processing and the low speed line (thin line) which transfers a signal used for selection combining are selectively established to each sector antenna appropriately according to a positional relation of the mobile terminal 101. On the other hand, with respect to the base station apparatus 12021 having one non-directional antenna, only the low speed line (thin line) which transfers a signal used for selection combining is established.

As an example mentioned above, it is necessary to transfer a signal received in each antenna element to a maximum ratio combining point (maximum ratio combiner) via the high speed line whose transmission speed is almost the same as that of a wireless section to perform maximum ratio combining processing. For this reason, in a general system configuration, maximum ratio combining processing is performed only in a sector base station in which the high speed line is available. In this case, maximum ratio combining processing is performed only between a plurality of sector antennas accommodated in one sector base station. That is, in a conventional mobile communications system, maximum ratio combining processing cannot be performed between a plurality of base station apparatuses which are located at geographically dispersed locations.

SUMMARY

The present invention is made to solve the foregoing and other exemplary problems, drawbacks, and disadvantages. A first exemplary feature of the present invention is to provide a mobile communications system and a control method thereof in which a capacity increase of a communication line is realized by reducing a power transmitted from a mobile terminal to a base station apparatus based on an improvement of a reception gain of a wireless signal sent to the base station apparatus from the mobile terminal.

According to a first exemplary aspect of the present invention, there is provided with including (1) a plurality of base station apparatuses which are located at geographically dispersed locations and perform a wireless communication with a mobile device, (2) a maximum ratio combining unit which is connectable with the plurality of base station apparatuses for a communication via a first communication line and performs maximum ratio combining processing based on information corresponding to a received signal from the mobile device which is transmitted from the plurality of base station apparatuses, (3) a selection combining unit which is connectable with the plurality of base station apparatuses for a communication via a second communication line and performs selection combining processing based on information corresponding to a received signal from the mobile device which is transmitted from the plurality of base station apparatuses and (4) a selection unit which selects one or both of the maximum ratio combining unit and the selection combining unit according to at least one of an external factor and a change of a distribution state of a mobile device under communication that exists in a coverage area of the plurality of base station apparatuses with which the mobile device performs a wireless communication, when signal combining is performed based on the information corresponding to the received signal from the mobile device which is transmitted from the plurality of base station apparatuses, in response to reception of a wireless signal by the plurality of base station apparatuses which is transmitted from one mobile device.

According to a second exemplary aspect of the present invention, there is provided with including steps of (1) connecting the plurality of base station apparatuses which are located at geographically dispersed locations and perform a wireless communication with the mobile device with the maximum ratio combining unit that performs maximum ratio combining processing via the first communication line based on information corresponding to a received signal from the mobile device which is transmitted from the plurality of base station apparatuses, and also connecting the plurality of base station apparatuses with the selection combining unit that performs selection combining processing based on the information via the second communication line, and (2) selecting at least one of the maximum ratio combining unit or the selection combining unit according to at least one of an external factor or a change of a distribution state of the mobile device under communication that exists in a coverage area of the plurality of base station apparatuses with which the mobile device performs a wireless communication when performing signal combining based on the information corresponding to the received signal from the mobile device which is transmitted from the plurality of base station apparatuses in response to a reception of a wireless signal transmitted from one mobile device in the plurality of base station apparatuses.

According to other exemplary aspect of the present invention, there is provided with including the base station apparatus which performs a wireless communication with the mobile device, the base station apparatus including, (1) a communication control module which transmits information by establishing a communication link with at least one of the first communication line used for a communication with the maximum ratio combining unit that performs maximum ratio combining processing and the second communication line used for a communication with the selection combining unit that performs selection combining processing based on information corresponding to a received signal from the mobile device, (2) a request module which requests an external apparatus to change a destination of the information corresponding to the received signal from the mobile device to either the maximum ratio combining unit or the selection combining unit according to a change of a distribution state of the mobile device under communication.

According to a second exemplary aspect of the present invention, there is provided with a computer program for controlling an operation of the base station apparatus which performs a wireless communication with the mobile device, the computer program including functions of as follows:

a communication control function which transmits information by establishing a communication link with at least one of the first communication line used for a communication with the maximum ratio combining unit that performs maximum ratio combining processing and the second communication line used for a communication with the selection combining unit that performs selection combining processing based on information corresponding to a received signal from the mobile device; and a request function which requests an external apparatus to change a destination of the information corresponding to the received signal from said mobile device to either the maximum ratio combining unit or the selection combining unit according to a change of a distribution state of the mobile device under communication.

Further, a first exemplary feature mentioned above is also achieved by a control method corresponding to a mobile communications system having each configuration mentioned above.

The first exemplary feature mentioned above is also achieved by a base station apparatus included in mobile communications system mentioned above.

Moreover, the first exemplary feature mentioned above is also achieved by a computer program for forcing a computer to realize a base station apparatus mentioned above and a computer-readable storage medium in which the computer program is stored.

Other exemplary features and advantages of the present invention will be apparent from the following description taken in conjunction with the accompanying drawings, in which like reference characters designate the same or similar parts throughout the figures thereof.

BRIEF DESCRIPTION OF THE DRAWINGS

Exemplary features and advantages of the present invention will become apparent from the following detailed description when taken with the accompanying drawings in which:

FIG. 41 is a figure illustrating a management table used for a management of an evaluation state and a setting state of a plurality of base station apparatuses that are management targets;

FIG. 42 is a figure illustrating a management table that is self-managed by a base station apparatus in a third example;

EXEMPLARY EMBODIMENT

Exemplary embodiments of the present invention will now be described in detail in accordance with the accompanying drawings.

In the following description, first, an overall operation of a mobile communications system according to the exemplary embodiment is described with reference to mainly FIGS. 1 to 24. An operation of each apparatus configuring the system that realizes the operation specifically and a processing configuration are described with reference to FIGS. 25 to 44.

<Overall Operation of a Mobile Communications System>

Figure 1:
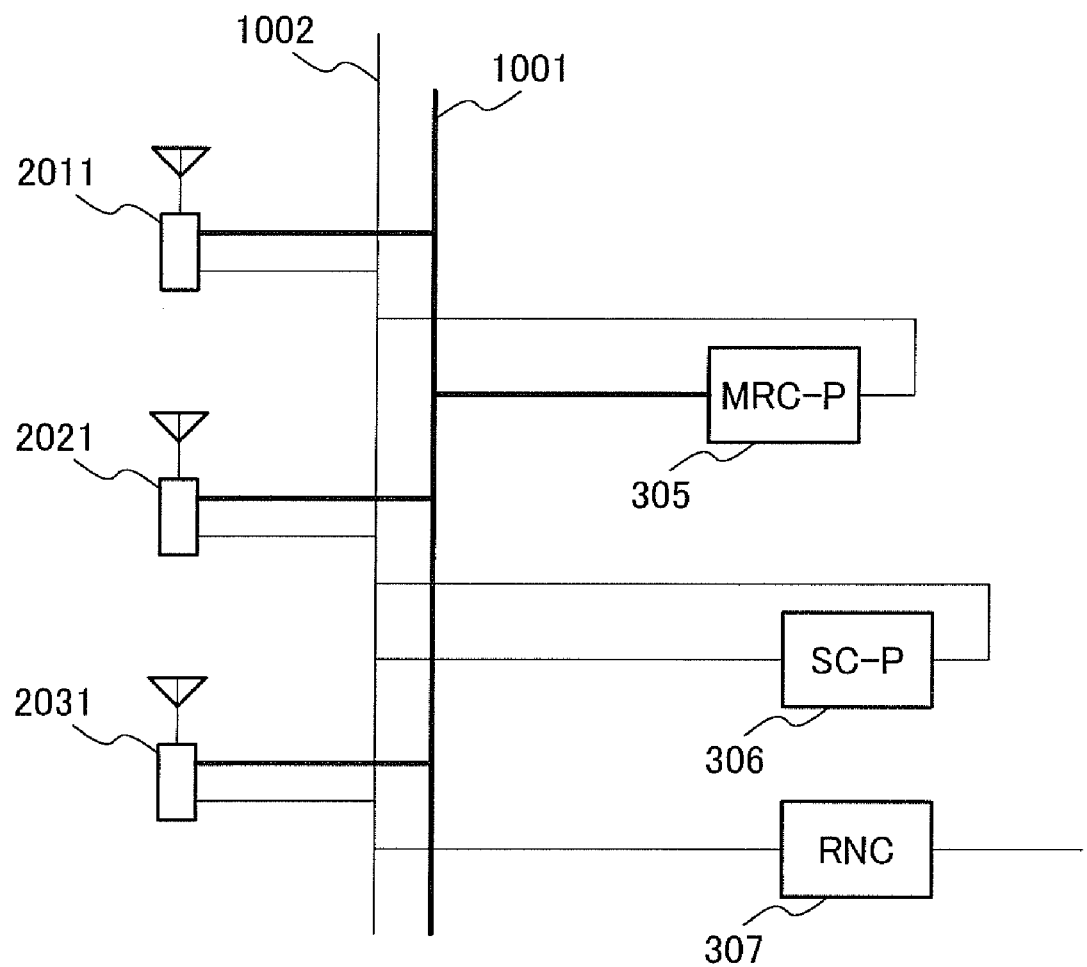
FIG. 1 is a figure exemplarily illustrating the entire configuration of a mobile communications system according to an exemplary embodiment of the present invention.

FIG. 1 is a figure exemplarily illustrating an entire configuration of a mobile communications system according to an exemplary embodiment of the present invention.

A mobile communications system shown in FIG. 1 mainly includes base station apparatuses 2011, 2021 and 2031, a maximum ratio combining point (MRC-P) 305, a selection combining point (SC-P) 306, a radio network controller (RNC) 307, a high speed line 1001 and a low speed line 1002.

More specifically, the base station apparatuses 2011, 2021 and 2031 perform a wireless communication with a mobile terminal (not shown) which exists in a coverage area (i.e. base station area). Moreover, the base station apparatus 2011, 2021 and 2031 transmit a signal received from the mobile terminal as digital data by using the high speed line 1001 or the low speed line 1002. An internal configuration of these base station apparatuses is described later with reference to FIG. 25.

The maximum ratio combining point (i.e. maximum ratio combining unit) 305 performs maximum ratio combining processing (MRC) to signals received by the base station apparatuses 2011, 2021 and 2031. An output of the maximum ratio combining point 305 is transmitted to the selection combining point 306. In the exemplary embodiment, the maximum ratio combining point 305 is located at a location that is geographically different from locations where the base station apparatuses 2011, 2021 and 2031 are arranged.

The selection combining point (i.e. the selection combining unit) 306 includes a selection combiner which performs selection combining processing (SC) to signals received by the base station apparatuses 2011, 2021 and 2031 and is arranged at a location that is geographically different from a location where these base station apparatuses are arranged. An output of the selection combining point 306 is transmitted to a radio network controller 307.

The radio network controller 307 controls an operation of the base station apparatuses 2011, 2021 and 2031 based on an output signal of the maximum ratio combining point 305 or an output signal of the selection combining point 306. Further, the radio network controller 307 is connected to a Mobile service switching center (MSC) (not shown) that is a higher level apparatus.

The high speed line (i.e. a first communication line) 1001 is a broadband communication line which connects the base station apparatuses 2011, 2021 and 2031 to the maximum ratio combining point 305 so as to enable a communication with each other. The high speed line 1001 is represented by a bold line in FIG. 1. In the exemplary embodiment, the high speed line 1001 that is a broadband communication line is mainly utilized for a maximum ratio combining processing (MRC) (it will be described in detail later).

The low speed line 1002 (i.e. a second communication line) is a narrow band communication line which connects among the base station apparatuses 2011, 2021 and 2031, the maximum ratio combining point 305, the selection combining point 306 and the radio network controller 307 so as to enable a communication with each other. The low speed line 1002 is represented by a thin line in FIG. 1. In the exemplary embodiment, the low speed line 1002 that is a narrow band communication line is mainly utilized for selection combining processing (SC) (it will be described in detail later).

Further, in a description mentioned below, an establishment of a communication line using the high speed line 1001 may be called "MRC connection". On the other hand, an establishment of a communication line using the low speed line 1002 may be called "SC connection".

In the exemplary embodiment, a packet link which includes an address header representing a transfer destination address, for example, such as an Internet Protocol (IP) network, can be used for the high speed line 1001 and the low speed line 1002. Alternatively, a Synchronous Digital Hierarchy (SDH) in which a different time slot is assigned for each transfer destination point may be used for the high speed line 1001 and the low speed line 1002.

The logically equal connection mode may be used for the high speed line 1001 and the low speed line 1002. Moreover, in an example shown in FIG. 1, the low speed line 1002 is used for a connection between the maximum ratio combining point 305 and the selection combining point 306. However, a connection mode using the high speed line 1001 may be used for a connection between the maximum ratio combining point 305 and the selection combining point 306.

Figure 2:
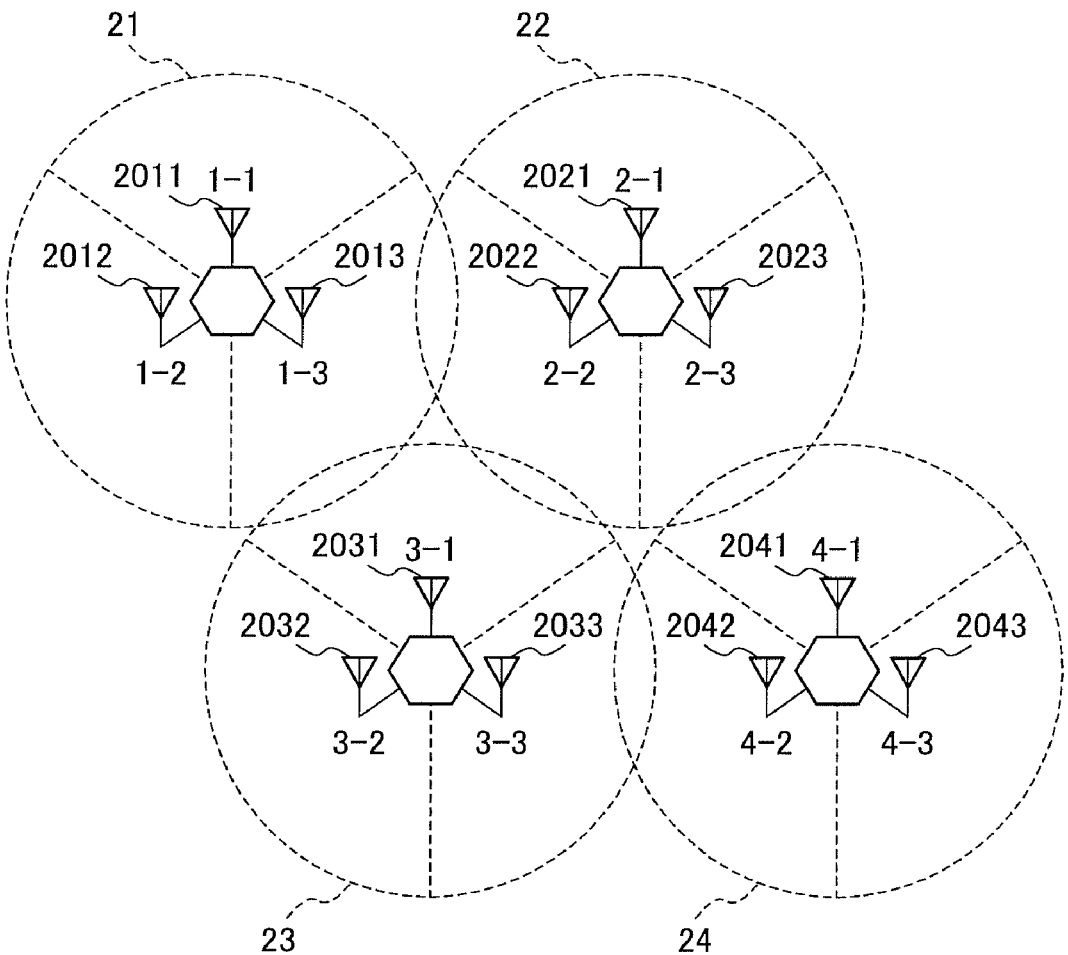
FIG. 2 is a figure exemplifying a relation between a base station area and a sector antenna in a general mobile communications system.

FIG. 2 is a figure exemplifying a relation between a base station area and a sector antenna in a general mobile communications system.

In an example shown in FIG. 2, the respective base station areas 21 to 24 are formed by four sector base stations which are located at physically different locations as a coverage area of the sector base stations. The base station areas (21 to 24) of the sector base stations forms one cell which includes three sectors as shown in FIG. 2 and below. That is:

Base station area 21: Sector antennas 2011 to 2013
Base station area 22: Sector antennas 2021 to 2023
Base station area 23: Sector antennas 2031 to 2033 and
Base station area 24: Sector antennas 2041 to 2043

According to an example shown in FIG. 2, which coverage areas of sector antennas are adjacent to each other or overlapped with each other can be known.

More specifically, for example, a coverage area of the sector antenna 2013 in the base station area 21 is adjacent to coverage areas of the sector antennas 2011 and 2012 in the facing base station area 21, a coverage area of a sector antenna 2022 in the base station area 22, and a coverage area of the sector antenna 2031 in the base station area 23.

Similarly, a coverage area of the sector antenna 2041 of the base station area 24 is adjacent to coverage areas of the sector antennas 2042 and 2043 in the base station area 24, and a coverage area of the sector antenna 2023 in the base station area 22.

The above mentioned method is a method to visually find a neighboring antenna area. However, such method can be applied only under a limited (or ideal) condition in which a structure that blocks a radio wave, a structure that reflects a radio wave or the like does not exist in a coverage area of each sector antenna.

Accordingly, in order to overcome such restrictions, the applicant proposes the following method for example, in Japanese Patent Application No. 2006-127387.

That is, it is noted that Japanese Patent Application No. 2006-127387 filed May 1, 2006 is herein incorporated by reference.

More specifically, in the method, an adjacent situation between base station apparatuses is judged by a statistical processing of a wireless condition that is reported from a mobile terminal, and an expected path connecting a base station apparatus to a sector antenna is dynamically changed according to data (i.e. adjacent cell information) generated based on this judgment result.

That is, the method according to Japanese Patent Application No. 2006-127387 discloses following processes.

A network control apparatus which controls a plurality of base station apparatuses judges an adjacent situation between the plurality of base station apparatuses based on reception intensity of signals from the plurality of base station apparatuses that is transmitted from a mobile terminal.

More specifically, in the method, the network control apparatus judges an adjacent situation by following procedures. That is:

With respect to each of a plurality of base station apparatuses, reception intensity of signals from base station apparatuses that is transmitted from a mobile terminal is classified into three levels from a first level to a third level in descending order of reception intensity based on two threshold values;

Two base station apparatuses are selected among the plurality of base station apparatuses;

When the reception intensities of signals from two selected base station apparatuses corresponds to the first level, it is judged that the two base station apparatuses are "a pair of close base station apparatuses" that have a positional relationship in which two base station apparatuses exist close to each other for a spatial distance of a propagation, on the other hand;

When one of reception intensities of signals from the two base station apparatuses corresponds to the first level and the other corresponds to the second level, it is judged that the two base station apparatuses are "a pair of adjacent base station apparatuses" that have a positional relationship in which a spatial distance of a propagation between the two base station apparatuses is larger than that of the pair of close base station apparatuses.

Figure 3:
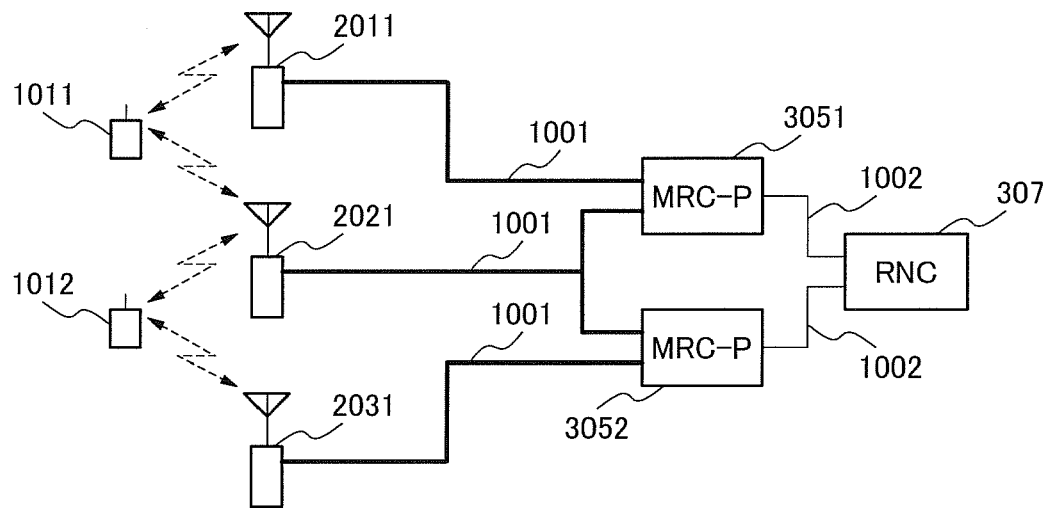
FIG. 3 is a figure illustrating a state in which a plurality of mobile terminals that are connected with a part of base station apparatuses are connected by the maximum ratio combining (MRC) in the mobile communications system exemplarily illustrated in FIG. 1 and FIG. 2.

FIG. 3 is a figure illustrating a state in which a plurality of mobile terminals that are connected with a part of base station apparatuses are connected by the maximum ratio combining (MRC) in a mobile communications system exemplarily illustrated in FIG. 1 and FIG. 2.

As shown in FIG. 3, in the exemplary embodiment, the mobile terminal 1011 is connected to the base station apparatuses 2011 and 2021. Signals received by the two base station apparatuses 2011 and 2021 are transferred to the maximum ratio combining point (MRC-P) 3051 provided for the mobile terminal 1011. The maximum ratio combining point 3051 performs a decoding process based on a signal received from the mobile terminal 1011.

On the other hand, the mobile terminal 1012 is connected to the base station apparatuses 2021 and 2031. Respective signals received by the base station apparatuses 2021 and 2031 are transferred to the maximum ratio combining point (MRC-P) 3052 provided for the mobile terminal 1012. The maximum ratio combining point 3052 performs a decoding process based on a signal received from the mobile terminal 1012.

Further, in an example shown in FIG. 3, in order to clearly express a connection relationship among the mobile terminal, the base station apparatus and the maximum ratio combining point, each node is directly connected with each other, for convenience of explanation. However, in an actual situation, as shown in FIG. 1, each node forms a network that can be connected arbitrarily. Then, the base station apparatus 2021 is connected with the mobile terminals 1011 and 1012. A signal received by the base station apparatus 2021 is transferred to the maximum ratio combining points 3051 and 3052. In the exemplary embodiment, "broadcast function" that is a network function can be used for the transfer.

As mentioned above, the maximum ratio combining points (MRC-P305, 3051 and 3052) according to the exemplary embodiment can take in a required output from an arbitrary base station apparatus. The maximum ratio combining point only associates a base station apparatus therewith by using the "broadcast function" regardless of an increase or decrease of mobile terminals under communication (i.e. mobile terminals which are busy). For this reason, in the exemplary embodiment, a line setting between a base station apparatus and a maximum ratio combining point is not necessary.

Figure 4:
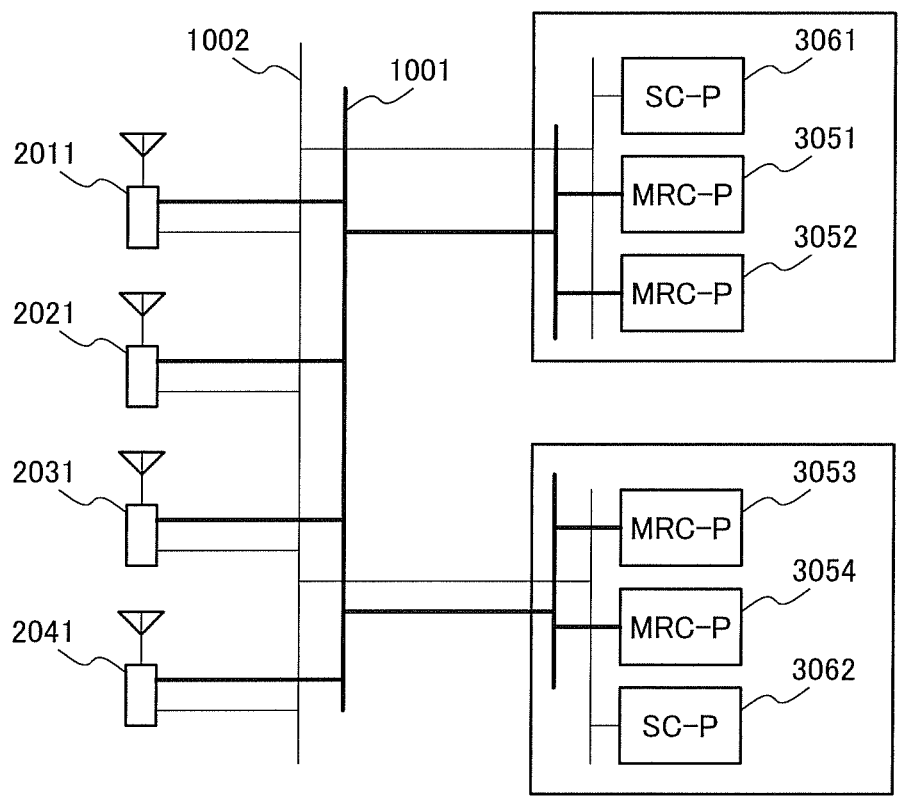
FIG. 4 is a figure exemplarily illustrating a situation in which a maximum ratio combining point and a selection combining point are accommodated together in a physical apparatus in the mobile communications system according to an exemplary embodiment of the present invention.

FIG. 4 is a figure exemplarily illustrating a situation in which a maximum ratio combining point and a selection combining point are accommodated together in a physical apparatus in a mobile communications system according to an exemplary embodiment of the present invention.

In FIG. 4, the base station apparatuses 2011, 2021, 2031 and 2041 are connected to a network formed by the high speed line 1001 and the low speed line 1002 as shown in FIG. 1. On the other hand, the maximum ratio combining point (MRC-P) and the selection combining point (SC-P) are accommodated in an apparatus which exists physically.

Specifically, the maximum ratio combining points 3051 and 3052 and the selection combining point 3061 are accommodated in a first apparatus. The maximum ratio combining points 3053 and 3054 and the selection combining point 3062 are accommodated in a second apparatus. The first and second apparatuses are ones of apparatuses connected to the network. That is, the first and/or second apparatuses may be stand-alone. The first and/or second apparatuses may be accommodated in any one of the base station apparatus, the radio network controller (RNC), another external apparatus or the like when the apparatuses can be connected to a network.

Figure 5:
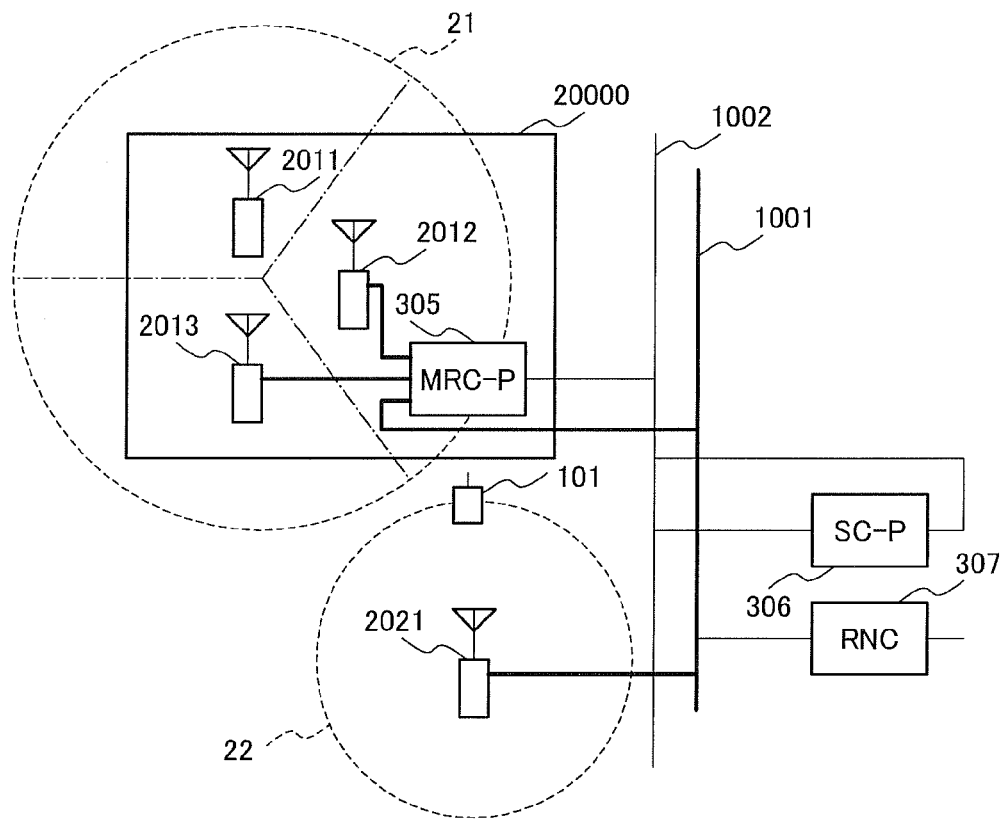
FIG. 5 is a figure exemplarily illustrating a connection state of the mobile terminal and the base station apparatus in the mobile communications system according to an exemplary embodiment of the present invention.

FIG. 5 is a figure exemplarily illustrating a connection state of a mobile terminal and a base station apparatus in a mobile communications system according to an exemplary embodiment of the present invention.

FIG. 5 shows an example of a state in which a maximum ratio combining connection path between the sector antennas 2012 and 2013 in the base station area 21 and the base station apparatus 2021 in the base station area 22 is formed with respect to the mobile terminal 101.

The maximum ratio combining point 305 is accommodated in a base station apparatus (i.e. sector base station) 20000 which covers the base station area 21. A connection between the sector antenna 2012 and the maximum ratio combining point 305 is established by a connection in the base station apparatus. A connection between the sector antenna 2013 and the maximum ratio combining point 305 is also established by a connection in the base station apparatus.

The base station apparatus 2021 and the maximum ratio combining point 305 are connected to the maximum ratio combining point 305 in the base station apparatus 20000 via the high speed line 1001.

Figure 46A:
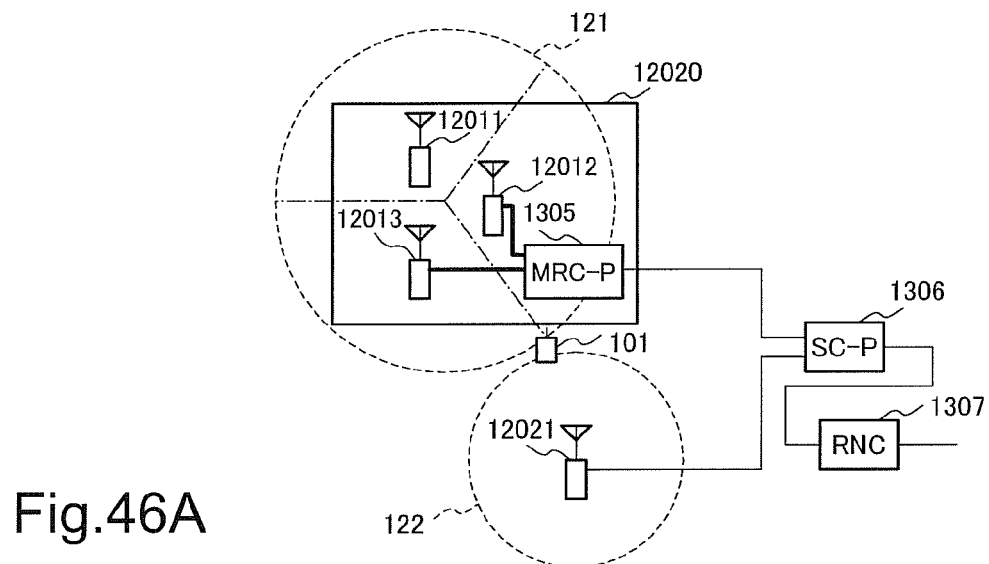
FIGS. 46A to 46C are figures generally illustrating a connection mode of a maximum ratio combiner and a selection combiner in a mobile communications system shown in FIG. 45.
Figure 46B:
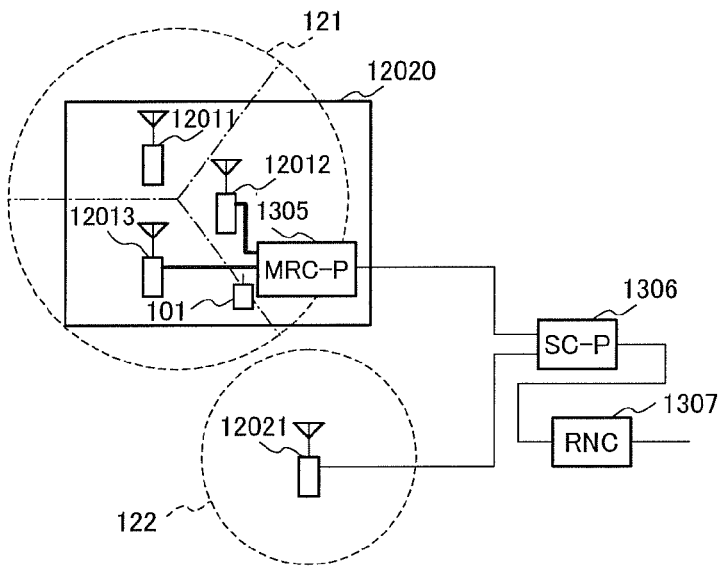
Figure 46C:
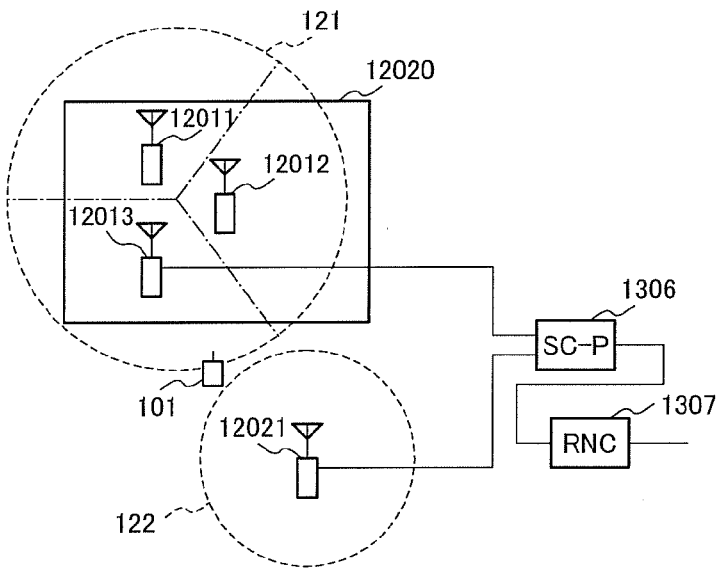
Figure 47A:
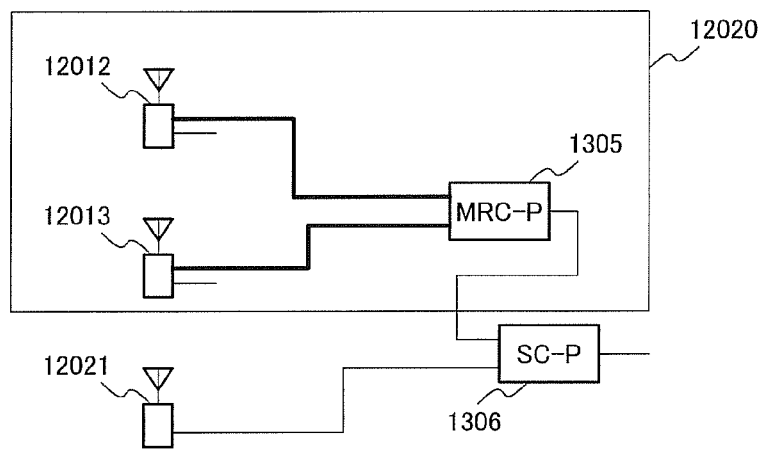
FIGS. 47A to 47C are figures logically illustrating a relation of a communication connection among the base station apparatus 12020 and 12021, the maximum ratio combining point 1305 and the selection combining point 1306 in the situation shown in FIGS. 46A to 46C.
Figure 47B:
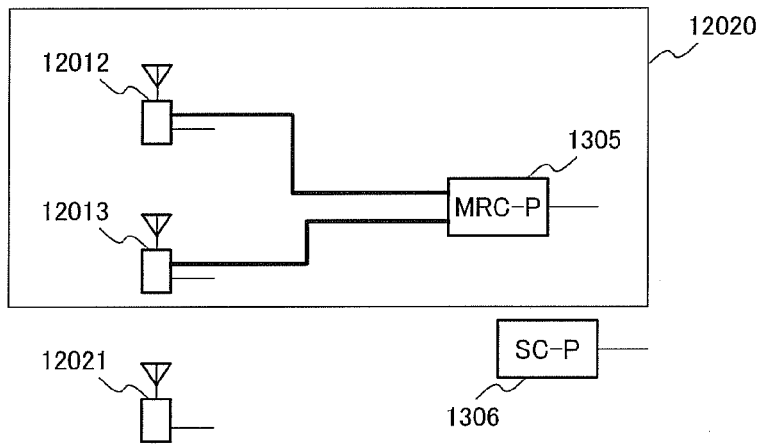
Figure 47C:
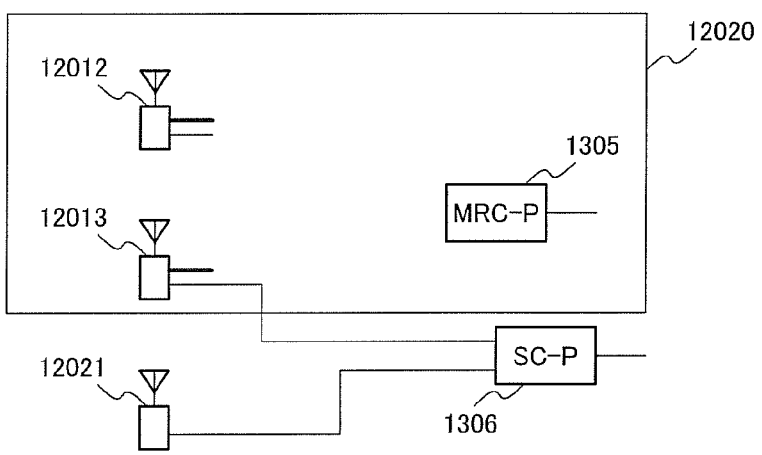

The maximum ratio combining point 305 is connected to the selection combining point 306 via the low speed line 1002 and also is connected to the radio network controller (RNC) 307 via the low speed line 1002. The maximum ratio combining point 305 is directly connected to the radio network controller 307 via the low speed line 1002. This relation is equal to a form in which all antenna outputs are connected to the maximum ratio combining point 305 in a connection relationship mentioned above with reference to FIGS. 46A to 46C.

Next, a situation in which signals is actually sent from a plurality of base station apparatuses will be described.

Figure 6:
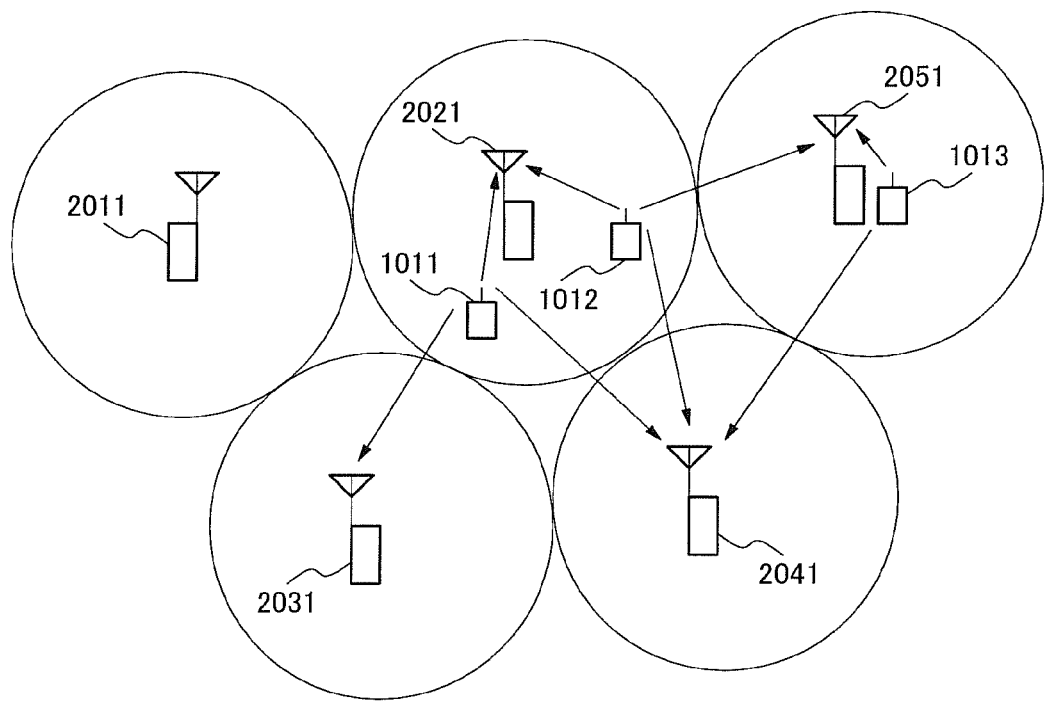
FIG. 6 is a figure exemplifying a connection situation of a communication link between the base station apparatus and the mobile terminal assumed in the mobile communications system according to an exemplary embodiment of the present invention.
Figures 7, 8:
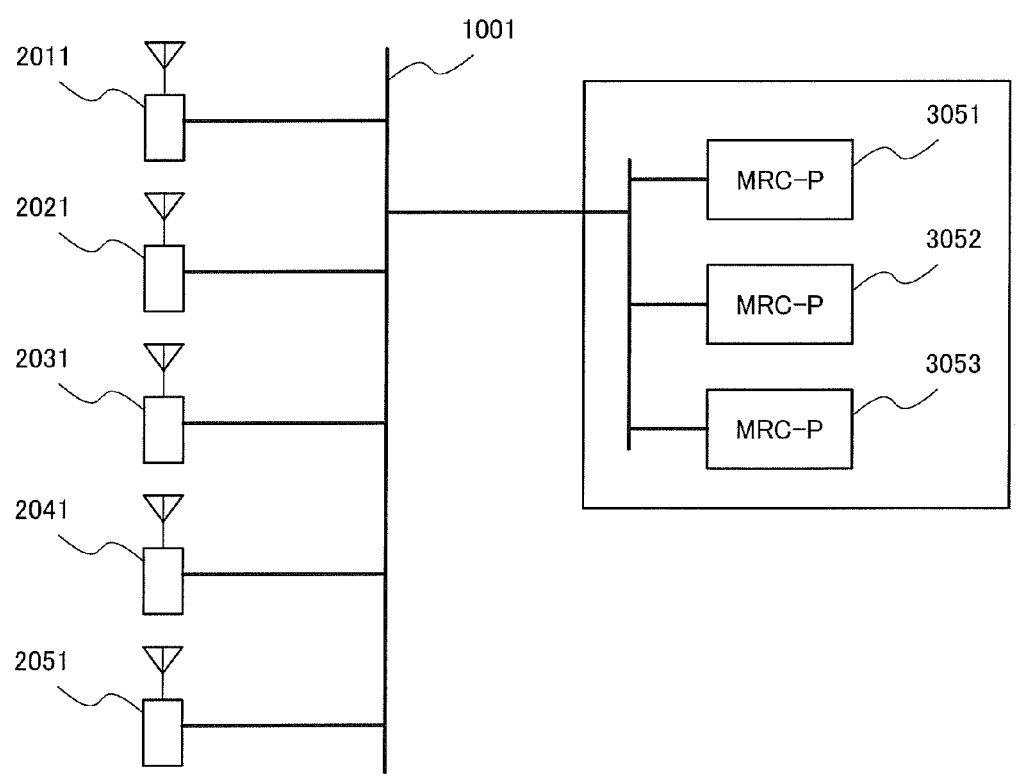
FIG. 7 is a figure (table) illustrating a connection situation of a communication link between the base station apparatus and the mobile terminal shown in FIG. 6.
FIG. 8 is a configuration diagram showing a connection situation of a communication link between the base station apparatus and the mobile terminal exemplarily shown in FIGS. 6 and 7 from a view point of a network connection of the mobile communications system.

FIG. 6 is a figure exemplifying a connection situation of a communication link between a base station apparatus and a mobile terminal in a mobile communications system according to an exemplary embodiment of the present invention. FIG. 7 is a figure (table) illustrating a connection situation of a communication link between a base station apparatus and a mobile terminal shown in FIG. 6.

In an example shown in FIG. 6, each of the base station apparatuses 2011, 2021, 2031, 2041 and 2051 is a base station apparatus having an omni-antenna (i.e. non-directional antenna). The mobile terminals 1011, 1012 and 1013 are arranged in a coverage area of base station apparatuses as an example shown in FIG. 6. That is, a distance relationship between a mobile terminal and a base station apparatuses differs for each of the mobile terminals 1011, 1012 and 1013 according to a position where each of the mobile terminals exist.

More specifically, the mobile terminal 1011 is located at a position where the mobile terminal 1011 can communicate with the base station apparatuses 2021, 2031 and 2041. The mobile terminal 1012 is located at a position where the mobile terminal 1012 can communicate with the base station apparatuses 2021, 2041 and 2051. The mobile terminal 1013 is located at a position where the mobile terminal 1013 can communicate with the base station apparatuses 2041 and 2051.

At this time, for example, in case of the mobile terminal 1011, a signal sent from the mobile terminal 1011 by an up link is received by the base station apparatuses 2021, 2031 and 2041. Respective signals received by the base station apparatuses 2021, 2031 and 2041 are combined by a maximum ratio combining point that is not shown in FIG. 6 (it corresponds to MRC-P305 in an example shown in FIG. 5). An operation of the above mentioned signal combining will be described with reference to FIGS. 8 to 13.

Figures 9, 10:
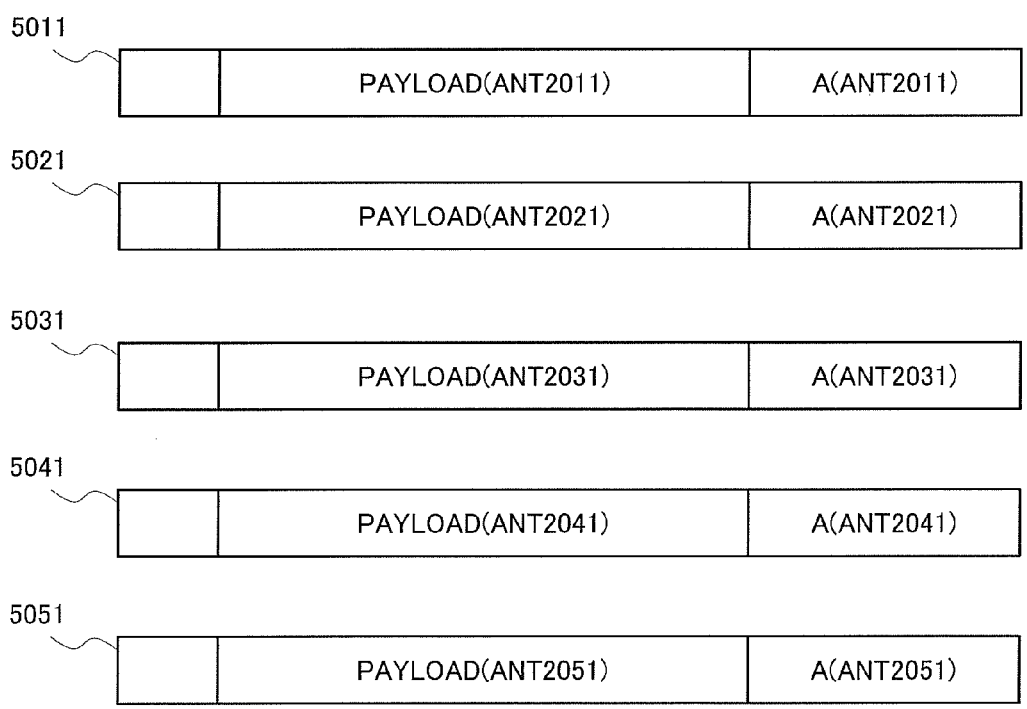
FIG. 9 is a figure illustrating a signal transmission route among the mobile terminal, the base station apparatus and the maximum ratio combining point in the situation shown in FIGS. 6 to 8.
FIG. 10 is a figure exemplifying a format of a data packet when each base station apparatus shown in FIG. 6 and FIG. 8 transmits to a network a signal received from the mobile terminal.

FIG. 8 is a configuration diagram showing a connection situation of a communication link between a base station apparatus and a mobile terminal exemplarily shown in FIGS. 6 and 7 from a view point of a network connection of a mobile communications system. FIG. 9 is a figure illustrating a signal transmission route among a mobile terminal, a base station apparatus and a maximum ratio combining point in the situation shown in FIGS. 6 to 8.

In FIG. 8, the base station apparatuses 2011, 2021, 2031, 2041 and 2051 shown in FIG. 6 are connected to the maximum ratio combining points 3051 to 3053 via for example, a bus type network (i.e. high speed line 1001). In an example shown in FIG. 8, the three maximum ratio combining points 3051 to 3053 are accommodated in an external apparatus which is arranged at a physically different location from locations where the base station apparatuses are arranged on the network. Further, a plurality of maximum ratio combining points can be accommodated to a plurality of external apparatuses, that is, not limited to one external apparatus as mentioned above.

In such system configuration, a connection relationship between the each mobile terminal and a base station apparatus and a maximum ratio combining point to which an output signal of the base station apparatus is transmitted is managed according to a figure (i.e. management table) shown in FIG. 9. That is, in FIG. 9, identification information of a mobile terminal, an identification number of a base station apparatus receiving a signal from the mobile terminal and identification information of a maximum ratio combining point which performs maximum ratio combining processing to a signal of the mobile terminal are associated with each other. The management table is dynamically managed by a radio network controller (307 or line connection controller) that is not shown in a system block diagram shown in FIG. 8.

Here, the radio network controller 307 is an apparatus which integrally controls operations of a plurality of base station apparatuses (2011, 2021, 2031, 2041 and 2051) to be managed. That is, the radio network controller dynamically updates a management table exemplified in FIG. 9 according to movement of mobile terminals in a coverage area of the each base station apparatus. The update operation is performed for example, at a predetermined time cycle. As a result, the each base station apparatus determines a base station apparatus by which a signal received from a mobile terminal is transmitted and a maximum ratio combining point to which the signal is transferred.

Further, the management table (FIG. 9) may be kept in for example, the radio network controller 307 and referred to by the five base station apparatuses according to the need.

In a system configuration shown in FIG. 8, with respect to a connection situation of a communication link shown in FIG. 6 and FIG. 7, the following judgment is performed.

That is, a signal from the mobile terminal 1011 is sent to the maximum ratio combining point 3051 via the base station apparatuses 2021, 2031 and 2041. Similarly, a signal from the mobile terminal 1012 is sent to the maximum ratio combining point 3052 via the base station apparatuses 2021, 2041 and 2051. A signal from the mobile terminal 1013 is sent to the maximum ratio combining point 3053 via the base station apparatuses 2041 and 2051. Then, the each maximum ratio combining point performs maximum ratio combining processing based on signals received from a plurality of base station apparatuses. In order to realize the most suitable maximum ratio combining processing, when receiving packet data flowing through the high speed line 1001, the each maximum ratio combining point refers to the management table shown in FIG. 9. Here, the packet data will be described with reference to FIG. 10.

FIG. 10 is a figure exemplifying a format of a data packet when each base station apparatus shown in FIG. 6 and FIG. 8 transmits a signal that is received from a mobile terminal to a network.

As mentioned above with reference to FIG. 1 and FIG. 3, a network forming a mobile communications system according to the exemplary embodiment uses a "broadcast function" as an example. The base station apparatuses 2011, 2021, 2031, 2041 and 2051 produce a data packet with the format exemplified in FIG. 10 and also transmit the produced data packet by a "broadcast function" based on a signal received from a mobile terminal.

More specifically, the data packet shown in FIG. 10 includes an address field and a payload field. The base station apparatuses 2011, 2021, 2031, 2041 and 2051 transmit data packets 5011, 5021, 5031, 5041 and 5051 to a network, respectively.

That is, the data packet 5011 transmitted by the base station apparatus 2011 includes a payload (ANT2011) and an address A (ANT2011). The base station apparatus 2011 generates digital data based on a wireless signal received from a mobile terminal and also sets the generated digital data in the payload (ANT2011).

Here, digital data generated by the each base station apparatus is the digital data which is obtained by applying only a demodulation to a received wireless signal by using an RF circuit or the like, and to which despread processing has not been applied yet. This is because, a series of a maximum ratio combining processing including despread processing is performed in a maximum ratio combining point based on the digital data. In the exemplary embodiment, as exemplified in FIG. 8, each base station apparatus and a maximum ratio combining point are arranged at geographically different locations and connected with each other via the high speed line 1001. The configuration of the base station apparatus differs from that of a base station apparatus such as a conventional sector base station.

Even when such system configuration is used, with respect to a transmission band (i.e. information capacity), the high speed line 1001 has to have a wide transmission band that is at least equal to or more than a transmission rate of code information transmitted in a wireless section in order to realize appropriate maximum ratio combining processing at a maximum ratio combining point. This condition should be satisfied regardless of the number of base station apparatuses and maximum ratio combining points accommodated in the high speed line 1001. Therefore, it is desirable that a transmission rate of the high speed line 1001 should assure a transmission rate that is several times of a transmission rate of code information transmitted in a wireless section.

As such broadband transmission line, for example, an optic fiber can be used. In the exemplary embodiment, for example, a technique of Radio on Fiber (RoF) can be employed in which a wireless signal is transmitted without changing its form in a broadband transmission line using an optic fiber.

The base station apparatus 2011 sets an address (i.e. identification information) that is assigned to an own apparatus in advance into an address A (ANT2011). As a result, the data packet 5011 transmitted with a "broadcast function" of the base station apparatus 2011 will be completed. By a similar procedure, four other base station apparatuses also produce data packet, respectively.

By referring to the management table shown in FIG. 9, the maximum ratio combining points (3051, 3052 and 3053) judge a data packet which should be taken in among data packets 5011, 5021, 5031, 5041 and 5051 which flow through the high speed line 1001, respectively. This judgment is carried out by performing a comparison between an address in an address field of each data packet and an identification number of a base station apparatus stored in the management table. The each maximum ratio combining point performs maximum ratio combining processing by referring to a payload included in a data packet which has been taken in, according to the above judgment. A series of the operations will be described with reference to FIGS. 11 to 13.

Figure 11:
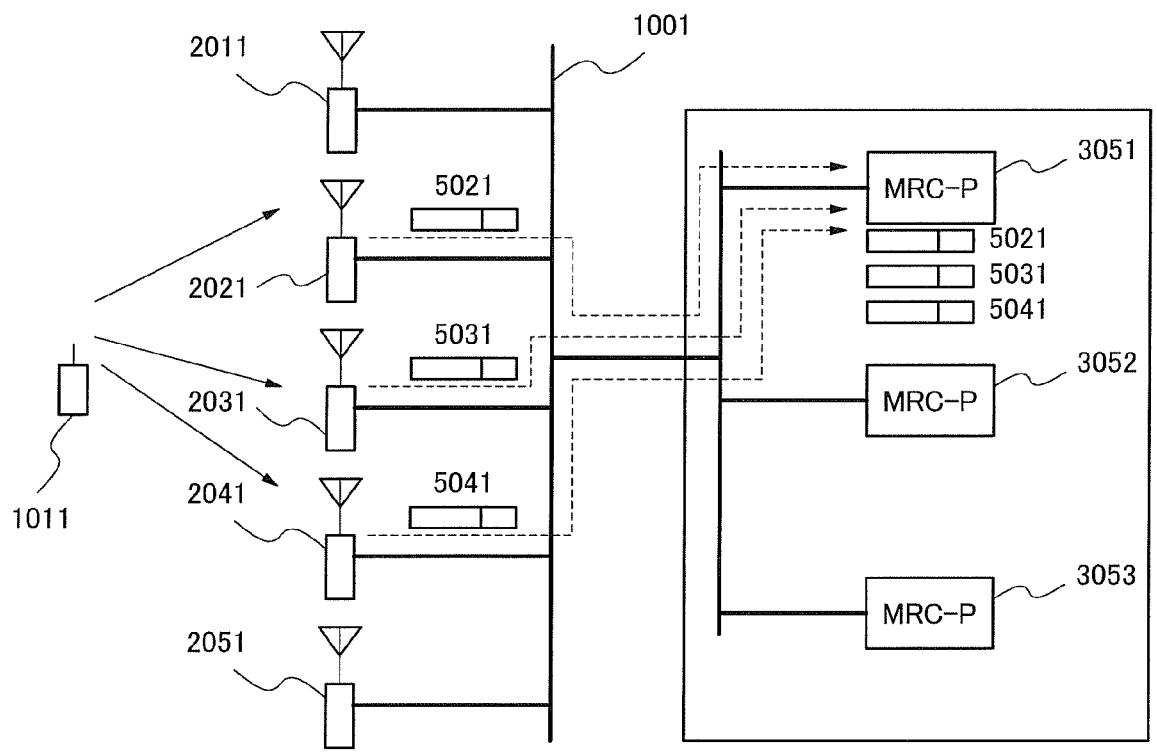
FIG. 11 is a figure illustrating the situation in which a signal received by each base station apparatus is taken in the specific maximum ratio combining point 3053 with respect to a connection relationship among the mobile terminal, the base station apparatus and the maximum ratio combining point shown in FIG. 6, FIG. 8 and FIG. 9.

Further, in a configuration diagram of each mobile communications system shown in FIG. 11 and in successive figures, in order to simplify a content of a drawing, the radio network controller (RNC) 307 is not shown. However, in an actual operation, the radio network controller 307 determines a final operation of each node in a mobile communications system.

FIG. 11 is a figure illustrating a situation in which a signal received by each base station apparatus is taken in the specific maximum ratio combining point 3053 with respect to a connection relationship among a mobile terminal, a base station apparatus and a maximum ratio combining point shown in FIG. 6, FIG. 8 and FIG. 9. That is, for convenience of explanation, FIG. 11 shows the situation in which only a signal from the mobile terminal 1011 is received by the each base station apparatus. Further, a case in which one base station apparatus receives signals from a plurality of mobile terminals is described below with reference to FIG. 13.

As shown in FIG. 9, the maximum ratio combining point 3051 is required to receive a signal transmitted from the mobile terminal 1011, from the base station apparatuses 2021, 2031 and 2041. Accordingly, the maximum ratio combining point 3051 takes in only data packets 5021, 5031 and 5041 that are transmitted with a broadcast function of the three base station apparatuses about the mobile terminal 1011 based on information in a management table shown in FIG. 9 as conceptually shown in FIG. 11. The maximum ratio combining points 3052 and 3053 similarly perform a series of such operations by referring to information in the management table although a data packet for these maximum ratio combining points is not shown in FIG. 11.

Here, an internal configuration of one of the maximum ratio combining points 3051, 3052 and 3053 mentioned above will be described with reference to FIG. 12.

Figure 12:
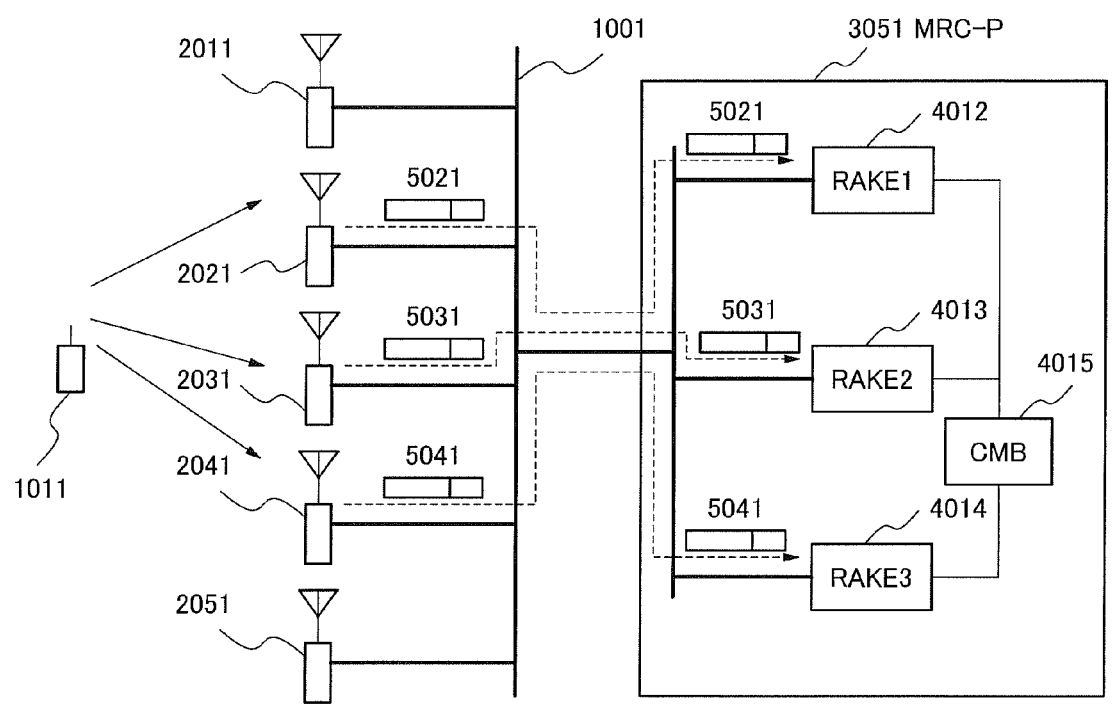
FIG. 12 is a block diagram showing an internal configuration of the maximum ratio combining point 3051 among three maximum ratio combining points shown in FIG. 11.

FIG. 12 is a block diagram showing an internal configuration of the maximum ratio combining point 3051 among three maximum ratio combining points shown in FIG. 11.

As shown in FIG. 12, the maximum ratio combining point 3051 includes as an example, three RAKE fingers 4012 to 4014 (RAKE1,RAKE2,RAKE3) and a maximum ratio combiner (CMB) 4015 therein. The RAKE fingers 4012, 4013 and 4014 are connected to the base station apparatuses 2021, 2031 and 2041, respectively. The each RAKE finger performs synchronous detection processing including despread processing based on digital data in a payload field of a data packet received from respective base station apparatuses. When signals from a plurality of mobile terminals are superimposed on the received digital data, the RAKE fingers 4012 to 4014 also discriminate a signal of a specific mobile terminal. The maximum ratio combiner 4015 performs a combining of signals from the mobile terminal 1011 by performing maximum ratio combining processing based on the output signals of the RAKE fingers 4012, 4013 and 4014. A general method can be used for the maximum ratio combining processing. Therefore, in the exemplary embodiment, a detailed description about maximum ratio combining processing itself will be omitted.

Figure 13:
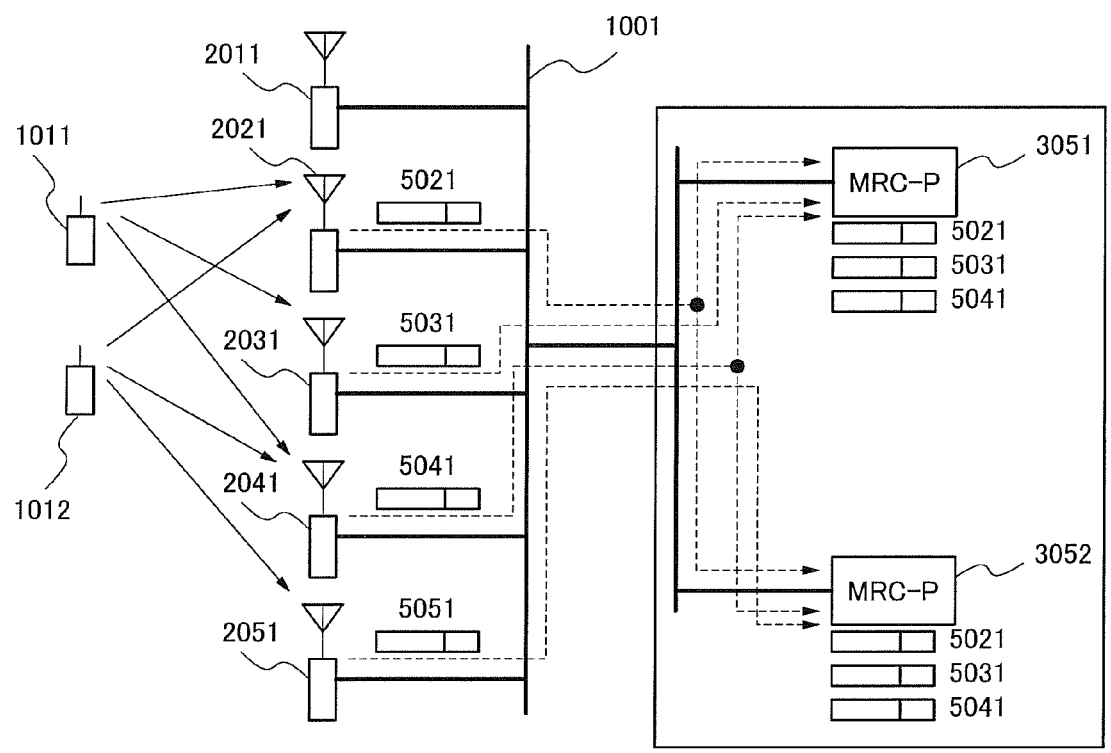
FIG. 13 is a figure illustrating a situation in which a signal received by each base station apparatus is taken in the specific maximum ratio combining points 3051 and 3052 with respect to a connection relationship among the mobile terminal, the base station apparatus and the maximum ratio combining point shown in FIG. 6, FIG. 8 and FIG. 9.

FIG. 13 is a figure illustrating a situation in which a signal received by each base station apparatus is taken in the specific maximum ratio combining points 3051 and 3052 with respect to a connection relationship among a mobile terminal, a base station apparatus and a maximum ratio combining point shown in FIG. 6, FIG. 8 and FIG. 9. In FIG. 13, signals from a plurality of mobile terminals are received by one base station apparatus. This is a difference between the state shown in FIG. 13 and the state shown in FIG. 11 mentioned above.

With respect to the mobile terminal 1011 and the mobile terminal 1012 shown in FIG. 13, a series of operations for a signal combining is also performed by referring to information in the management table shown in FIG. 9. That is, in FIG. 13, a signal transmitted from the mobile terminal 1011 and a signal transmitted from the mobile terminal 1012 are received by a plurality of base station apparatuses 2021, 2031, 2041 and 2051.

The base station apparatus 2021 produces a data packet 5021 based on signals received from the mobile terminal 1011 and the mobile terminal 1012. The base station apparatus 2021 transmits the produced data packet 5021 to the high speed line 1001. The base station apparatus 2031 produces a data packet 5031 based on a signal received from the mobile terminal 1011. The base station apparatus 2031 transmits the produced data packet 5031 to the high speed line 1001. Similarly, the base station apparatuses 2041 and 2051 also transmit produced data packets 5041 and 5051 to the high speed line 1001.

That is, in the state shown in FIG. 13, a signal in which signals from a plurality of mobile terminals 1011 and 1012 are superimposed reaches the base station apparatuses 2021 and 2041. This is a difference between the state shown in FIG. 13 and the state shown in FIG. 11. In such a case, the base station apparatuses 2021 and 2041 set digital data in which signals from a plurality of mobile terminals are superimposed into a payload field of a data packet to be produced. The base station apparatuses 2021 and 2041 transfer the data packet to the maximum ratio combining points 3051 and 3052. The maximum ratio combining points 3051 and 3052 independently perform processing for each mobile terminal using a plurality of RAKE fingers based on a received data packet as mentioned above with reference to FIG. 12.

More specifically, data packets in which signals from the mobile terminal 1011 and the mobile terminal 1012 are superimposed are a data packet 5021 and a data packet 5041. The data packets are distributed to both of the maximum ratio combining point 3051 which combines a signal of the mobile terminal 1011 and the maximum ratio combining point 3052 which combines a signal of the mobile terminal 1012 to be supplied to RAKE fingers provided in the respective maximum ratio combining points. Thus, the each base station apparatus uses information in the management table shown in FIG. 9 and as a result, a signal received by the each base station apparatus is taken in by a maximum ratio combining point which needs a signal received by the base station apparatus.

Next, an ideal case in which not only a maximum ratio combining point but also a selection combining point is connected to a network will be described with reference to FIGS. 14 to 22.

Figure 14:
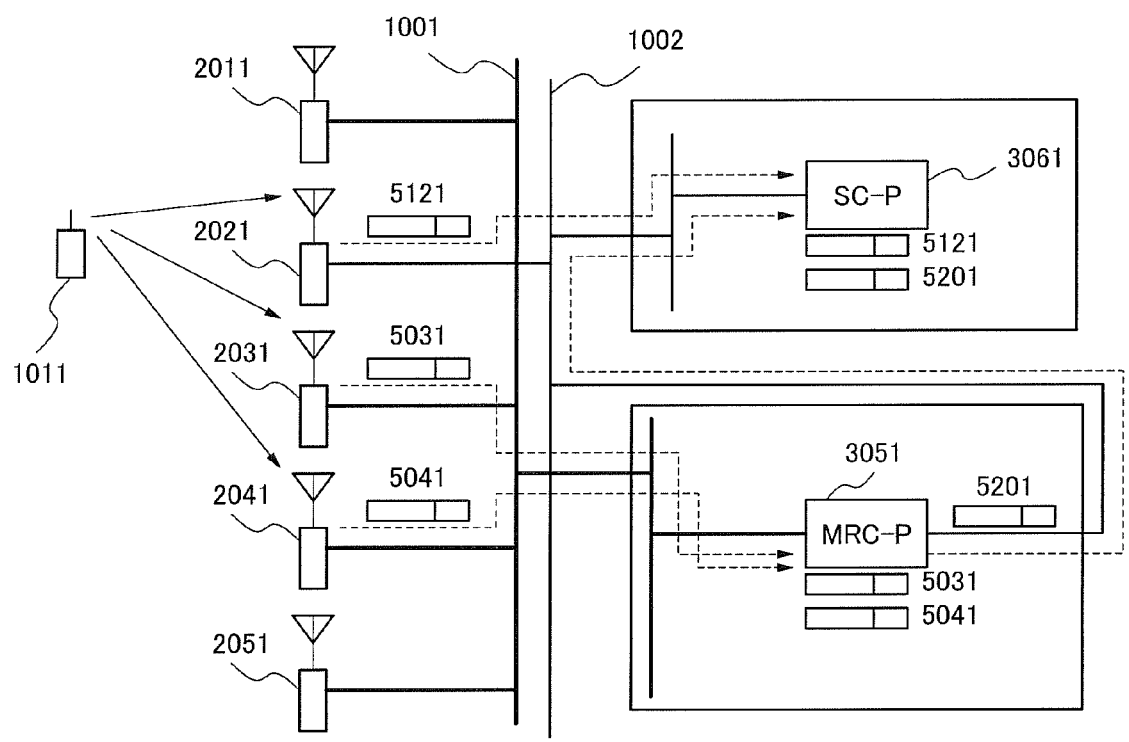
FIG. 14 is a figure illustrating a situation in which signals received by the base station apparatuses 2031 and 2041 are taken in by the specific maximum ratio combining points 3051 and then an output of the maximum ratio combining point and a signal received by the base station apparatus 2021 are taken in by the specific selection combining point 3061 with respect to a connection relationship among the mobile terminal, the base station apparatus and the maximum ratio combining point shown in FIG. 4, FIG. 6 and FIG. 9.

FIG. 14 is a figure illustrating a situation in which signals received by the base station apparatuses 2031 and 2041 are taken in by the specific maximum ratio combining points 3051 and then an output of the maximum ratio combining point and a signal received by the base station apparatus 2021 are taken in by a specific selection combining point 3061, with respect to a connection relationship among a mobile terminal, a base station apparatus and a maximum ratio combining point shown in FIG. 4, FIG. 6 and FIG. 9.

In an example described above with reference to FIG. 11, only a maximum ratio combining point combines signals from a mobile terminal. In contrast, in an example shown in FIG. 14, in a system configuration of a mobile communications system, a maximum ratio combining point and a selection combining point coexist on a network. That is, in the example shown in FIG. 14, not only a signal combining is performed to a signal from a mobile terminal by the maximum ratio combining point (MRC-P), but also a signal combining is further performed using the combined signal and a signal received by another base station apparatus by a selection combining point (SC-P).

Here, in order to make a description of FIG. 14 easy, it is assumed that signals from the base station apparatuses 2031 and 2041 can be sent to the maximum ratio combining point 3051 and meanwhile, a signal from the base station apparatus 2021 cannot be sent to the maximum ratio combining point 3051.

Figures 15, 16:
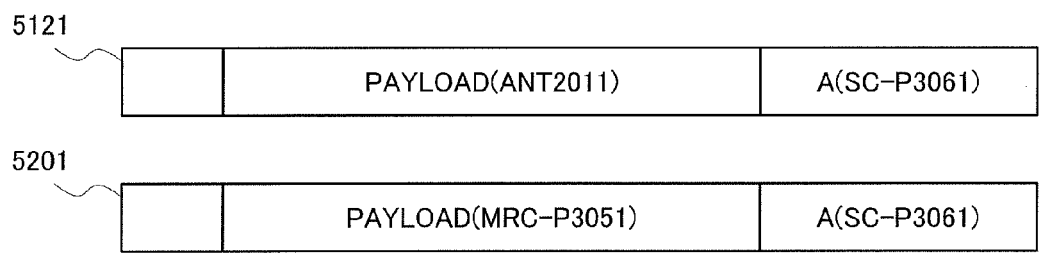
FIG. 15 is a figure showing a signal destination in a connection situation shown in FIG. 14.
FIG. 16 is a figure showing a format of a data packet for sending a signal of the mobile terminal to the maximum ratio combining point and a selection combining point via the base station apparatus.

FIG. 15 shows a signal destination in a connection situation shown in FIG. 14. A basic configuration of a management table shown in FIG. 15 is equal to a configuration of the management table shown in FIG. 9 mentioned above and moreover, information about the selection combining point (SC-P) is included. This is a difference between a configuration of the management table shown in FIG. 15 and a configuration of the management table shown in FIG. 9. That is, by using FIG. 15, it is known which output signal of a base station apparatus should be used for maximum ratio combining processing among output signals of base station apparatuses which receive a signal from a mobile terminal. Moreover, by using FIG. 15, a processing result of maximum ratio combining processing and an output signal of a base station apparatus that should be used for selection combining processing can be known.

More specifically, in a distribution state shown in FIG. 6, a signal transmitted from the mobile terminal 1011 has been received by a plurality of base station apparatuses 2021, 2031 and 2041. An example (i.e. management table) shown in FIG. 15 that is corresponding to the above distribution state represents the following state.

That is, the base station apparatuses 2031 and 2041 receive a signal from the mobile terminal 1011. The base station apparatus 2031 and 2041 transmit a data packet corresponding to a received signal to the maximum ratio combining point 3051. On the other hand, the base station 2021 receives a signal from the mobile terminal 1011. The maximum ratio combining point 3051 transmits a signal that is a combining result to the selection combining point 3061. The base station apparatus 2021 transmits a data packet corresponding to a received signal to the selection combining point 3061.

FIG. 16 shows a format of a data packet for sending a signal of a mobile terminal to a maximum ratio combining point and a selection combining point via a base station apparatus.

In FIG. 16, a data packet 5121 shows a packet used in a case in which a signal from the mobile terminal 1011 that is received by the base station apparatus 2011 is sent to the selection combining point 3061. A data packet 5201 shows a packet used in a case in which a result of a signal combining by the maximum ratio combining point 3051 is sent to the selection combining point 3061.

Further, the maximum ratio combining point 3051 performs maximum ratio combining processing before producing the data packet 5201. The maximum ratio combining point 3051 performs maximum ratio combining processing with respect to the mobile terminal 1011 by using the data packets 5031 and 5041 which are produced by the base station apparatuses 2031 and 2041 according to a procedure mentioned above with reference to FIG. 9 and FIG. 10.

Considering the above data packets 5121 and 5201, the state in which a signal from the mobile terminal 1011 is transferred to a base station apparatus, a maximum ratio combining point and a selection combining point is described with reference to FIG. 14.

In FIG. 14, a signal transmitted from the mobile terminal 1011 is received by the plurality of base station apparatuses 2021, 2031 and 2041. The base station apparatus 2031 produces the data packet 5031 and transmits the produced data packet to the high speed line 1001. Similarly, the base station apparatus 2041 transmits the produced data packet 5041 to the high speed line 1001. The maximum ratio combining point 3051 receives the data packets 5031 and 5041 with the same procedure as described in the case of the management table shown in FIG. 9 mentioned above. The maximum ratio combining point 3051 performs maximum ratio combining processing by using three RAKE fingers or the like shown in FIG. 12. The maximum ratio combining point 3051 produces the data packet 5201 mentioned above based on a processing result of the maximum ratio combining processing and transmits the produced data packet to the low speed line 1002. The selection combining point 3061 receives the data packet 5201 by referring to the management table shown in FIG. 15 with the same procedure as described in the case of the management table shown in FIG. 9 mentioned above.

On the other hand, a data packet 5121 produced by the base station apparatus 2021 is transmitted to the low speed line 1002. The selection combining point 3061 receives the data packet 5121 by referring to the management table shown in FIG. 15 with the same procedure as described in the case of the management table shown in FIG. 9 mentioned above.

The selection combining point 3061 performs selection combining processing using the data packets 5201 and 5121 as an input signal.

A data packet produced by each base station apparatus may be transmitted by appropriately changing its destinations to a maximum ratio combining point and to a selection combining point according to a distribution state of mobile terminals in a coverage area of each base station apparatus or a construction or a dismantlement of a structure located around each coverage area. In this case, a destination of a data packet produced by the respective base station apparatuses needs to be changed to a maximum ratio combining point or a selection combining point while a user makes a telephone call by using a mobile terminal (that is, while the data packet is constantly transferred). Accordingly, in the following description, a case in which such change is performed will be described.

(Change from the Selection Combining (SC) to a Maximum Ratio Combining (MRC))

First, a case in which such change is realized will be described using FIG. 14 and FIGS. 17 to 19. Further, FIG. 14 and FIGS. 17 to 19 exemplify a change process in which a destination of a signal from a base station apparatus is changed from the selection combining (SC) to a maximum ratio combining (MRC).

That is, in the above mentioned situation shown in FIG. 14, maximum ratio combining processing is applied to a signal received by the base station apparatuses 2031 and 2041, and selection combining processing is applied to a result of the maximum ratio combining processing and a signal received by the base station apparatus 2021. In the following description, the situation mentioned above, a situation shown in FIG. 17 and FIG. 18 and a final situation shown in FIG. 19 will be described. In this case, in the situation shown in FIG. 19, with respect to a signal of the mobile terminal 1011, maximum ratio combining processing is performed based on signals received by the base station apparatuses 2021, 2031 and 2041. Hereinafter, a series of transitions will be described in order.

Figure 17:
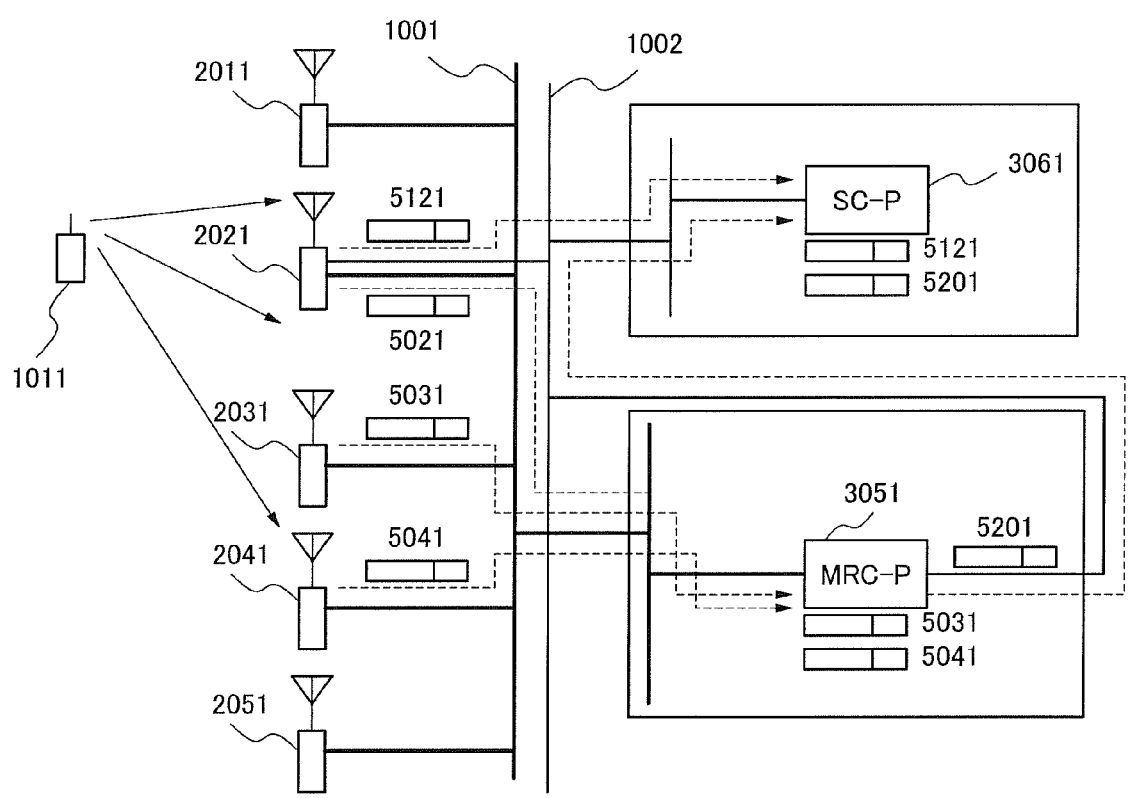
FIG. 17 is a figure showing a situation in which the data packet 5121 which should be transferred to the selection combining point 3061 and the data packet 5021 which should be transferred to the maximum ratio combining point 3051 are transmitted from the base station apparatus 2021.

FIG. 17 is a figure showing a situation in which the data packet 5121 to be transferred to the selection combining point 3061 and a data packet 5021 to be transferred to the maximum ratio combining point 3051 are transmitted from the base station apparatus 2021.

In the situation shown in FIG. 14, the base station apparatus 2021 transmits only the data packet 5121. In contrast, in FIG. 17, the base station apparatus 2021 produces the data packet 5121 subsequently and also produces the data packet 5021 to be transferred to the maximum ratio combining point 3051. The base station apparatus 2021 itself judges whether or not both of the data packet 5021 and the data packet 5121 should be produced based on a change control using a threshold value. This change control will be described below with reference to FIG. 25 and successive figures. In the situation, the data packet 5021 is transferred with the broadcast function mentioned above to a connection end of the maximum ratio combining point 3051.

However, at this time, the maximum ratio combining point 3051 does not take in the data packet 5021 yet. That is, the maximum ratio combining point 3051 performs a maximum ratio combining using only signals from the base station apparatuses 2031 and 2041 mentioned above with reference to FIG. 14 and also transfers the produced data packet 5201 to the selection combining point 3061. An operation state at this time is the same as that of the situation shown in FIG. 14. That is, the selection combining point 3061 takes in the data packets 5121 and 5201. On the other hand, the maximum ratio combining point 3051 takes in the data packets 5031 and 5041.

Figure 18:
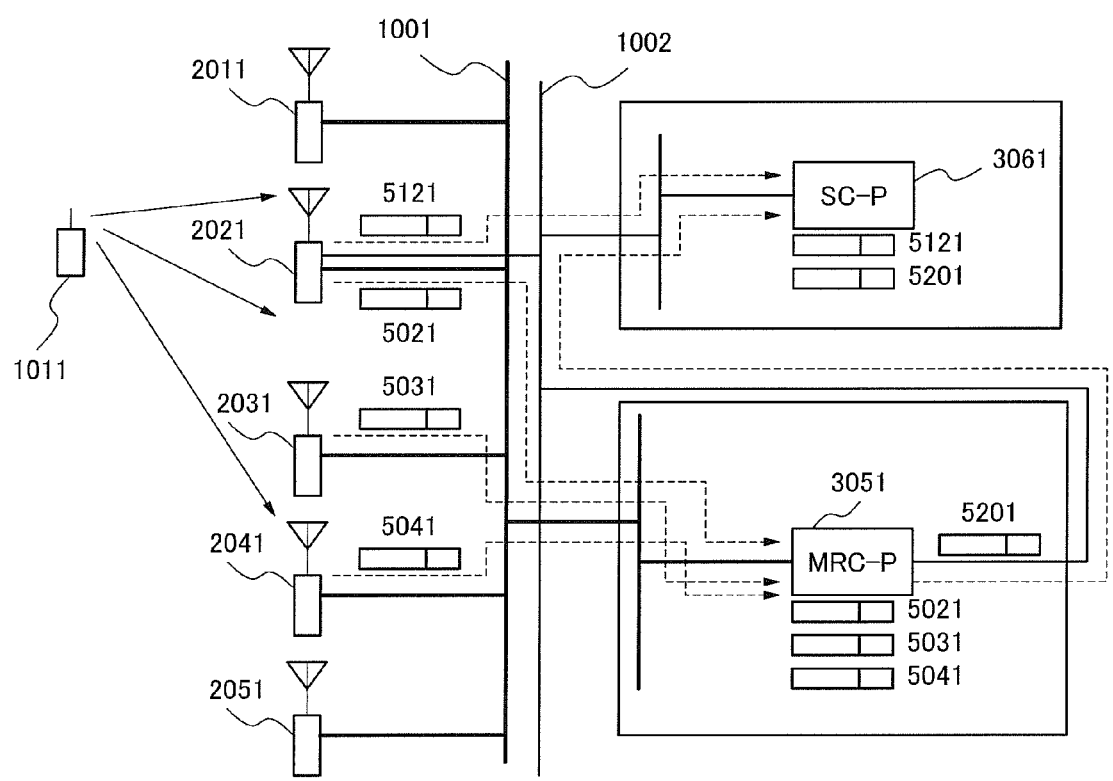
FIG. 18 is a figure showing a situation until the data packet 5021 is taken in the maximum ratio combining point 3051 from the situation shown in FIG. 17.

FIG. 18 is a figure showing a situation until the data packet 5021 is taken in the maximum ratio combining point 3051 from the situation shown in FIG. 17.

In the situation shown in FIG. 18, the maximum ratio combining point 3051 starts to take in the data packet 5021 from the base station apparatus 2021 in order to become operable, after referencing the management table. The maximum ratio combining point 3051 performs maximum ratio combining processing using three signals from the base station apparatuses 2021, 2031 and 2041 by taking in the data packet 5021. As a result, the maximum ratio combining point 3051 produces the data packet 5201 and transfers the produced data packet to the selection combining point 3061. According to the processes, the selection combining point 3061 takes in the data packets 5021 and 5201. On the other hand, the maximum ratio combining point 3051 takes in the data packets 5021, 5031 and 5041.

Figure 19:
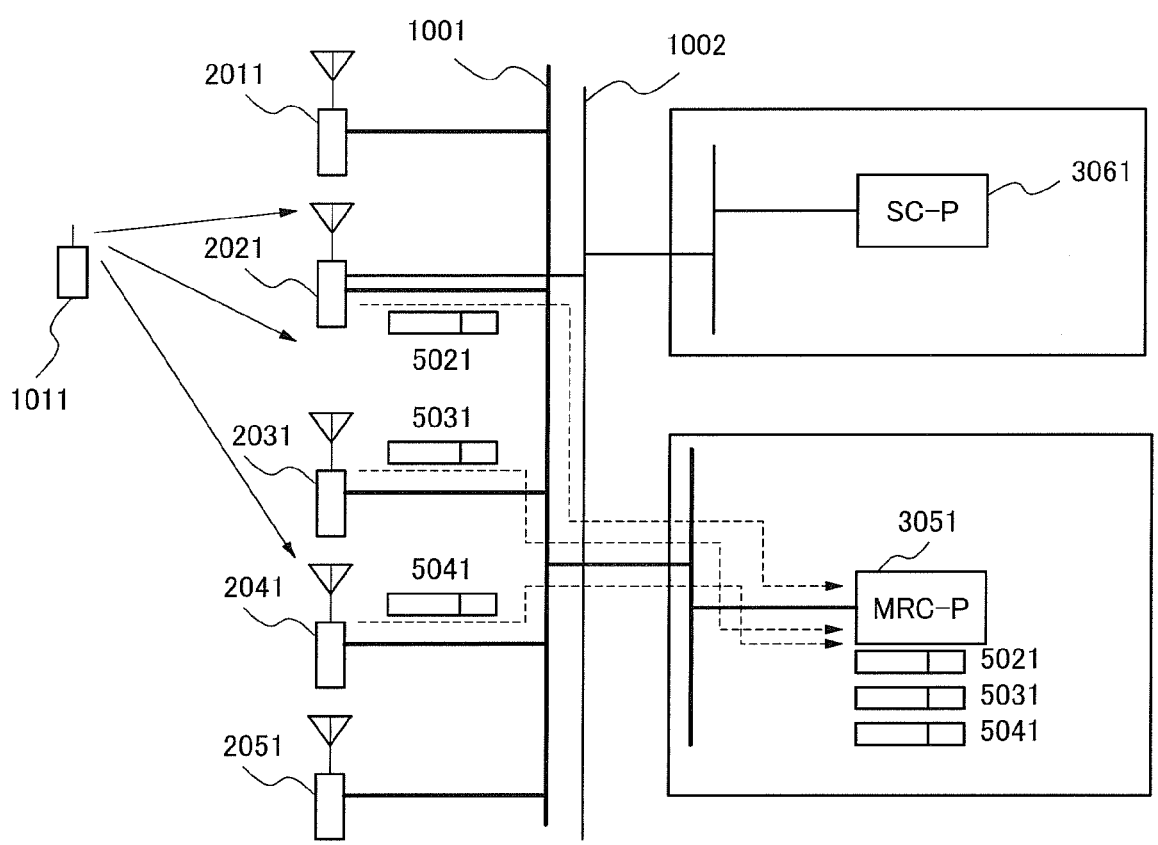
FIG. 19 is a figure showing a situation until a use of the selection combining point is stopped from the situation shown in FIG. 18.

FIG. 19 is a figure showing a situation until a use of a selection combining point is stopped from the situation shown in FIG. 18.

In the situation shown in FIG. 18 mentioned above, signals of base station apparatuses (that is, each signal from the base station apparatuses 2021, 2031 and 2041) to be combined by the maximum ratio combining point 3051 are taken in the maximum ratio combining point 3051. For this reason, the base station apparatus 2021 does not need to send the data packet 5121 to the selection combining point 3061. The base station apparatus 2021 stops a production and transfer of the data packet 5121 according to a judgment result that is judged by the radio network controller 307 in consideration of "change request processing" that is described below with reference to FIG. 25 and successive figures and "operation change control" based on the change request processing.

Here, the judgment result is a judgment showing that selection combining processing is unnecessary (release request of MRC setting).

The maximum ratio combining point 3051 does not need to send the data packet 5201 to the selection combining point 3061. That is, at this time, the base station apparatus 2021 stops a production and transfer of the data packet 5121. The maximum ratio combining point 3051 stops a production and transfer of the data packet 5201. As a result, the selection combining point 3061 becomes unused.

Here, the following procedure is used to stop a production and transfer of the data packet as mentioned above. That is, by referring to a management table shown in FIG. 15, the maximum ratio combining point 3051 and the selection combining point 3061 can operate in cooperation with each other. Accordingly, the maximum ratio combining point 3051 starts maximum ratio combining processing according to a confirmation of a reception of all data packets with respect to the base station apparatuses 2021, 2031 and 2041 and also notifies the selection combining point 3061 of information showing that a data packet from the base station apparatus 2021 is not needed anymore. This notification is delivered through for example, a control line not shown in FIG. 19 or other figures (i.e. a control line 10005 shown in FIG. 25).

(Change from a Maximum Ratio Combining (MRC) to the Selection Combining (SC))

Next, in order to change a combining method from a maximum ratio combining (MRC) to the selection combining (SC), a destination of a signal from a certain base station apparatus is changed to the selection combining point 3062. This change process will be described with reference to FIGS. 20 to 22.

Figure 20:
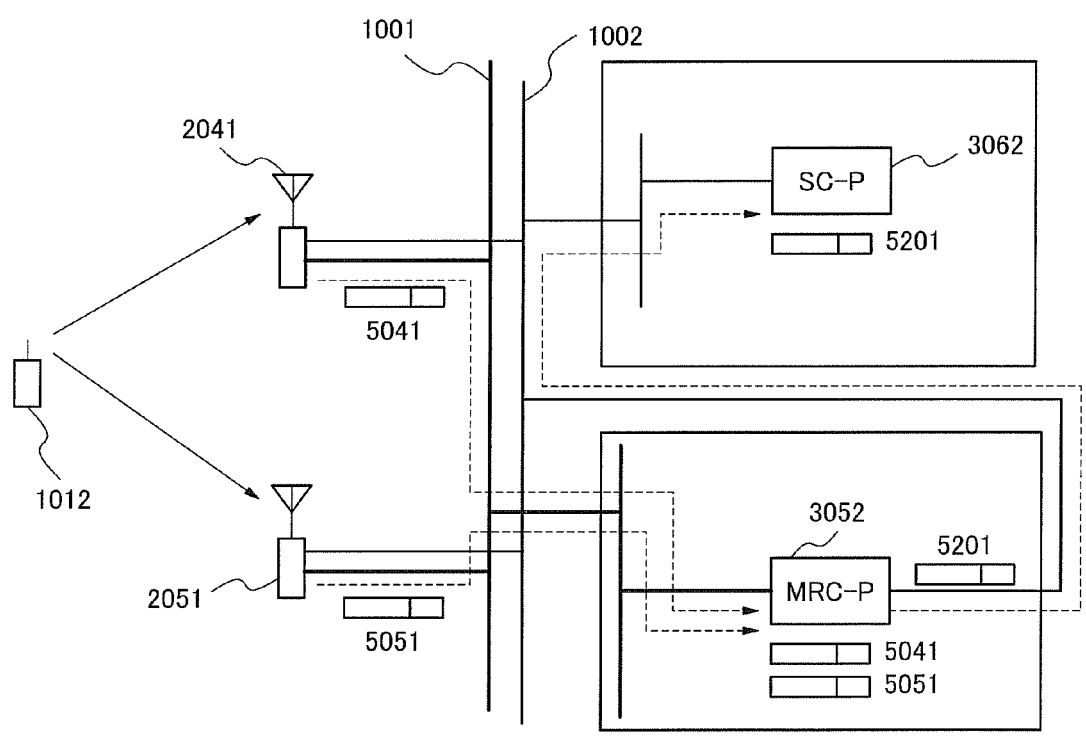
FIG. 20 is a figure showing a situation in which maximum ratio combining processing is performed based on a signal of the mobile terminal 1012 that is received by the base station apparatuses 2041 and 2051.
Figure 21:
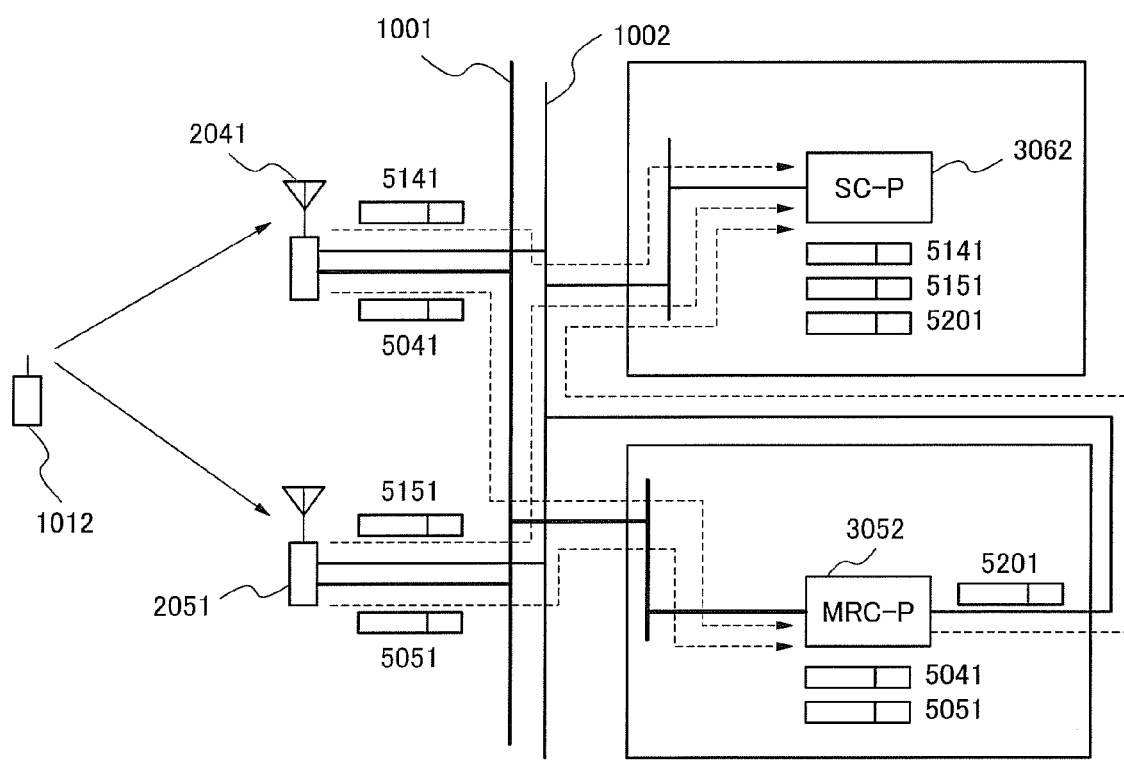
FIG. 21 is a figure showing a situation in which the base station apparatuses 2041 and 2051 produce data packets 5041 and 5051 which should be transferred to the maximum ratio combining point 3052 and data packets 5141 and 5151 which should be transferred to a selection combining point 3062.
Figure 22:
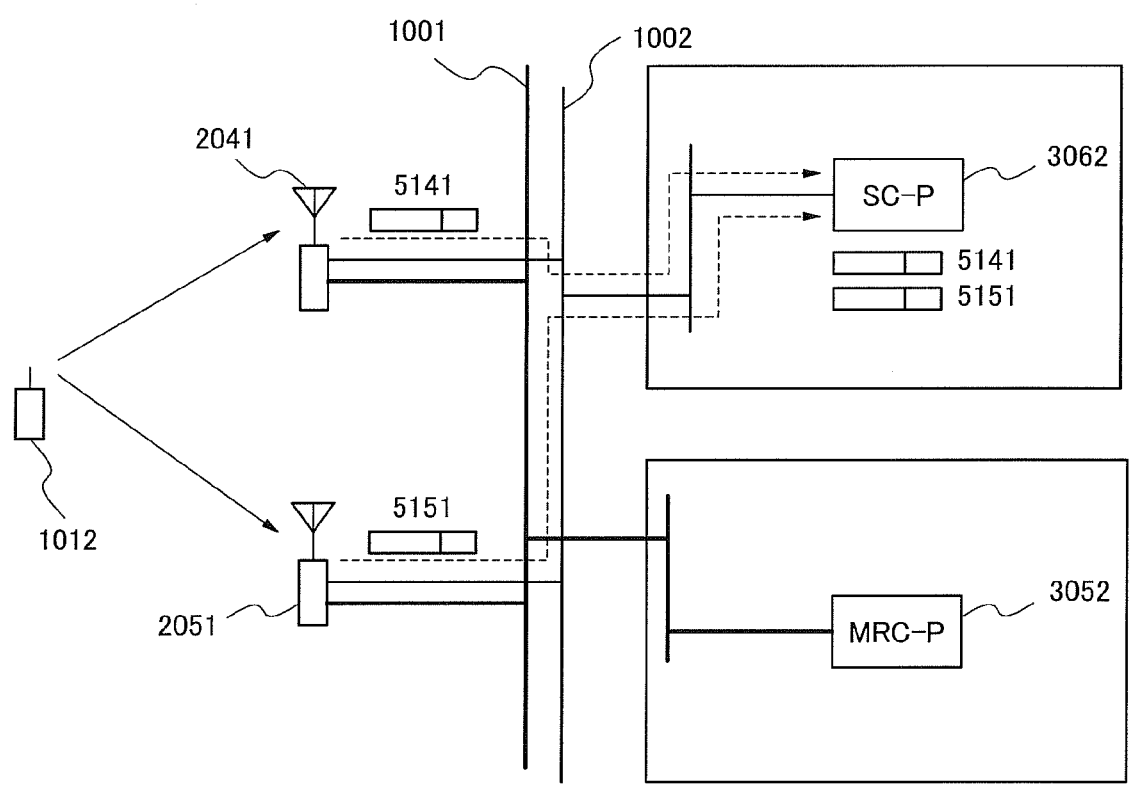
FIG. 22 is a figure showing a situation until a use of the maximum ratio combining point is stopped from the situation shown in FIG. 20.

More specifically, the base station apparatus 2041 and the base station 2051 that receive a signal of the mobile terminal 1012 outputs a data packet. FIGS. 20 to 22 exemplarily show a case in which a destination of the data packet outputted from the base station apparatuses is changed from the maximum ratio combining point 3052 to the selection combining point 3062.

FIG. 20 shows a situation in which maximum ratio combining processing is performed based on a signal of the mobile terminal 1012 that is received by the base station apparatuses 2041 and 2051.

In a situation shown in FIG. 20, a signal of the mobile terminal 1012 is received by the base station apparatuses 2041 and 2051. The base station apparatuses 2041 and 2051 produce the data packets 5041 and 5051 to be transferred to the maximum ratio combining point 3052 based on a received signal. The data packets are also transmitted to the high speed line 1001 with a broadcast notification like the case mentioned above. The maximum ratio combining point 3052 performs an acquisition of the data packets 5041 and 5051 and maximum ratio combining processing by the same procedure as mentioned above.

At this time, the maximum ratio combining point 3052 and the selection combining point 3062 are connected with each other via the low speed line 1002. The data packet 5201 is transferred from the maximum ratio combining point 3052 to the selection combining point 3062 like the case shown in FIG. 17.

FIG. 21 is a figure showing a situation in which the base station apparatuses 2041 and 2051 produce data packets 5041 and 5051 to be transferred to the maximum ratio combining point 3052 and data packets 5141 and 5151 to be transferred to a selection combining point 3062.

As shown in FIG. 21, the base station apparatus 2041 produces point 3062 in addition to the data packet 5041 in the situation shown in FIG. 20. The base station apparatus 2041 transmits the data packets 5041 and 5141 to the high speed line 1001. Similarly, the base station apparatus 2051 produces the data packet 5151 to be transferred to the selection combining point 3062 in addition to the data packet 5051 in the situation shown in FIG. 20. The base station apparatus 2051 transmits the data packets 5051 and 5151 to the high speed line 1001. The base station apparatuses 2041 and 2051 itself judges whether or not both of the data packets 5021, 5121 and the data packets 5051, 5151 should be produced based on a change control using a threshold value. The change control will be described later with reference to FIG. 25 and successive figures.

In the situation shown in FIG. 20, the selection combining point 3062 determines that it is not necessary to take in any data packet from a base station apparatus. This determination is also performed by referring to a management table mentioned above. In contrast, according to a change of content by an updating of the management table, a situation is transferred to the situation shown in FIG. 21. That is, the selection combining point 3062 starts to take in the data packets 5141 and 5151. The selection combining point 3062 starts to perform selection combining processing using the data packets 5141 and 5151.

FIG. 22 is a figure showing a situation until a use of a maximum ratio combining point is stopped from the situation shown in FIG. 20.

In the situation shown in FIG. 21, the selection combining point 3062 instructs the maximum ratio combining point 3052 to stop an operation by confirming that the data packets 5141 and 5151 are normally received and selection combining processing is started. Moreover, the base station apparatus 2041 and 2051 stop a production and transfer of the data packets 5041 and 5051 according to a judgment result that is judged by the radio network controller 307 in consideration of "change request processing" that will be described later with reference to FIG. 25 and successive figures and "operation change control" based on the change request processing. Here, the judgment result indicates that selection combining processing is unnecessary (i.e. release request of MRC setting).

By applying a procedure described above, in the exemplary embodiment, in a mobile communications system in which the selection combining point (SC-P) and the maximum ratio combining point (MRC-P) are used, the selection combining (SC) and a maximum ratio combining (MRC) are dynamically changed.

Next, dynamic change processing which is performed based on a change procedure mentioned above in many base station apparatuses which form a large service area will be described with reference to FIG. 23 and FIG. 24.

Figure 23:
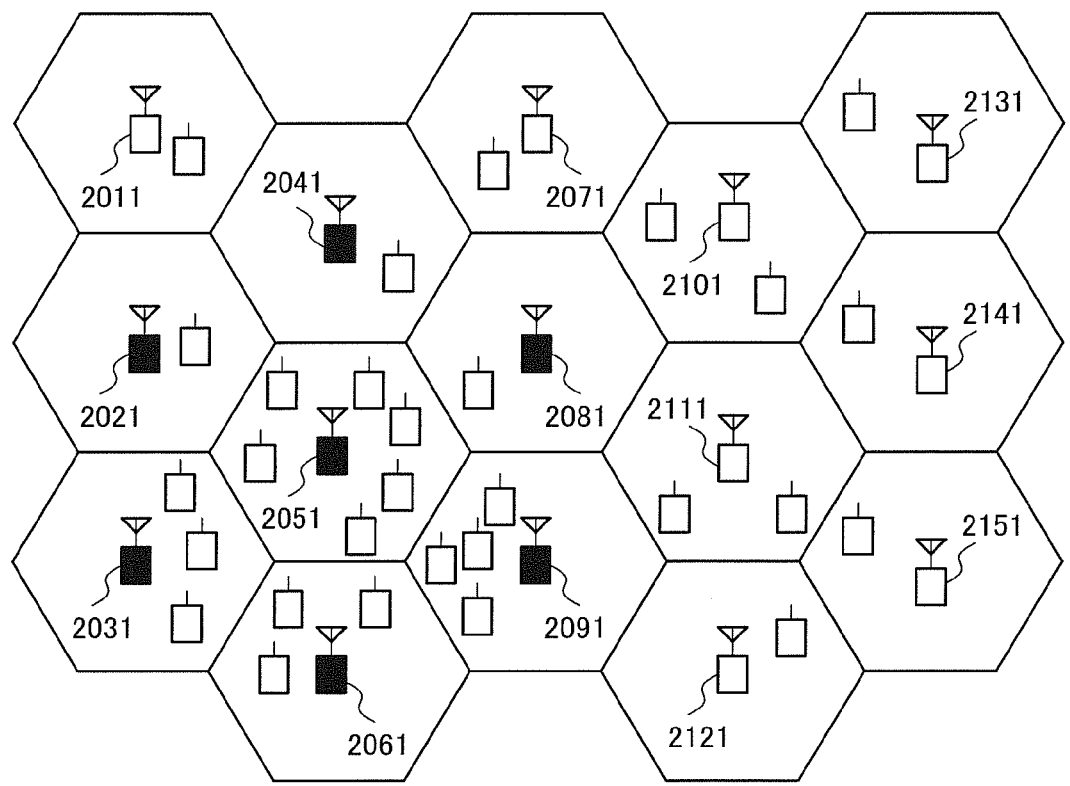
FIG. 23 is a figure showing a distribution of the mobile terminal under communication at a certain time (t1)

FIG. 23 is a figure showing a distribution of a mobile terminal under communication (i.e. a mobile terminal which is busy) at a time (t1). FIG. 24 is a figure showing a distribution of a mobile terminal under communication at a different time (t2).

Figure 24:
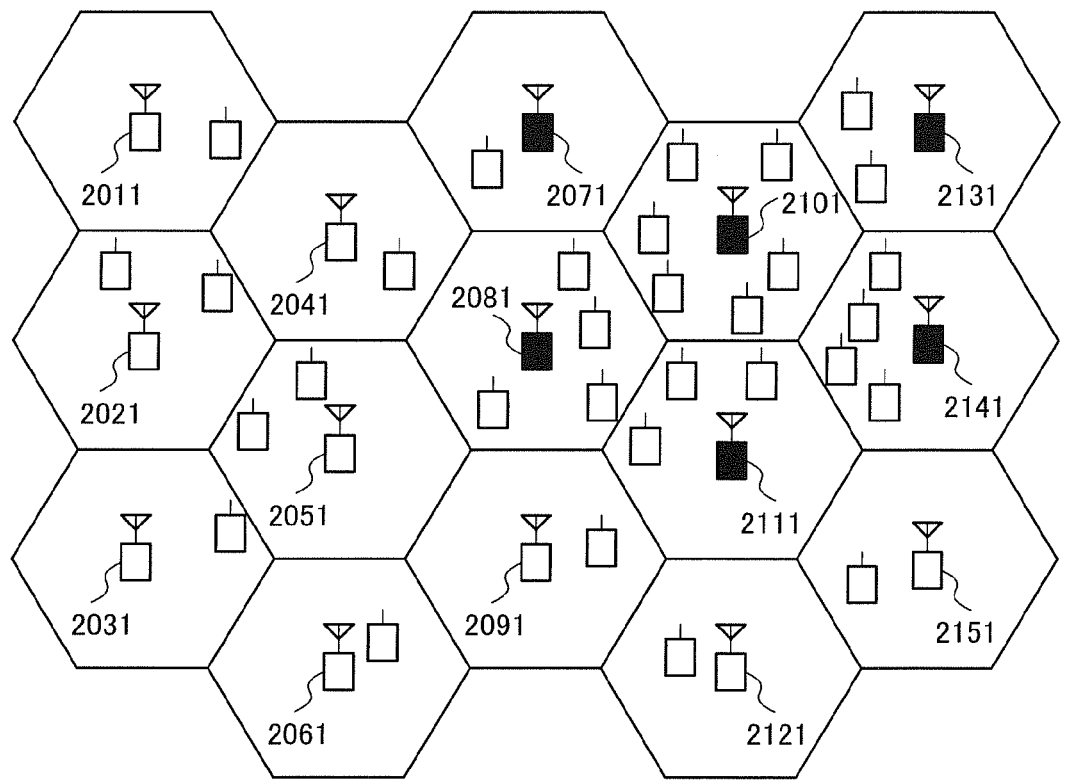
FIG. 24 is a figure showing a distribution of the mobile terminal under communication at a different time (t2)

In FIG. 23 and FIG. 24, fifteen base station apparatuses 2011, 2021, 2031, 2041, 2051, 2061, 2071, 2081, 2091, 2101, 2111, 2121, 2131, 2141 and 2151 form a base station area (service area). In FIG. 23 and FIG. 24, each regular hexagon schematically represents a base station area formed by one base station apparatus. The each base station apparatus supports a wireless communication performed by a mobile terminal located in a coverage area of an own apparatus. In FIG. 23 and FIG. 24, a reference mark is not given to each mobile terminal from convenience of expression in a drawing. However, mobile terminals are distributed in a coverage area of the each base station apparatus as shown in FIG. 23 and FIG. 24.

Further, in FIG. 23 and FIG. 24, a base station apparatus which is colored in black is a base station apparatus which selects a maximum ratio combining (MRC).

As shown in FIG. 23, suppose that at the time (t1), in a coverage area of each base station apparatus, a mobile terminal is under communication as below. That is, in each coverage area of the base station apparatuses 2011, 2021, 2041, 2071, 2081, 2091, 2121, 2131, 2141 and 2151, one mobile terminal is under communication. In each coverage area of the base station apparatuses 2101 and 2111, two mobile terminals are under communication. In each coverage area of the base station apparatuses 2031 and 2061, three mobile terminals are under communication. In a coverage area of the base station apparatus 2051, six mobile terminals are under communication.

When overlooking (bird's eye view) the situation shown in FIG. 23, it is observed that many mobile terminals are distributed in and around a coverage area of base station area 2051. Generally, with respect to signals of base station apparatuses which are arranged at geographically different locations, as mentioned above in "BACKGROUND ART", maximum ratio combining is not applied and selection combining processing is applied. In contrast, in a mobile communications system according to the exemplary embodiment, a plurality of base station apparatuses which are arranged at geographically different locations and the maximum ratio combining point (MRC-P) are connected with each other by a broadband communication line that is not shown in FIG. 23 (it corresponds to the high speed line 1001 mentioned above). By using such system configuration, in the exemplary embodiment, maximum ratio combining processing can be performed between arbitrary base station apparatuses.

It has been known that there is a difference in a reception efficiency between the selection combining (SC) and a maximum ratio combining (MRC) when a signal transmitted from a mobile terminal is received in a communication line from the mobile terminal to a base station apparatus (that is, an up link). That is, a reception by a maximum ratio combining (MRC) excels in reception efficiency. Thus, a transmission power that assures the same quality (i.e. bit error rate) can be reduced. It means that a channel capacity of an up link in a cell in which a mobile terminal exists can be increased by reducing a transmission power of a mobile terminal. This is one of the reasons that a maximum ratio combining is used between base station apparatuses which are arranged at geographically different locations in the exemplary embodiment.

By the reason mentioned above, in the distribution situation shown in FIG. 23, suppose that a reception using a maximum ratio combining (MRC) is selected between the base station apparatus 2051 and the base station apparatuses 2021, 2031, 2041, 2061, 2081 and 2091 that are adjacent to the base station apparatus 2051 at the time (t1). According to the exemplary embodiment, a transmission power of a mobile terminal located in each coverage area of such a plurality of base station apparatuses can be reduced. As a result, since an interference power to other mobile terminals can be reduced, a communication with more mobile terminals can be realized in comparison to a case of the selection combining (SC).

Next, as shown in FIG. 24, in a coverage area of each base station apparatus at another time (t2), a distribution situation of a mobile terminal is changed from the distribution situation at the time (t1) mentioned above and the following mobile terminals are under communication.

That is, in each coverage area of the base station apparatuses 2011, 2031, 2041, 2061, 2071, 2091, 2121 and 2151, one mobile terminal is under communication. In each coverage area of the base station apparatuses 2021, 2051 and 2131, two mobile terminals are under communication. In a coverage area of the base station apparatus 2111, three mobile terminals are under communication. In each coverage area of the base station apparatuses 2081 and 2141, four mobile terminals are under communication. In a coverage area of the base station apparatus 2101, seven mobile terminals are under communication.

When overlooking (bird's eye view) the situation shown in FIG. 24 like the case shown in FIG. 23, many mobile terminals are distributed in and around a coverage area of the base station area 2101. In this case, by the same reason as the case mentioned above with reference to FIG. 23, maximum ratio combining (MRC) is performed between the base station apparatus 2101 and the base station apparatuses 2071, 2081, 2111, 2131 and 2141 that are adjacent to the base station apparatus 2101. That is, base station apparatuses using maximum ratio combining (MRC) changes continuously, for example, from the state shown in FIG. 23 to the state shown in FIG. 24. A change process performed during the change will be described later with reference to FIG. 25 and successive figures.

In the state shown in FIG. 24, a plurality of base station apparatuses to which a maximum ratio combining is selected can obtain the same effect as mentioned above. Therefore, according to the exemplary embodiment, since an interference power to other mobile terminals can be reduced, a communication with more mobile terminals can be realized in comparison to a case of the selection combining (SC).

A change of a distribution state of mobile terminals as exemplified in FIG. 23 and FIG. 24 is usually occurred in a mobile communications system in which each mobile terminal moves with a user every moment. For example, a distribution state of mobile terminals changes greatly by the following external factors as exemplarily shown below. That is:

a certain time in a day, for example, during working time and after working time;

week day and weekend or holiday;

Monday to Friday and Saturday or Sunday; or an event or entertainment held temporarily to which a large number of users will be expected to gather.

That is, it is very desirable to reduce a transmission power of a mobile terminal by applying maximum ratio combining processing to all base station apparatuses because it allows increase of the number of mobile terminals which can be accommodated, increase of the number of mobile terminals which can perform a communication at the same time and improvement of a data transfer rate. However, it is difficult to apply maximum ratio combining processing to all base station apparatuses from a view point of a consumption band of a backbone line. Accordingly, in the exemplary embodiment, maximum ratio combining processing is applied aggressively to only a base station apparatus which includes many mobile terminals in coverage area thereof and maximum ratio combining processing is not applied to the other base station apparatuses.

Accordingly, a communication system including many mobile terminals can be realized by dynamically applying maximum ratio combining processing to a base station apparatus to process a transmission signal of a plurality of mobile terminals according to a change in a distribution state of mobile terminals by considering various external factors (surrounding circumstances such as whether or not an event is held, difference in the time or the day of the week etc.) mentioned above.

Further, a change process will be described later with reference to FIG. 25 and successive figures.

<Change Request Processing in a Base Station Apparatus>

Hereinafter, an apparatus configuration for performing dynamic change between maximum ratio combining processing (MRC) and selection combining processing (SC) mentioned above will be described. In the exemplary embodiment, each base station apparatus performs change request processing described below in order to realize a dynamic change operation mentioned above.

(Configuration of a Base Station Apparatus)

First, a configuration of a base station apparatus which is connected to a mobile communications system in a description mentioned above will be described.

Figure 25:
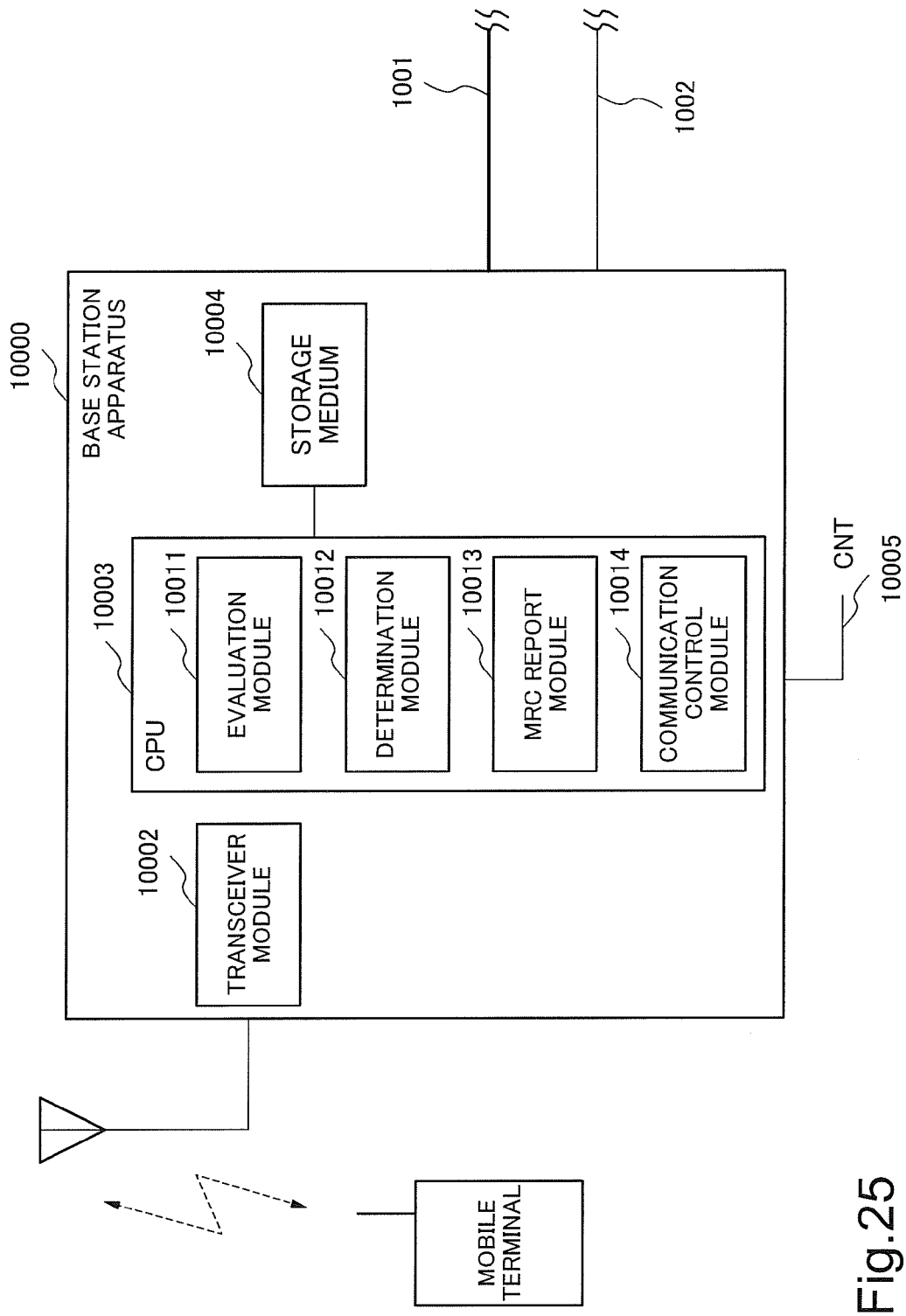
FIG. 25 is a block diagram exemplarily illustrating an internal configuration of the base station apparatus according to the exemplary embodiment.

FIG. 25 is a block diagram exemplarily illustrating an internal configuration of a base station apparatus according to the exemplary embodiment.

A base station apparatus 10000 shown in FIG. 25 includes an antenna 10001, a transceiver module 10002, a Central Processing Unit (CPU) 10003 and a storage medium 10004. The base station apparatus 10000 is connected to the high speed line 1001, the low speed line 1002 and a control line (CNT) 10005 for performing a communication of a control signal with an external apparatus. Here, the external apparatus represents a maximum ratio combining point (MRC-P), a selection combining point (SC-P), a radio network controller (RNC) or the like in a mobile communications system mentioned above.

The transceiver module 10002 is a general wireless communication unit which transmits/receives a wireless signal to/from a mobile terminal via the antenna 10001. However, in the exemplary embodiment, the transceiver module 10002 does not perform despread processing of a received signal from a mobile terminal.

The CPU 10003 performs an overall operation of the base station apparatus 10000 including the transceiver module 10002 by executing various software programs (computer programs). More specifically, in the exemplary embodiment, the CPU 10003 executes a software program of an evaluation module 100011, a determination module 10012, an MRC report module 10013, a communication control module 10014 and the like by appropriately referring to the storage medium 10004 such as a memory.

The evaluation module 100011 calculates an evaluation value that is a guideline for determining which state is present, a state in which a reception by a maximum ratio combining should be applied or a state in which a reception by the selection combining should be applied.

The determination module 10012 determines which state is present, a state in which a reception by a maximum ratio combining should be applied or a state in which a reception by the selection combining should be applied, based on the evaluation value calculated by the evaluation module 100011. At the time of the determination, the determination module 10012 appropriately refers to the management table shown in FIG. 9 and FIG. 15 mentioned above via the control line 10005.

The MRC report module 10013 notifies other nodes of a determination result by the determination module 10012, via the control line 10005. Here, the other nodes are a neighboring other base station apparatus, the maximum ratio combining point (MRC-P), the selection combining point (SC-P), the radio network controller (RNC) and the like.

The communication control module 10014 produces a data packet which has a format described with reference to FIG. 10 based on a signal before despread processing that is acquired from the transceiver module 10002. The communication control module 10014 transmits the produced data packet to the high speed line 1001 and/or the low speed line 1002 according to the determination result by the determination module 10012.

Further, in the exemplary embodiment, as an example, each module executed by the CPU 10003 is described as a software program. However, each module shown in FIG. 25 can be recognized as a predetermined functional unit that is realized by a software program and/or hardware. Accordingly, a part of or all of these modules may be realized as hardware.

(Procedure of Change Determination Using an Evaluation Value)

Next, a procedure for determining which state is present, a state in which a reception by a maximum ratio combining (MRC) should be applied or a state in which a reception by the selection combining (SC) should be applied will be described.

Figure 26:
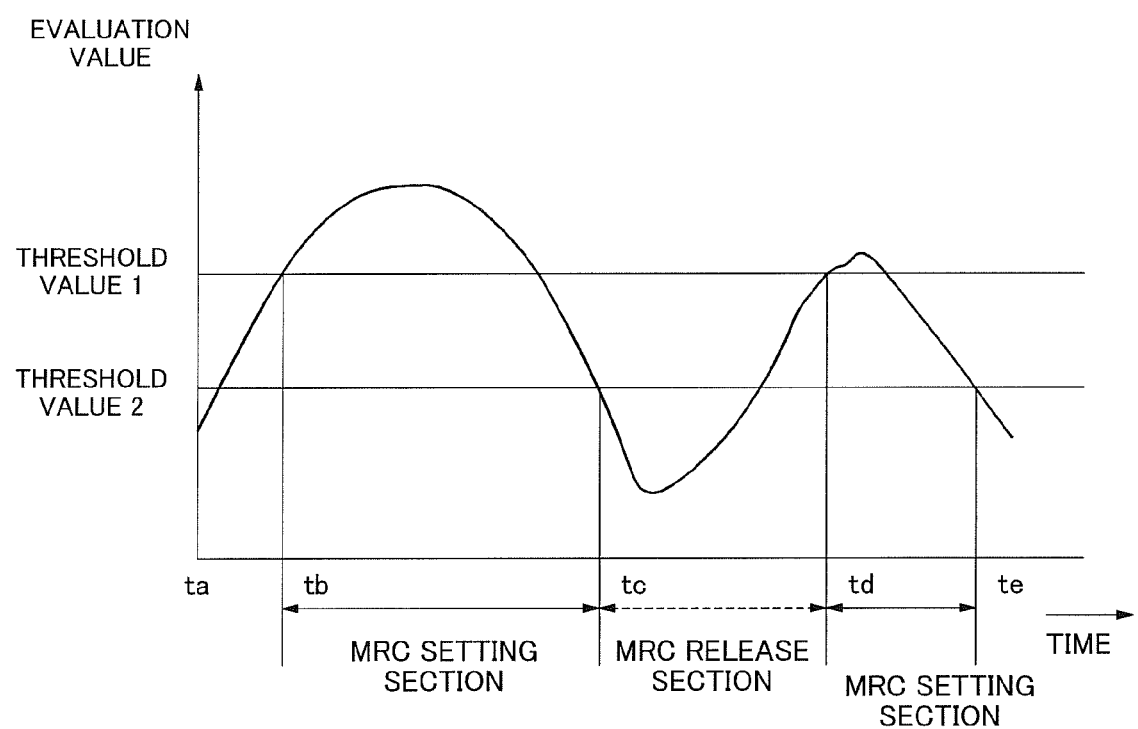
FIG. 26 is a figure illustrating a change determination method of signal combining processing.

FIG. 26 is a figure illustrating a change determination method of signal combining processing. More specifically, in FIG. 26, a horizontal axis represents time. A vertical axis represents an evaluation value calculated by the evaluation module 10011. In the exemplary embodiment, as an example, the following three items are used as the evaluation value, an amount of electric power of an up link in a wireless section;

an information rate of an up link in a base station apparatus 10000; and the number of mobile terminals under communication that exist in a coverage area of the base station apparatus 10000.

A curve of a graph exemplified in FIG. 26 represents a temporal change in a validity of a reception connection by the maximum ratio combining (MRC) which varies according to a state (situation) of mobile terminals which exists in a coverage area of the base station apparatus 10000.

In an exemplary embodiment, a determination of whether a reception by the maximum ratio combining (MRC) should be performed is made by using two threshold values whose values are different. That is, a threshold value 1 shown on a vertical axis shown in FIG. 26 is larger than a threshold value 2 and represents a state in which a use of a maximum ratio combining is more desirable. On the other hand, the threshold value 2 represents a state in which a validity of selecting a maximum ratio combining is lower than the state of the threshold value 1.

Hereinafter, a change operation will be described with respect to a case shown in FIG. 26, in which as an example, an amount of electric power of an up link (up-link electric power amount) is used as an evaluation value of a vertical axis. At a time ta, an up-link electric power amount shown by a curve is lower than the threshold value 2. After that, the up-link electric power amount gradually increases as time passes and then reaches the threshold value 1 at a time tb. At the time, in the exemplary embodiment, an MRC setting section starts by determining that a maximum ratio combining should be selected. After that, the up-link electric power amount increases and after that gradually decreases. In this decrease stage, the up-link electric power amount becomes smaller than the threshold value 1. However, at this time, an MRC setting section is continued. The up-link electric power amounts further decreases and reaches the threshold value 2 at a time tc. At the time, an MRC setting section is released. After that, the up-link electric power amount shown by the curve increases and decreases again. Therefore, an MRC setting section is set until a time te from a time td.

Thus, in the exemplary embodiment, the threshold value 1 is used as an MRC setting value. On the other hand, the threshold value 2 is used as an MRC release value. By using the threshold value 1 and the threshold value 2, in the exemplary embodiment, a change operation is stabilized.

(Change Request Processing)

Next, change request processing which is actually performed by the determination module 10012 based on a procedure mentioned above will be described with reference to FIGS. 27 to 29. A change request process shown in FIGS. 27 to 29 uses three kinds of evaluation value mentioned above. In the exemplary embodiment, the base station apparatus 10000 may perform either one of the change request process shown in FIGS. 27 to 29. However, if needed, an exemplary embodiment in which a determination is performed by using a combination of three kinds of evaluation value or a plurality of other evaluation values is also expected.

Figure 27:
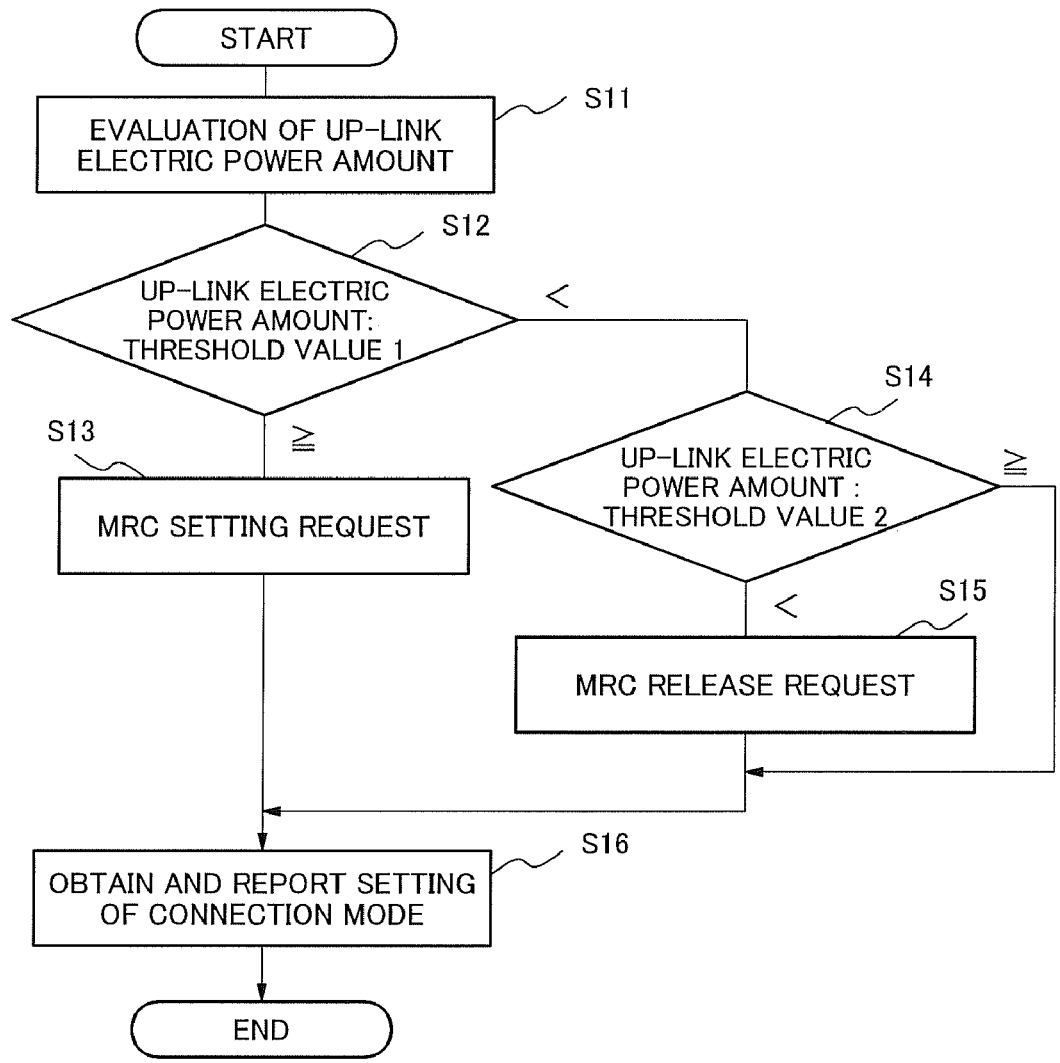
FIG. 27 is a flowchart of change request processing in which an up-link electric power amount is used as an evaluation value.

FIG. 27 is a flowchart of change request process in which an up-link electric power amount is used as an evaluation value. The flowchart shows a processing procedure of a software program which the CPU 10003 of the base station apparatus 10000 executes.

In step S11, the CPU 10003 obtains an up-link electric power amount by a general method. Step S11 is realized by a function of the evaluation module 10011 mainly.

In step S12, the CPU 10003 compares the up-link electric power amount obtained in step S11 with the threshold value 1. When it is judged that the up-link electric power amount is equal to or more than the threshold value 1 in step S12, the CPU 10003 starts an MRC setting request (step S13).

On the other hand, when it is judged that the up-link electric power amount is smaller than the threshold value 1 in step S12, the CPU 10003 compares the up-link electric power amount with the threshold value 1 (step S14).

When it is judged that the up-link electric power amount is equal to or more than the threshold value 2 in step S14, the CPU 10003 continues an MRC setting request (step S13). On the other hand, when it is judged that the up-link electric power amount is smaller than the threshold value 2 in step S14, the CPU 10003 releases an MRC setting request (step S15).

In step S16, the CPU 10003 obtains setting information of a connection mode from an external apparatus or another module of an own apparatus according to a request process in step S13 or step S15 mentioned above. The setting information is information which is obtained from an external apparatus (an operation system 10100 (a console panel 10101), a central apparatus 10201) as a result of operation change control processing (FIGS. 30 to 44) described below or which is decided by a base station apparatus itself. Moreover, in step S16, the CPU 10003 reports the obtained setting information of a connection mode to other nodes such as a neighboring other base station apparatus, the maximum ratio combining point (MRC-P), the selection combining point (SC-P), the radio network controller (RNC) and the like.

Further, each process in steps S12 to S15 mentioned above is mainly realized by a function of the determination module 10012. Each process in step S16 is mainly realized by a function of the report module 10013.

Here, an amount of electric power of an up link (up-link electric power amount) in a wireless section is one of suitable indexes to evaluate a validity of a reception connection by a maximum ratio combining and can be observed in the base station apparatus 10000. Further, a method that is generally used at present can be employed for calculating an up-link electric power amount. For this reason, in the exemplary embodiment, the detailed description will be omitted.

Figure 28:
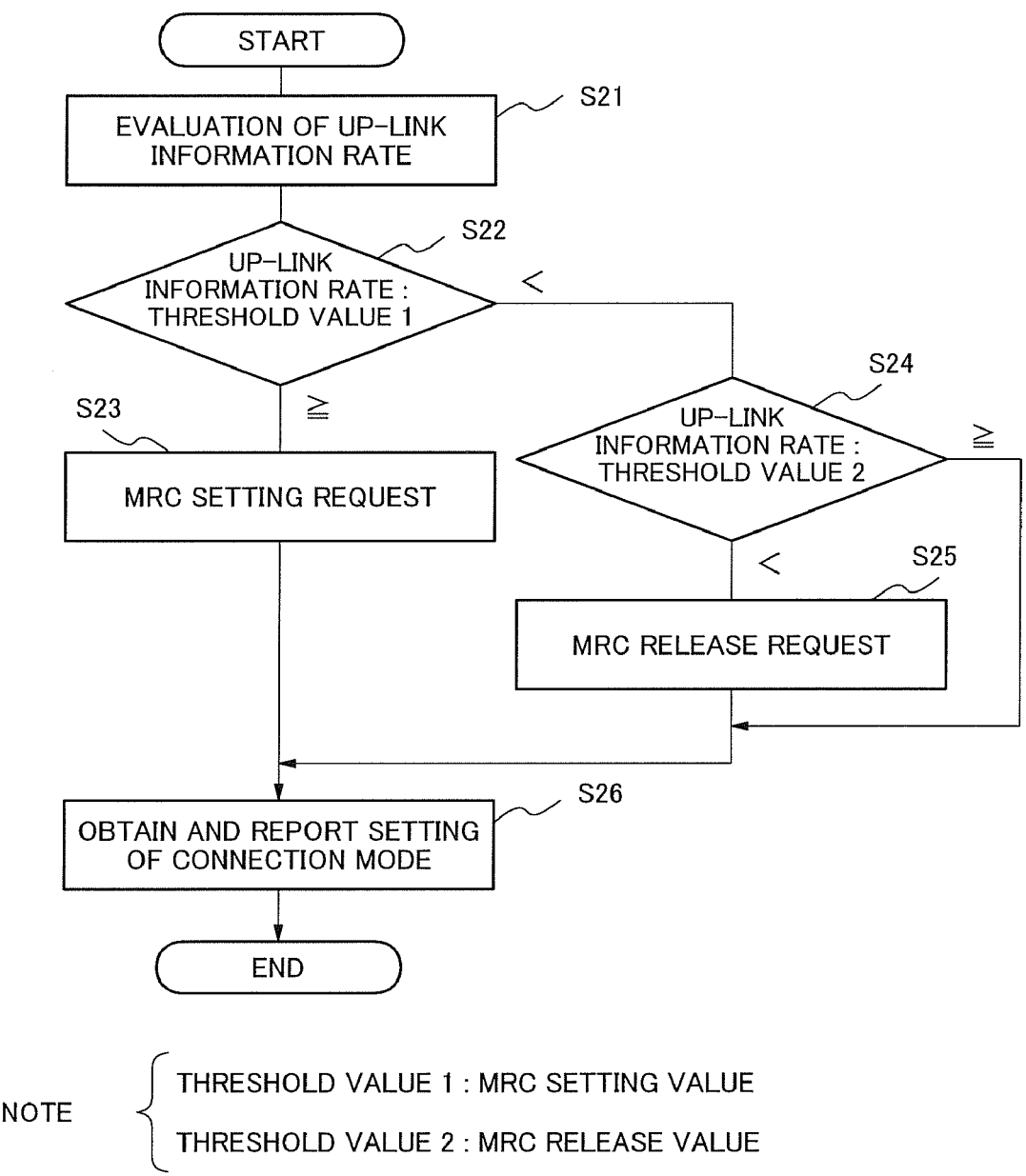
FIG. 28 is a flowchart of change request processing in which an information rate of an up link is used as an evaluation value.

FIG. 28 is a flowchart of a change request process in which an information rate of an up link is used as an evaluation value. The flowchart shows a processing procedure of a software program which the CPU 10003 of a base station apparatus 10000 executes.

A processing configuration in steps S21 to S26 shown in FIG. 28 is the same as a processing configuration in steps S11 to S16 shown in FIG. 27 mentioned above. For this reason, an overlapped description will be omitted. However, in case of a processing configuration shown in FIG. 28, an information rate of an up link is used as an evaluation value. Thus, a comparison object that is compared with each threshold value in step S22 and step S24 is different from a comparison object in step S12 and step S14 mentioned above.

Here, an information rate of an up link in the base station apparatus 10000 is an information rate of a signal which flows in the apparatus with respect to the up link and an index related to the up-link electric power amount mentioned above. The information rate may be measured by an external apparatus other than the base station apparatus 10000. Further, a method that is generally used at present can be employed for calculating an information rate. For this reason, in the exemplary embodiment, the detailed description will be omitted.

Figure 29:
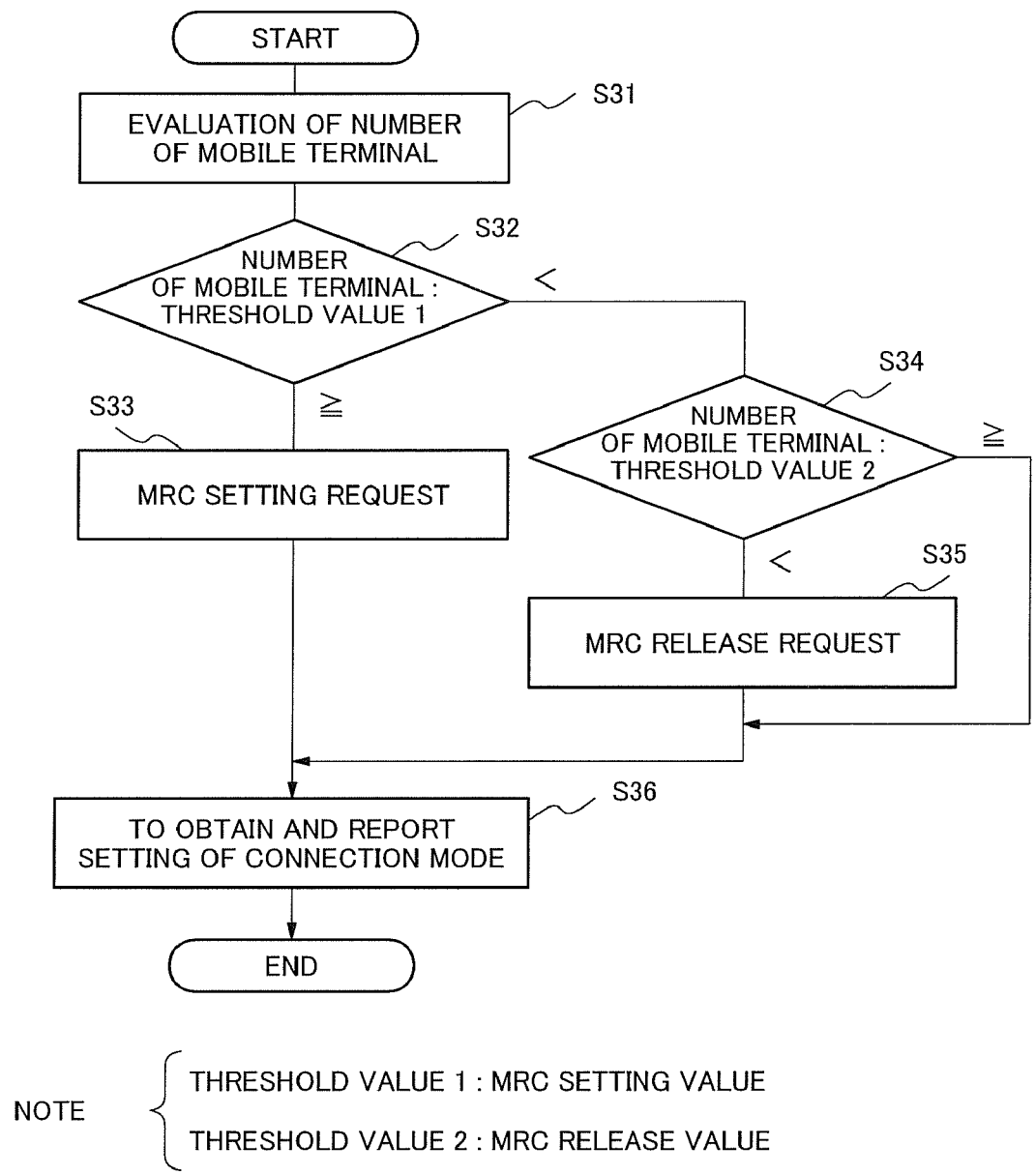
FIG. 29 is a flowchart of change request processing in which the number of mobile terminals is used as an evaluation value.

FIG. 29 is a flowchart of change request process in which the number of mobile terminals is used as an evaluation value. The flowchart shows a processing procedure of a software program which the CPU 10003 of the base station apparatus 10000 executes.

A processing configuration in steps S31 to S36 shown in FIG. 29 is the same as a processing configuration in steps S11 to S16 shown in FIG. 27 mentioned above. For this reason, an overlapped description will be omitted. However, in case of FIG. 29, the number of mobile terminals under communication that exist in a coverage area of the base station apparatus 10000 is used as an evaluation value. For this reason, a comparison object that is compared with each threshold value in step S32 and step S34 is different from a comparison object in step S12 and step S14 mentioned above.

Here, the number of mobile terminals mentioned above is information which flows in the apparatus and an index related to the up-link electric power amount mentioned above. The number of mobile terminals may be measured by an external apparatus other than the base station apparatus 10000. Further, a method that is generally used at present can be employed for calculating the number of mobile terminals. For this reason, in the exemplary embodiment, the detailed description will be omitted.

As mentioned above, the base station apparatus 10000 determines a validity of a reception connection of a maximum ratio combining by a procedure described by referring to FIGS. 26 to 29. The base station apparatus 10000 stores a determination result (MRC setting request or release request) of determination processing in the storage medium 10004 and also reports the determination result to other nodes (another base station apparatus, a maximum ratio combining point, a selection combining point, the radio network controller (RNC) and the like) by using the function of the MRC report module 10013 via the control line 10005.

In this case, the radio network controller (RNC) 307 properly controls operations of a plurality of base station apparatuses, a maximum ratio combining point and a selection combining point by considering setting information of a connection mode obtained from each of the base station apparatuses.

That is, in the exemplary embodiment, the radio network controller 307 judges the following three states.

Case 1: a state in which only the low speed line 1002 used for the selection combining is used and a setting for a maximum ratio combining (request of an MRC connection mode) is not made.

Case 2: a state in which only the low speed line 1002 used for the selection combining is used, and also a setting for a maximum ratio combining (request of the MRC connection mode) is made and an actual line state is not the MRC connection mode.

Case 3: a state in which both of the high speed line 1001 used for a maximum ratio combining and the low speed line 1002 used for the selection combining are used together and a setting for a maximum ratio combining (request of an MRC connection mode) is made and a state in which an actual line is the MRC connection mode.

In the three states (cases 1 to 3), the case 1 represents the situation in which a communication capacity is sufficient. The case 2 represents the situation in which a communication capacity is becoming tight and a connection line for a maximum ratio combining (high speed line 1001) has not been prepared yet. The case 3 represents the situation in which a communication capacity is becoming tight and reception efficiency is improving by providing a connection line for a maximum ratio combining (high speed line 1001).

The radio network controller 307 knows a situation of the mobile communications system by judging three states mentioned above. The radio network controller 307 determines a conclusive operation of each node by making a synthetic judgment based on the recognition result and information about a connection mode obtained from each base station apparatus by an operation change control mentioned below.

Next, a selection method of the SC connection for the selection combining and the MRC connection for a maximum ratio combining as a communication line between a base station apparatus and a mobile terminal will be described. This method is used by the radio network controller 307

In a conventional signal combining, a maximum ratio combining is performed between a plurality of sectors in one base station apparatus (sector base station) as mentioned in "BACKGROUND ART". Selection combining processing performed between base station apparatuses that are arranged at different locations is carried out by for example, one function of a radio network controller. That is, when a communication line with a mobile terminal is needed, a decision of the SC connection or the MRC connection is made as follows. Only when a plurality of antennas which receive a signal from a mobile terminal are sector antennas provided in one base station apparatus, the MRC connection is selected. The SC connection is selected in other cases. This is an inescapable restriction in a conventional signal combining.

In contrast, in a signal combining according to the exemplary embodiment and each of exemplary embodiments mentioned below, there is no restriction like that. That is, each base station apparatus is connected to the high speed line 1001 to which the MRC-P is connected and is connected to the low speed line 1002 to which the SC-P is connected. Each base station apparatus judges whether or not the MRC connection is needed based on a result of a situation evaluation in a coverage area of an own apparatus. In the exemplary embodiment, a connection mode changes every moment according to "change request process" in each base station apparatus mentioned above and "operation change control" based on the change request process described below.

For this reason, in the exemplary embodiment, the SC connection and the MRC connection are changed dynamically. However, a change of a connection is made based on "connection strategy" that indicates how to handle a mobile terminal under communication in a service area of the radio network controller 307.

For example, when a communication capacity in a coverage area of a base station apparatus is becoming tight and accordingly, a communication line becomes lacking, the MRC connection is recommended in order to improve reception efficiency (reception gain). On the contrary, when the MRC connection is being released because a margin of a communication capacity in a coverage area is increasing and an improvement of reception efficiency (reception gain) is not need, the SC connection is recommended instead of the MRC connection.

Accordingly, in the exemplary embodiment and its example, the radio network controller 307 can judge a selection of the MRC connection and/or the SC connection if at least setting information of a connection mode can be obtained from each of base station apparatuses. However, the radio network controller 307 performs a selection judgment of the MRC connection and/or the SC connection according to a connection strategy of a mobile communications system in order to realize an actual and ideal communication environment while comprehensively considering not only setting information of a connection mode but also three states mentioned above and information held by an external apparatus (central apparatus 10201 etc.).

<Operation Change Control Based on Change Request Process>

Next, as described with reference to FIGS. 1 to 24, an actual configuration for dynamically changing a combining method to the maximum ratio combining (MRC) or the selection combining (SC) according to a change request process (FIGS. 27 to 29) in a base station apparatus mentioned above will be described. In the following description, three kinds of method will be described. A first method (a first example) is a method in which an operator (operation and maintenance personnel) who manages a mobile communications system intervenes. A second method (a second example) is a method in which a change is performed by a central apparatus (monitor apparatus). A third method (a third example) is a method in which a change is performed by a base station apparatus itself.

A FIRST EXAMPLE

A Method in which an Operator Intervenes

Figure 30:
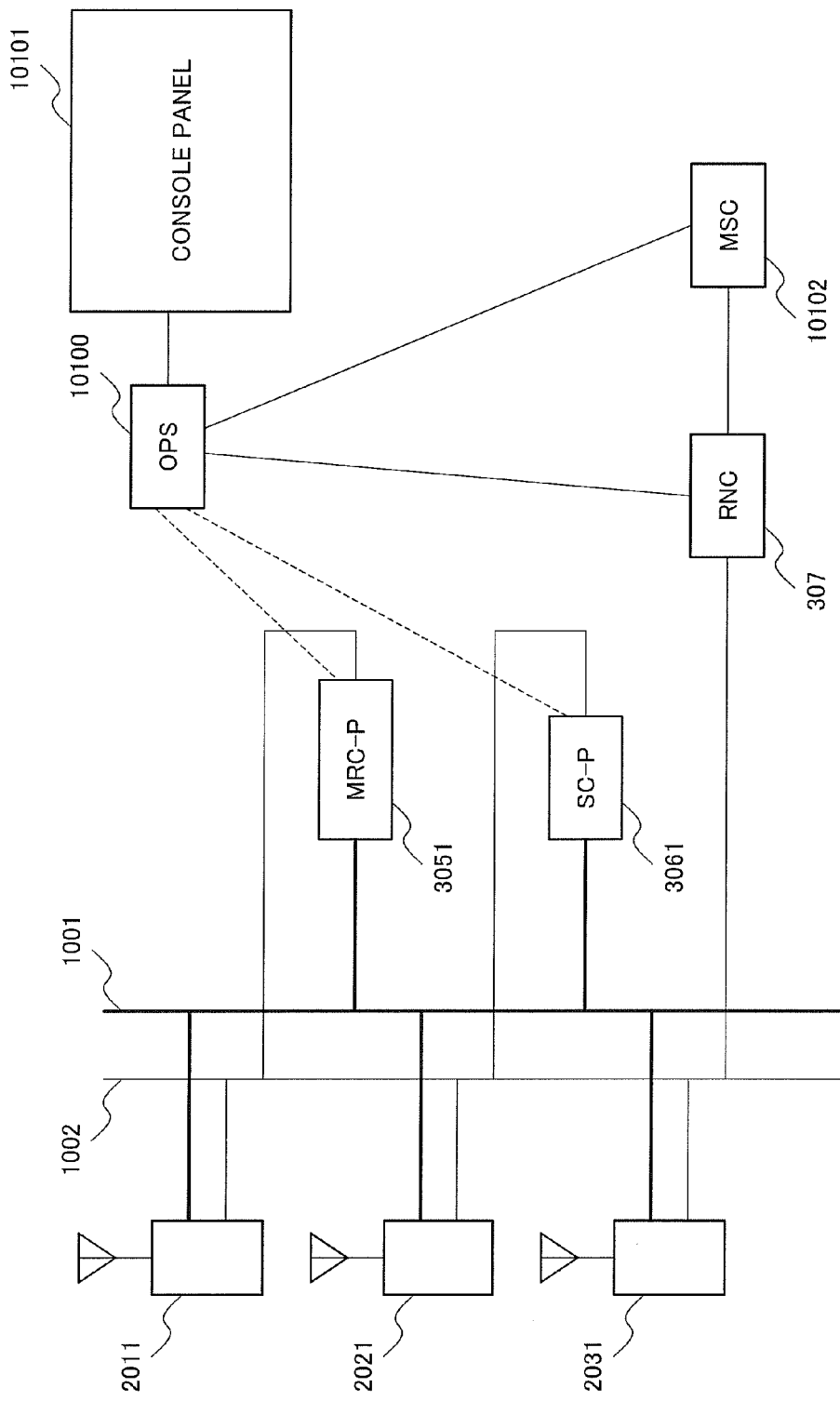
FIG. 30 is a system block diagram of an exemplary mobile communications system in a first example.

FIG. 30 is a system block diagram of an exemplary mobile communications system in a first example. A mobile communications system shown in FIG. 30 includes an operation system (OPS) 10100, a console panel 10101 and a mobile switching center (MSC) 10102 in addition to the system configuration mentioned above with reference to FIG. 1 and FIG. 14.

Further, the operation system (OPS) 10100 and the console panel 10101 may be formed in different units or in one unit. In a one unit type, a display provided in the operation system 10100 can be used for the console panel 10101.

The operation system 10100 may monitor an operation status of an entire system and control the system. The console panel 10101 may be a man-machine interface for performing an operation control of the system by an operator. That is, the console panel 10101 reports an operation status of an entire system collected by the operation system 10100 to an operator. The console panel 10101 sets, in the operation system 10100, an operation of an operator with respect to an operation control of the system.

Figure 31:
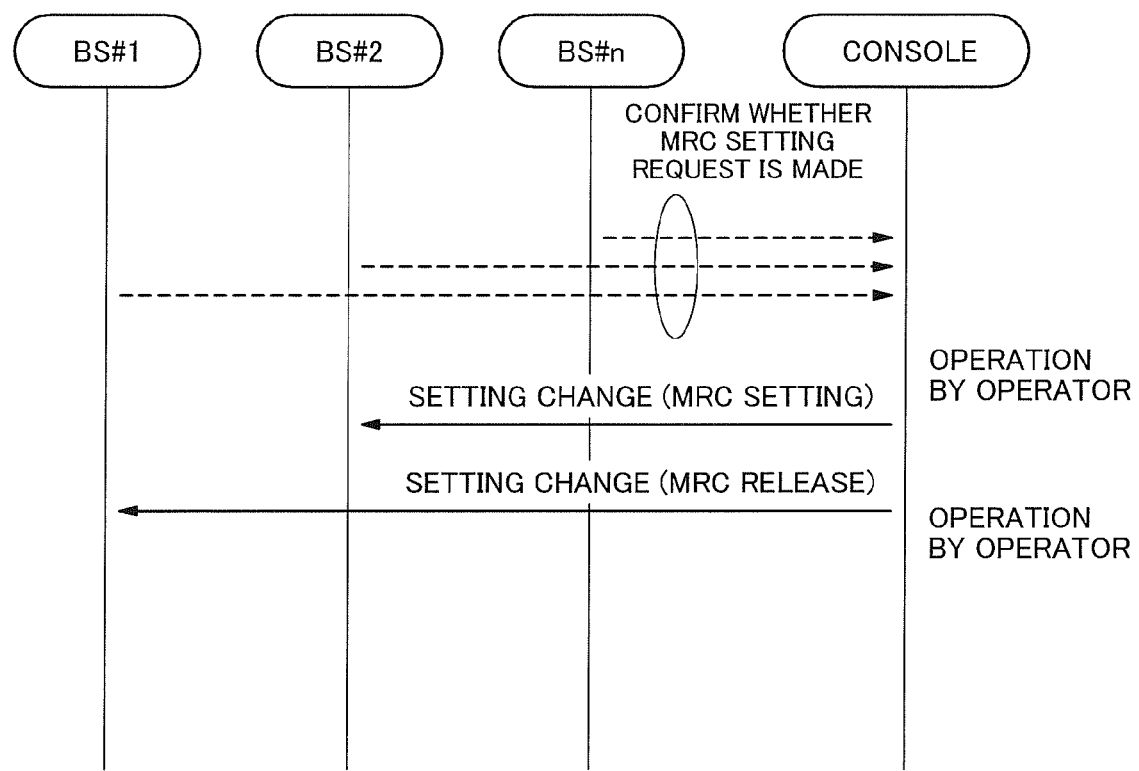
FIG. 31 is a figure showing a flow of a change operation in a first example.

FIG. 31 is a figure showing a flow of a change operation in the first example. That is, FIG. 31 is exemplifying a procedure for changing a setting mode of a concerned base station apparatus according to an MRC setting request reported from each of base station apparatuses.

In the example, a result of a change request process (FIGS. 27 to 29) in the base station apparatus mentioned above is collected to the operation system 10100 by a function of the MRC report module 10013. As a result, information of whether or not an MRC setting request is made is indicated on the console panel 10101 for each of base station apparatuses. An operator knows a state of each of base station apparatuses by a content indicated on the console panel 10101. If required, an operator performs an operation for changing a connection mode to the console panel 10101. The operation system 10100 controls a corresponding base station apparatus according to an instruction operation set to the console panel 10101.

Figure 32:
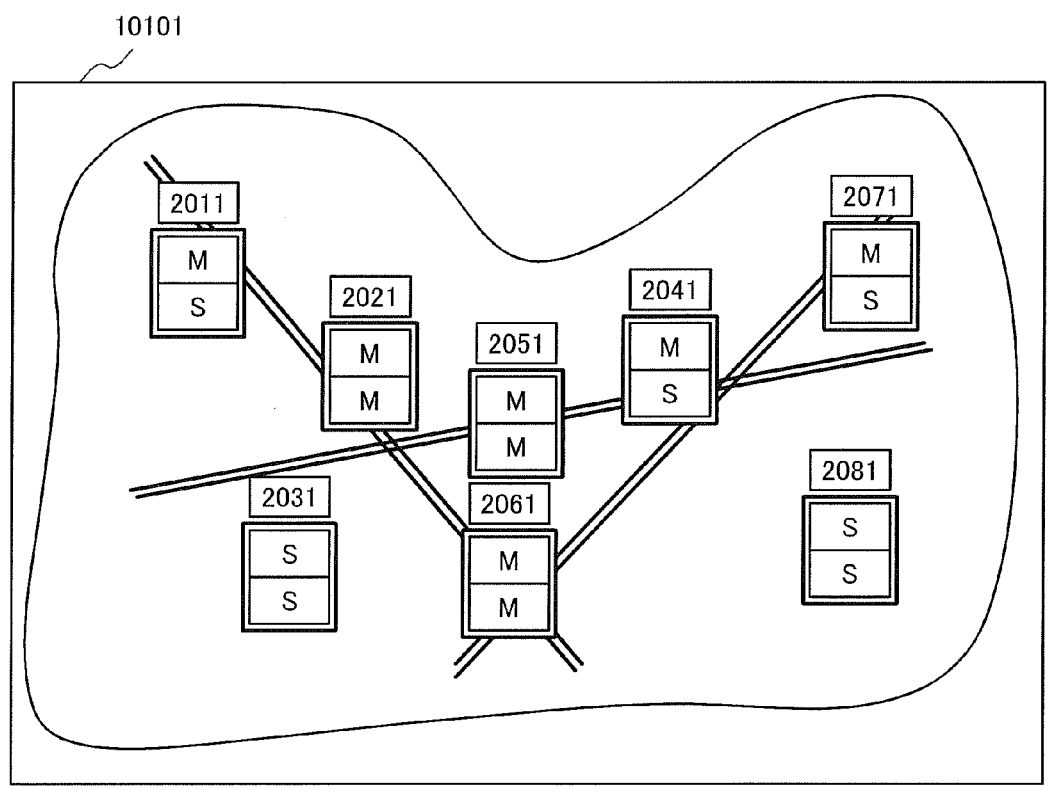
FIG. 32 is a figure showing an example of a switch layout of a console panel in a first example.

FIG. 32 is a figure showing an example of a form of a console panel in the first example. In the console panel 10101 exemplified in FIG. 32, geographical features (for example, an arrangement state of a main road, a location of a landmark and an arrangement state of a base station antenna apparatus) of a service area of a mobile communications system are indicated. In the console panel 10101 that is shown as a sample, eight indication-and-operation switches for a recognition of an evaluation state and a change of a setting state of base station apparatuses (BS#2011, BS#2021, BS#2031, BS#2041, BS#2051, BS#2061, BS#2071 and BS#2081) are arranged in accordance with a geographical feature. Each of indication-and-operation switches is a control switch having a display function. In an upper part of an indication-and-operation switch, information of whether the MRC setting request is made or not (evaluation state) that is reported from a base station apparatus corresponding to the indication-and-operation switch is shown. In a lower part of the indication-and-operation switch, a current state (setting state) of a signal combining of the base station apparatus is shown. "M" and "S" indicated in the upper part and lower part represent the maximum ratio combining (MRC) and the selection combining (SC), respectively.

Figures 33, 34:
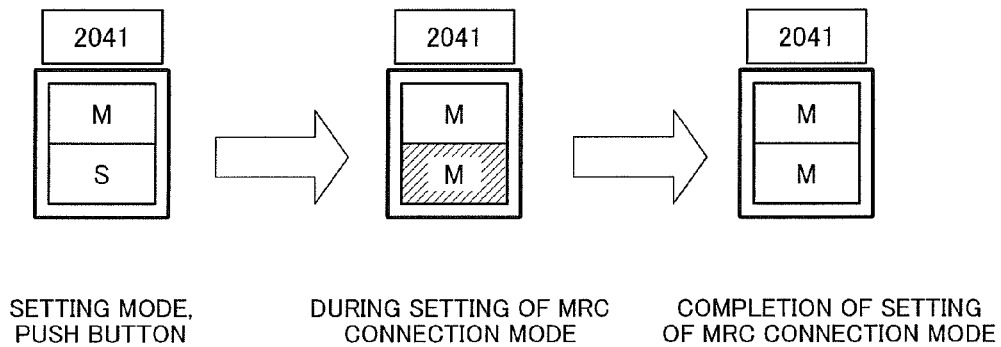
FIG. 33 is a figure illustrating an operation method of an indication-and-operation switch provided on a console panel in a first example.
FIG. 34 is a figure illustrating a management table used for a management of an evaluation state and a setting state of a plurality of base station apparatuses which are management targets.

FIG. 33 is a figure illustrating an operation method of an indication-and-operation switch provided in a console panel in the first example. An indication of the indication-and-operation switch (BS#2041) shown on the left side in FIG. 33 represents that an original state is the state in which the MRC setting request from a corresponding base station apparatus is made and an actual state is the state in which the selection combining (SC) is selected for the base station apparatus.

In the original state, suppose that an operator wants to change a signal combining for a base station apparatus to the maximum ratio combining (MRC). In this case, when an operator operates a lower part switch, an indicator of the lower part switch indicates "M" as shown on the center part in FIG. 33 and then when a signal combining is changed to a maximum ratio combining, an indication of the indication-and-operation switch becomes as shown on the right side in FIG. 33.

Here, a general structure such as a push button or a touch panel can be used as an operation mechanism of an indication-and-operation switch mentioned above. For example, a liquid crystal display panel or the like can be used for a display mechanism of an indication-and-operation switch. A state during state transition can be expressed with various expression methods such as a change in a display color or a flashing.

In the console panel 10101 which realizes such operation, an evaluation state (whether an MRC setting request is made or not) and a setting state of each of base station apparatuses is managed by a management table as shown in FIG. 34.

FIG. 34 is a figure illustrating a management table used for a management of an evaluation state and a setting state of a plurality of base station apparatuses which are management targets. That is, information about an apparatus number, an evaluation state, a setting state and a reservation mode with respect to each of base station apparatuses are registered in a management table shown in FIG. 34. In the example, a management table is managed by the operation system 10100.

For example, an evaluation state (evaluation status) about a base station apparatus BS#2011 represents a state in which the MRC setting request (MRC is appropriate) is made. A setting state is the SC. The state is represented as "BS#2011MS". In the case, a state of each of base station apparatuses shown in FIG. 34 can be represented with BS#2011MS, BS#2021MM, BS#2031SS, BS#2041MS, BS#2051MM, BS#2061MM, BS#2071MS and BS#2081SS.

When there is a difference between information in an evaluation state column and information in a setting state column, its difference is recognized in an apparatus and also an operator performs a change operation of a signal combining. In that time, a management flag is used for managing a state until a change operation is completed that is shown in a reservation mode column of a management table shown in FIG. 34. That is, in a management table shown in FIG. 34, information in a reservation mode column is "M" with respect to a base station apparatus whose state is BS#2041MS. This state means a state shown in a center part of FIG. 33 mentioned above and it represents that signal combining is being changed. For this reason, a management flag "M" in a reservation mode column of a management table is reset in a state (that is, a state shown on the right side of FIG. 33) in which a change operation has been completed.

According to the first example in which such processing is performed, an operator can adequately change a state of a signal combining for each of base station apparatuses while visually grasping a geographical location of the each of base station apparatuses. A more adequate communication state can be realized by considering (expecting) for example, various external factors mentioned above (surrounding circumstances such as whether or not an event will be held, difference in the time or the day of the week etc.) by an operator in advance when a change is performed.

A SECOND EXAMPLE

A Method in which a Change is Performed by a Central Apparatus

Figure 35:
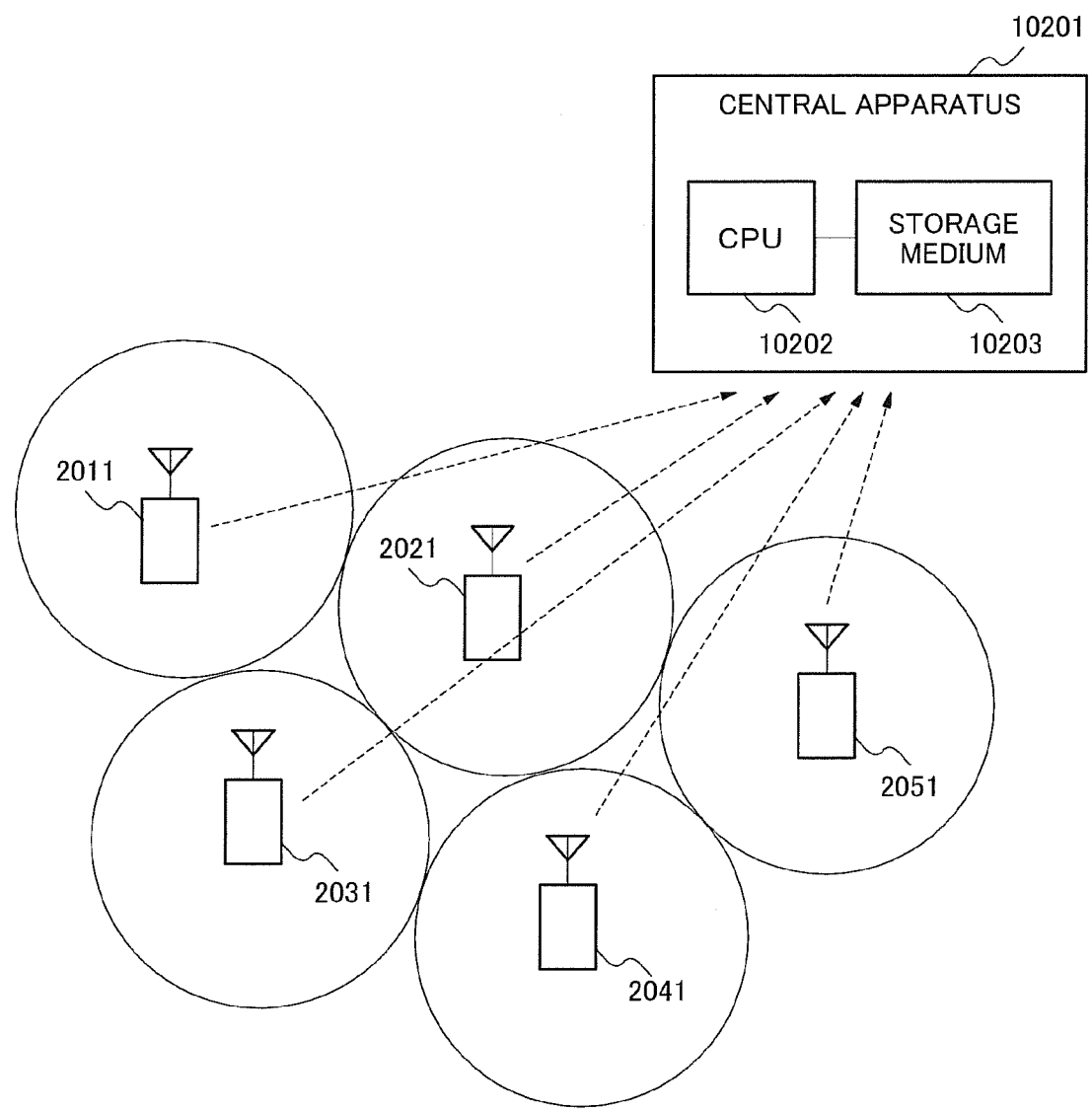
FIG. 35 is a system block diagram of an exemplary mobile communications system in a second example.

FIG. 35 is a system block diagram of an exemplary mobile communications system in a second example. Further, in FIG. 35, a line representing a communication line which connects each of base station apparatuses 2011, 2021, 2031, 2041 and 2051 with each other is omitted like the case shown in FIG. 6 mentioned above.

In this example, each of base station apparatuses and the central apparatus (monitor apparatus) 10201 are connected with each other via a control line (the control line 10005 shown in FIG. 25) that is not shown in FIG. 35. The central apparatus 10201 includes a CPU 10202 and a storage medium 10203 such as a memory. The CPU 10202 performs a process of a flowchart shown in FIG. 38 mentioned below, by referring to the storage medium 10203 appropriately.

Figures 36, 37:
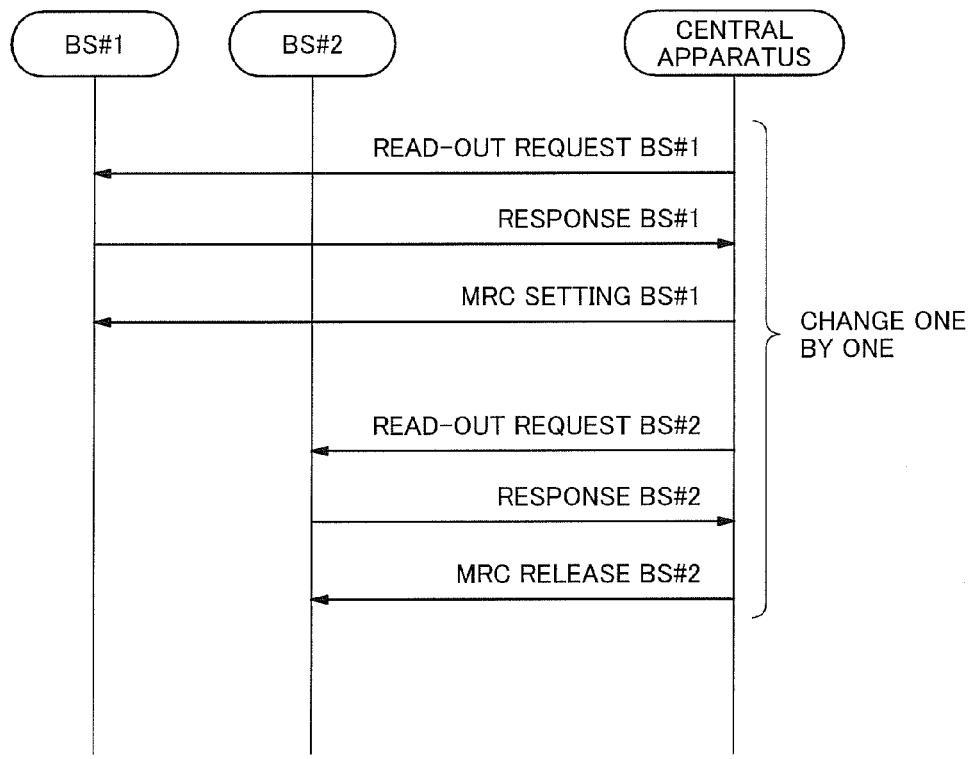
FIG. 36 is a figure showing a flow of information transmitted and received between a central apparatus and a base station apparatus in a sequential change method according to a second example.
FIG. 37 is a figure illustrating a management table used for a management of an evaluation state and a setting state of a plurality of base station apparatuses which are management targets.

FIG. 36 is a figure showing a flow of information transmitted and received between a central apparatus and a base station apparatus in a sequential change method according to the second example. In this example, the central apparatus 10201 can read out information of whether or not the MRC setting request is made, from each of base station apparatuses via a control line. The central apparatus 10201 can carry out a setting and release of the MRC connection mode to each of base station apparatuses via a control line in order one by one. Hereinafter, this change procedure is described "sequential change method".

That is, in FIG. 36, it is assumed that the central apparatus 10201 is connected to a base station apparatus BS#1 and a base station apparatus BS#2 for convenience of explanation. In this case, first, the central apparatus 10201 requests the base station antenna apparatus BS#1 to read out information of whether or not the MRC setting request is made. In response to the request, the base station antenna apparatus BS#1 transmits a processing result (MRC setting request/release request) obtained by a change request process (FIGS. 27 to 29) to the central apparatus 10201 with a function of the MRC report module 10013 mentioned above. In an example shown in FIG. 36, the central apparatus 10201 instructs the base station antenna apparatus BS#1 to perform an operation of the maximum ratio combining (MRC) according to a result of a change control process (FIG. 38) described below. Next, the central apparatus 10201 performs the same procedure as mentioned above for the base station antenna apparatus BS#2. As a result, the central apparatus 10201 instructs the base station antenna apparatus BS#2 to release an operation of the maximum ratio combining (MRC) (that is, to start an operation of the selection combining (SC)).

FIG. 37 is a figure illustrating a management table used for a management of an evaluation state and a setting state of a plurality of base station apparatuses which are management targets. A composition and an operation of a management table shown in FIG. 37 are equal to these of a management table (FIG. 34) in the first example.

In this example, the management table is managed in the storage medium 10203 of the central apparatus 10201 under a control of the CPU 10202. The central apparatus 10201 learns a state of the each base station apparatus and performs a change control of a connection mode by using a management table (FIG. 37).

Figure 38:
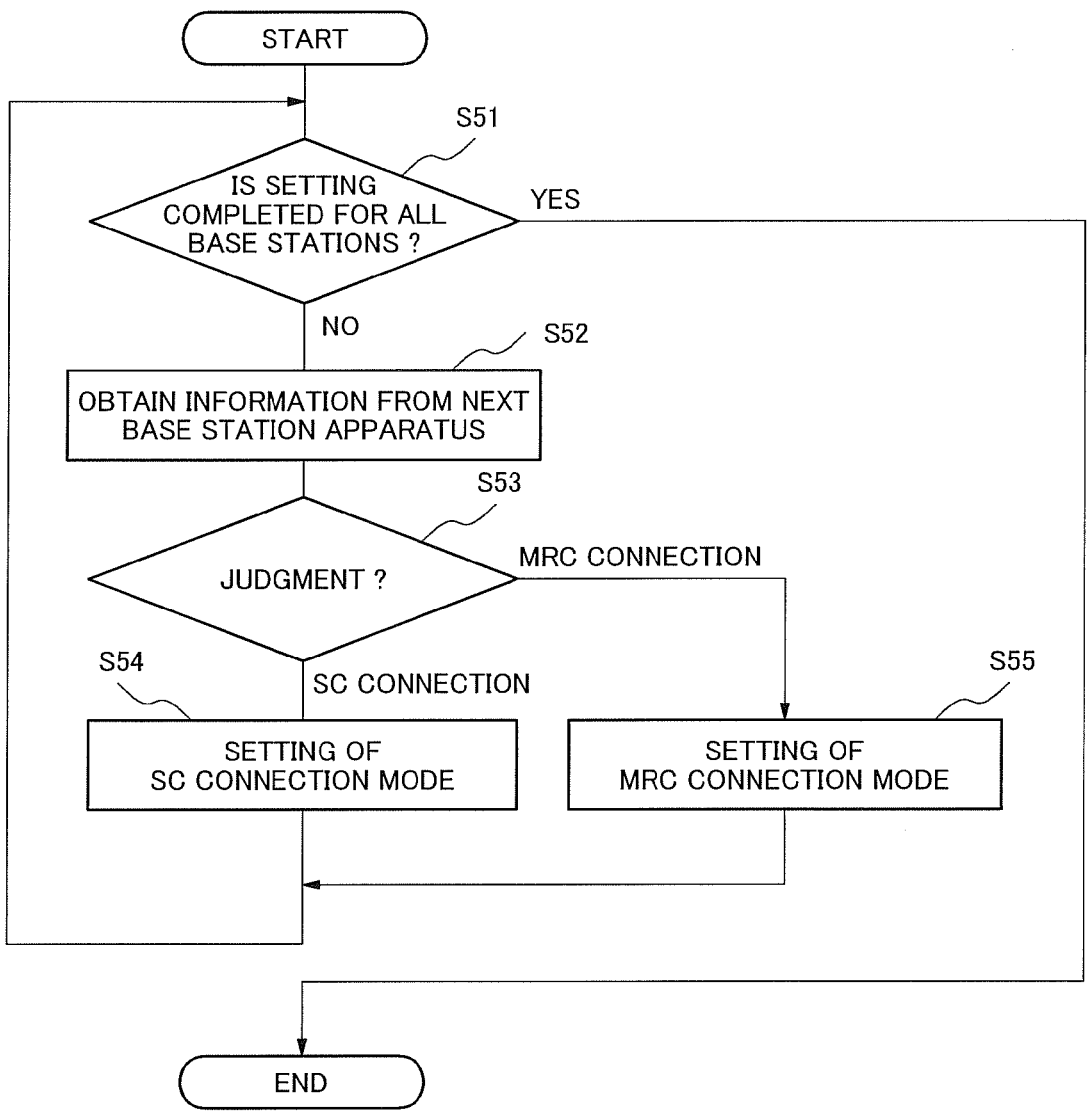
FIG. 38 is a flowchart of change control processing using a sequential change method that is performed by a central apparatus in a second example.

FIG. 38 shows a flowchart of a change control process by a sequential change method that is performed by a central apparatus in the second example. The flowchart shows a processing procedure performed by the CPU 10202.

In step S51, the CPU 10202 judges whether or not a series of change control process described below have been completed for all the base station apparatuses. When a result of judgment in step S51 is "NO", the CPU 10202 obtains information of whether or not an MRC setting request is made, from a base station apparatus that is a next read-out target (step S52).

In step S53, the CPU 10202 determines whether or not a difference between information in an evaluation state column and information in a setting state column exists with respect to a base station apparatus that is a processing target by referring to a management table (FIG. 37).

Judging that the difference exists in step S53, the CPU 10202 instructs a base station apparatus that is a target of processing to perform a setting of the selection combining (SC) mode or the maximum ratio combining (MRC) mode (step S54, step S55).

That is, when information in an evaluation state column is "M" and information in a setting state column is "S" in a management table (FIG. 37), the CPU 10202 instructs a base station apparatus that is a target of processing to perform the maximum ratio combining (MRC) mode in step S55. On the other hand, when information in an evaluation state column is "S" and information in a setting state column is "M" in the management table (FIG. 37), the CPU 10202 instructs a base station apparatus that is a target of processing to perform a setting of a selection combining (SC) mode in step S54.

The CPU 10202 performs a series of processing mentioned above one by one until judging in step S51 that the processing has been completed for all the base station apparatuses.

Here, with reference to a management table (FIG. 37), an operation presented by a flowchart mentioned above is described. For example, with respect to information about the base station apparatus 2041, a state is as follows.

Information in "Evaluation state" column that is collected from the base station apparatus 2041 is "S" that represents a release request of an MRC setting;

Information in "setting state" column which is an actual setting state of the base station apparatus 2041 is "M" which is a maximum ratio combining; and Information in "reservation mode" column about the base station apparatus 2041 is "S" which is the selection combining. That is, the central apparatus 10201 is just changing a mode of the base station apparatus 2041 to the selection combining (SC) mode.

In contrast, a management table (FIG. 37) represents that the central apparatus 10201 does not instructs other base station apparatuses other than the base station apparatus 2041 to perform a mode change although there is a difference between information in an "evaluation state" column and information in a "setting state" column. That is, it is known from the management table (FIG. 37) that a control target of the central apparatus 10201 (CPU 10202) is the base station apparatus 2041 and other base station apparatuses are not a control target at present. Accordingly, according to an operation shown in a flowchart mentioned above, in the case that for example, a next control target is the base station apparatus 2051, the central apparatus 10201 (CPU 10202) knows that information in an "evaluation state" column is a "M" and information in a "setting state" column is a "S". For this reason, the central apparatus 10201 (CPU 10202) changes an operation mode of the base station apparatus 2051 to the MRC connection mode by setting a "reservation mode" column to "M".

In change control processing (FIG. 37 and FIG. 38) described above, a sequential change method is used in which the central apparatus 10201 instructs a plurality of base station apparatuses that are managed by the central apparatus to perform a setting in order. This method is used for a case in which no problem occurs on a transmission band even when many base station apparatuses operate in the MRC connection mode that needs a wide transmission band or for a case a connection mode can be changed by spending relatively much time.

In contrast, a method described below with reference to FIG. 39 and FIG. 40 can be used for a case in which a problem occurs on a transmission band when many base station apparatuses operate in the MRC connection mode. For this reason, in a system (batch change method) described below, the central apparatus 10201 detects a state of all base station apparatuses that are managed by the central apparatus 10201 all together. When a detected state is different from a previous state for all base station apparatuses, the central apparatus 10201 analyzes whether or not a setting change of a connection mode is required and performs a setting change to only base station apparatus to which a setting change is needed, based on a result of the analysis. Otherwise, the central apparatus 10201 determines an order of priority based on a result of the analysis and performs a setting of a connection mode based on the order of priority.

Here, the order of priority may be determined by analyzing an effect obtained by a setting of the MRC connection mode. Specifically, as an example, first, an evaluation value mentioned above is calculated for all base station apparatuses which have reported the MRC setting request by referring to FIG. 26. An order of a setting change is rearranged according to a magnitude of all the calculated evaluation values with respect to all base station apparatuses that have reported the MRC setting request. By carrying out such processing, the MRC connection mode can be accurately set by effectively using a limited transmission band.

Figure 39:
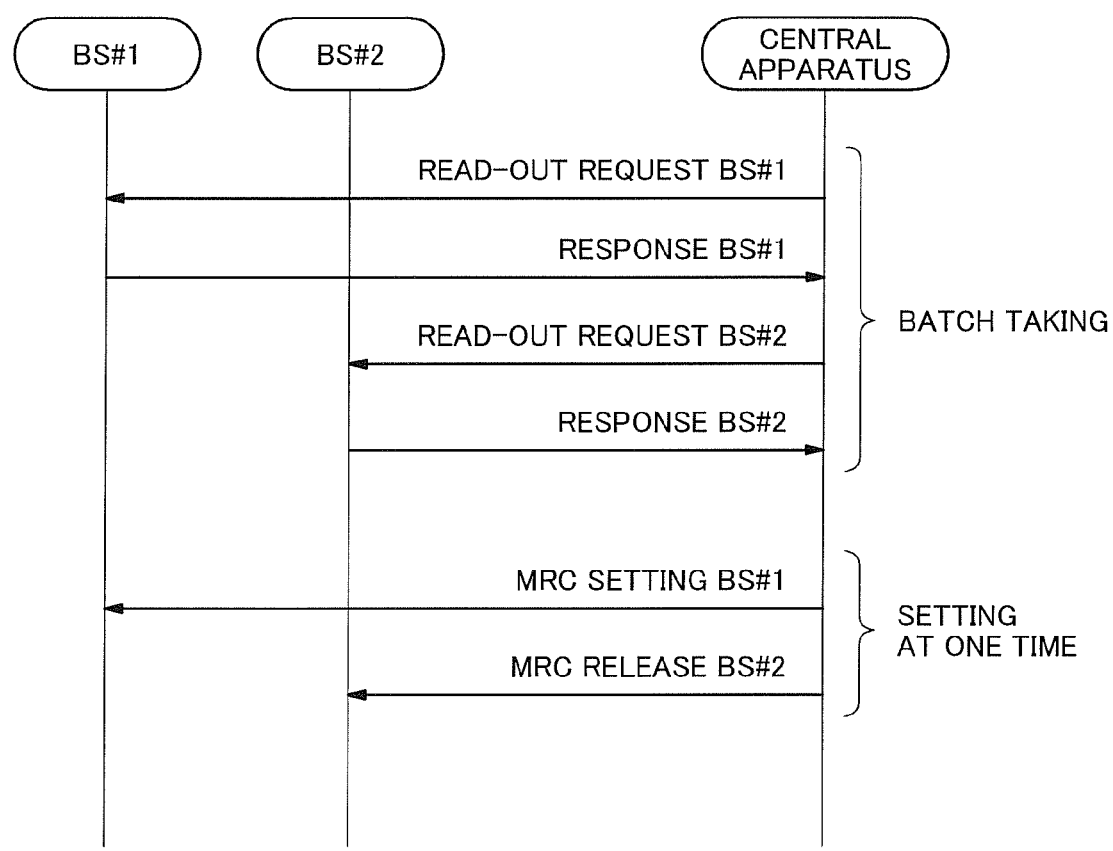
FIG. 39 is a figure showing a flow of information transmitted and received between a central apparatus and a base station apparatus in a batch change method according to a second example.

FIG. 39 is a figure showing a flow of information transmitted and received between a central apparatus and a base station apparatus in a batch change method according to the second example. Here, this change procedure is described "batch change method" compared with "sequential change method" mentioned above.

In an example shown in FIG. 39, it is assumed that the central apparatus 10201 is connected to the base station apparatus BS#1 and the base station apparatus BS#2 like the case shown in FIG. 36 for convenience of explanation. However, in this case, a batch change method is used. For this reason, the central apparatus 10201 requests the base station antenna apparatus BS#1 and the base station antenna apparatus BS#2 to read out information of whether or not the MRC setting request is made. In response to this request, the base station antenna apparatus BS#1 and the base station antenna apparatus BS#2 transmit a processing result (MRC setting request/ release request) obtained by change request processing (FIGS. 27 to 29) to the central apparatus 10201 with a function of the MRC report module 10013 mentioned above. In an example shown in FIG. 39, the central apparatus 10201 instructs the base station antenna apparatus BS#1 to perform an operation by the maximum ratio combining (MRC) according to a result of change control processing (FIG. 40) described below. On the other hand, the central apparatus 10201 instructs the base station antenna apparatus BS#1 to release an operation of the maximum ratio combining (MRC) (that is, to start an operation of the selection combining (SC)). In this case, the instructions to two base station apparatuses are performed together.

Figure 40:
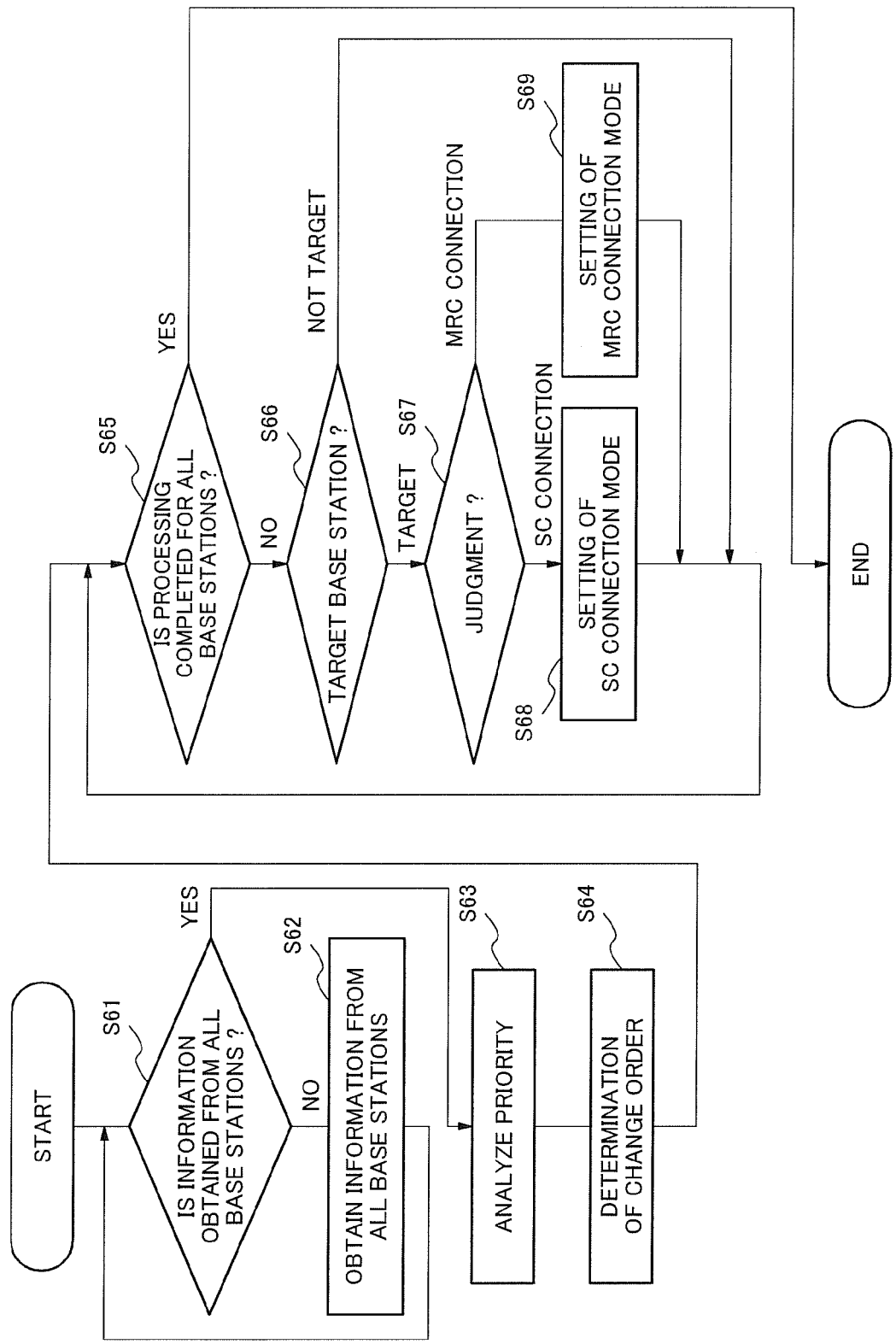
FIG. 40 is a flowchart of change control processing using a batch change method that is performed by a central apparatus in a second example.

FIG. 40 is a flowchart of change control processing using a batch change method performed by a central apparatus in the second example. The flowchart shows a processing procedure that is performed by the CPU 10202.

In step S61, the CPU 10202 judges whether or not a processing for obtaining information on the MRC setting request from all the base station apparatuses subject to the CPU 10202 is completed. When a result of judgment in step S61 is "NO", the CPU 10202 obtains information of whether or not the MRC setting request is made, from all the base station apparatuses subject to the CPU 10202 (step S62).

When it is confirmed in step S61 that an information acquisition from the all base station apparatuses has been completed (in case of YES judgment), the CPU 10202 analyzes a priority mentioned above based on the obtained information (step S63).

Next, the CPU 10202 determines an order of priority of a change operation and whether or not a change is required based on a result of the analysis in step S63 (step S64).

In step S65, the CPU 10202 judges whether or not change control processing to all the base station apparatuses has been completed. When a result of judgment in step S65 is "NO", the CPU 10202 judges whether or not the next noted base station apparatus is a base station apparatus that is a change target among all the base station apparatuses by referring to a processing result obtained in step S64 (Step S66)

Judging in step S66 that the next noted base station apparatus is a base station apparatus that is a change target, the CPU 10202 determines whether or not a difference between information in an evaluation state column and information in a setting state column exists with respect to a base station apparatus that is a target of processing by referring to the management table (FIG. 37).

Judging that a difference exists by a judgment in step S67, the CPU 10202 instructs a base station apparatus that is a target of processing to perform a setting of the selection combining (SC) mode or the maximum ratio combining (MRC) mode (step S68, step S69). This setting processing itself is equal to that of a sequential change method (FIG. 38) mentioned above.

In an example mentioned above with reference to FIGS. 35 to 40, for convenience of explanation, a change procedure of the MRC connection mode is described for a local area. Accordingly, here, a case in which a connection mode is changed in a wide area will be described with reference to FIG. 41.

FIG. 41 is a figure illustrating a management table used for a management of an evaluation state and a setting state of a plurality of base station apparatuses which are management targets. A composition and an operation of a management table shown in FIG. 41 are equal to that of a management table (FIG. 34) in the first example. The management table is managed in the storage medium 10203 of the central apparatus 10201 under a control of the CPU 10202. The central apparatus 10201 learns a state of the each base station apparatus and performs a change control of a connection mode by using the management table (FIG. 41).

That is, an example shown in FIG. 41 assumes the state that is similar to a distribution state of mobile terminals in an actual service area and corresponds to an operation control state of fifteen base station apparatuses exemplified in FIG. 23 and FIG. 24 described above. The management table shown in FIG. 41 represents management information when realizing the operation control state shown in FIG. 24 from the operation control state shown in FIG. 23.

That is, in a "setting state" column shown in the management table (FIG. 41), actual operation states of the fifteen base station apparatuses at a time t1 is listed in FIG. 23. More specifically, with respect to the base station apparatuses (BS#2021, BS#2031, BS#2041, BS#2051, BS#2061, BS#2081 and BS#2091) which are selecting an MRC as shown in FIG. 23, information in a "setting state" column in the management table (FIG. 41) is "M" that means an MRC mode.

In contrast, base station apparatuses which are selecting an MRC at a time t2 are BS#2071, BS#2081, BS#2101, BS#2111, BS#2131 and BS#2141 as shown in FIG. 24.

Accordingly, the central apparatus 10201 is needed to perform a change of a plurality of base station apparatuses in a period from the time t1 to the time t2.

More specifically, in order to realize the operation control state shown in FIG. 24, first, for example, at the time t1, the fifteen base station apparatuses judge whether or not the MRC setting request is required by a change request process (FIGS. 27 to 29) mentioned above. The central apparatus 10201 can collect a judgment result of whether or not the MRC setting request is required from the fifteen base station apparatuses by a procedure mentioned above with reference to FIG. 36 and FIG. 39. The collected result is registered in an "evaluation state" column shown in FIG. 41.

Accordingly, in this case, it is necessary to change an operation setting of a target base station apparatus according to information in a "setting state" column and information in an "evaluation state" column of the management table (FIG. 41). That is, if there is a difference between information in a "setting state" column and information in an "evaluation state" column in the management table (FIG. 41) with respect to a base station apparatus, an operation setting of the base station apparatus has to be changed.

As mentioned above in a description of a management table shown in FIG. 34, a "reservation mode" is a column for a management flag that represents a difference between information in a "setting state" column and information in "the evaluation state" column. Therefore, in FIG. 41, for example, with respect to the base station apparatus 2011, because information in a "setting state" column is equal to information in an "evaluation state" column, information in a "reservation mode" column is reset to "-". In contrast, for example, with respect to the base station apparatus 2021, information in a "setting state" column is "M" indicating a maximum ratio combining. However, information in an "evaluation state" column is "S" indicating the selection combining. For this reason, since a mode of the base station apparatus 2021 has to be changed to the selection combining mode, therefore, a "reservation mode" column is set to "S". That is, in the management table shown in FIG. 41, the central apparatus 10201 has to perform a change request process of an operation setting with respect to a base station apparatus of which information set in a "reservation mode" column is "S" or "M" within a time between t1 and t2. As a result, at the time t2, a distribution state shown in FIG. 24 can be realized with respect to base station apparatuses (BS#2071, BS#2081, BS#2101, BS#2111, BS#2131 and BS#2141) which are selecting an MRC mode.

A THIRD EXAMPLE

A Method of which a Change is Performed by a Base Station Apparatus Itself

Next, a method of which a change of a connection mode is performed by a base station apparatus itself will be described.

FIG. 42 is a figure illustrating a management table that is self-managed by a base station apparatus in a third example. In this example, the base station apparatus 10000 described with reference to FIG. 25 has a management table outlined in FIG. 42 in the storage medium 10004. A composition and an operation of the management table (FIG. 42) are equal to these of management table (FIG. 34) mentioned above with the exception that a target base station apparatus is only an own base station apparatus.

That is, in this example, the base station apparatus 10000 (CPU 10003) performs a change request process mentioned above (FIGS. 27 to 29). By referring to the management table (FIG. 42) stored in the storage medium 10004, the base station apparatus 10000 manages an own evaluation state. The base station apparatus 10000 itself changes own operation setting according to information in a "setting state" column and information in an "evaluation state" column in the management table (FIG. 42).

Figure 43:
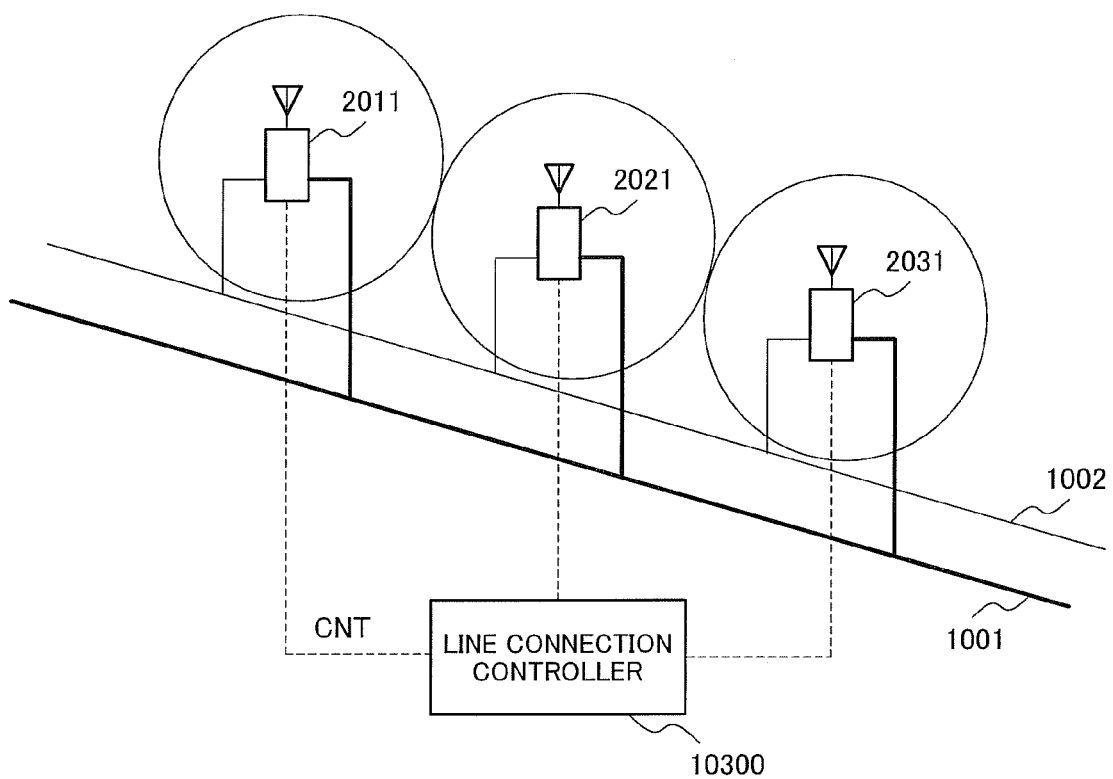
FIG. 43 is a figure illustrating a configuration of a mobile communications system in a third example.

FIG. 43 is a figure illustrating a configuration of a mobile communications system in the third example. In this example, the base station apparatuses 2011, 2021 and 2031 (BS#1, BS#2, and BS#3) are connected to the high speed line 1001 and the low speed line 1002 mentioned above. In this example, the high speed line 1001 is used for the MRC connection mode. The low speed line 1002 is used for the SC connection mode. The base station apparatuses are connected with a line connection controller 10300 via a control line which corresponds to the control line 10005 shown in FIG. 25.

When a base station apparatus that is managed by a line connection controller 10300 determines that a change of a connection mode is necessary (that is, in case of that a setting of a reservation mode is performed), the line connection controller 10300 instructs the base station apparatus to perform the setting change. Each base station apparatus requests the line connection controller 10300 to perform an establishment of a connection mode with the high speed line 1001 and the low speed line 1002 or a change of an established connection mode.

Figure 44:
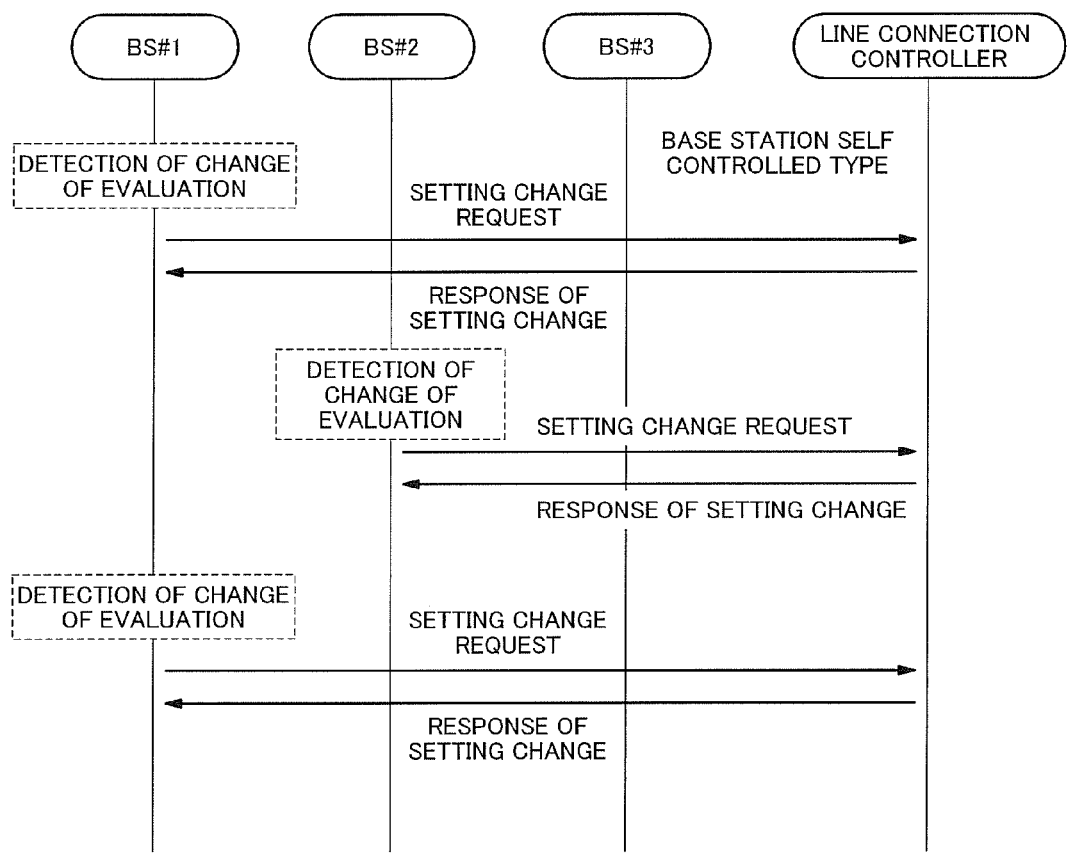
FIG. 44 is a figure showing a flow of information transmitted and received between a line connection controller and the base station apparatus in a third example.
Figure 45:
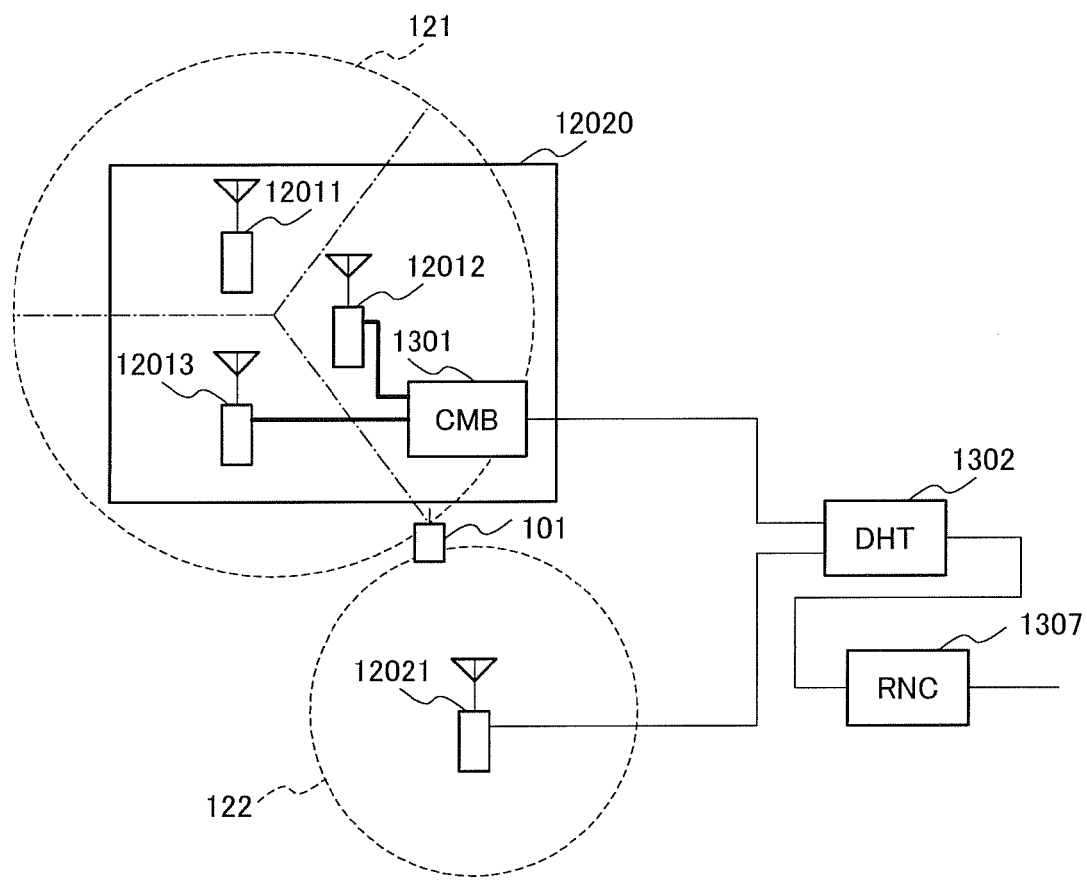
FIG. 45 is a figure exemplarily illustrating a situation in which various types of base station apparatus are connected in a related mobile communications system and also illustrating a processing procedure of a received signal.

FIG. 44 is a figure showing a flow of information transmitted and received between a line connection controller and a base station apparatus in the third example.

In FIG. 44, the base station apparatuses BS#1, BS#2 and BS#3 calculate an evaluation value in a coverage area of their own apparatus by themselves, respectively and also determine whether or not a change of a connection mode is necessary (whether an MRC setting is needed or not). Each of base station apparatuses stores the evaluation value and the determination result in a management table (FIG. 42) in the storage medium 10004.

When information in a "setting state" column and information in an "evaluation state" column in a management table are not identical, for example, the base station apparatus (BS#1) transmits a change request of a connection mode to the line connection controller 10300.

In response to a receipt of a change request, the line connection controller 10300 judges whether or not a communication line to be used by the base station apparatus is available. Moreover, the line connection controller 10300 confirms that a capacity of a communication line to be used does not reach a limit. The line connection controller 10300 performs processing corresponding to a content requested from the base station apparatus (BS#1) based on these results of judgment and also transmits a processing result to the base station apparatus.

In the example, a series of operations mentioned above are performed in each of the base station apparatuses. As a result, each of the base station apparatuses can change a connection mode by itself.

Thus, according to the exemplary embodiment mentioned above and the mobile communications system according to its example, when a wireless signal transmitted from one mobile terminal is received by a plurality of base station apparatuses, information corresponding to the wireless signal can be accurately combined by selecting a most suitable combining point, that is a maximum ratio combining point or a selection combining point, according to an external factors and/or a change of a distribution state of a mobile terminal under communication that exists in a service area covered by a base station apparatus with which the mobile terminal communicates.

Accordingly, because a reception gain of a signal that is sent to a base station apparatus from a mobile terminal is improved, as a result, a transmission power from a mobile terminal can be reduced. That is, according to the exemplary embodiment, an increase of a capacity of a line can be realized.

According to the exemplary embodiment, a connection relationship in which a plurality of base station apparatuses, the maximum ratio combining point (MRC-P) and the selection combining (SC-P) are connected with each other via the high speed line 1001 can be dynamically changed. Therefore, a number of definition for network-related apparatuses which changes according to a regional traffic condition or an existence condition of an obstacle to a radio wave (for example, a structure, a long time stop of a vehicle or the like) can be reduced.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

Further, it is the inventor's intention to retain all equivalents of the claimed invention even if the claims are amended during prosecution.

What is claimed is:

1. A mobile communications system, comprising:
a plurality of base station apparatuses which are located at geographically dispersed locations and perform a wireless communication with a mobile device;
a maximum ratio combining unit which is connectable with said plurality of base station apparatuses for a communication via a first communication line and performs maximum ratio combining processing based on information corresponding to a received signal from said mobile device, said information being transmitted from said plurality of base station apparatuses;
a selection combining unit which is connectable with said plurality of base station apparatuses for a communication via a second communication line and performs selection combining processing based on information corresponding to a received signal from said mobile device, said information being transmitted from said plurality of base station apparatuses; and
a selection unit which selects one or both of said maximum ratio combining unit and said selection combining unit according to at least one of an external factor and a change of a distribution state of a mobile device under communication that exists in a coverage area of said plurality of base station apparatuses with which said mobile device performs a wireless communication, when signal combining is performed based on said information corresponding to said received signal from said mobile device, said information being transmitted from said plurality of base station apparatuses, in response to reception of a wireless signal by said plurality of base station apparatuses, said wireless signal being transmitted from one mobile device,
wherein said plurality of base station apparatuses request said selection unit to change a destination of said information corresponding to said received signal from said mobile device to either said maximum ratio combining unit or said selection combining unit according to said change of said distribution state of said mobile device under communication.

2. The mobile communications system according to claim 1, wherein
said plurality of base station apparatuses determine said change of said distribution state of said mobile device under communication based on an amount of electric power of an up link in a wireless section between said mobile device and said plurality of base station apparatuses.

3. The mobile communications system according to claim 1, wherein
said plurality of base station apparatuses determine said change of said distribution state of said mobile device under communication based on a rate about an up link in said plurality of base station apparatuses.

4. The mobile communications system according to claim 1, wherein
said plurality of base station apparatuses determine said change of said distribution state of said mobile device under communication based on the number of said mobile devices under communication that exist in said coverage area of said plurality of base station apparatuses.

5. The mobile communications system according to claim 1, wherein
when transmitting said information corresponding to said received signal from said mobile device, said plurality of base station apparatuses transmit said information either in a form for a transmission to said maximum ratio combining unit or in a form for a transmission to said selection combining unit.

6. The mobile communications system according to claim 1, wherein
when transmitting said information corresponding to said received signal from said mobile device, said plurality of base station apparatuses can dynamically switch between a form for a transmission to said maximum ratio combining unit and a form for a transmission to said selection combining unit.

7. The mobile communications system according to claim 6, wherein
when said plurality of base station apparatuses changes said form for a transmission to said selection combining unit into said form for a transmission to said maximum ratio combining unit upon transmitting said information corresponding to said received signal from said mobile device, said plurality of base station apparatuses continues to transmit said information to said selection combining unit via said second communication line, starts to transmit said information to said maximum ratio combining unit via said first communication line and stops transmitting said information to said selection combining unit when said maximum ratio combining unit can perform said maximum ratio combining processing to said information.

8. The mobile communications system according to claim 6, wherein
when said plurality of base station apparatuses changes said form for a transmission to said maximum ratio combining unit into said form for a transmission to said selection combining unit upon transmitting said information corresponding to said received signal from said mobile device, said plurality of base station apparatuses continues to transmit said information to said maximum ratio combining unit via said first communication line, starts to transmit said information to said selection combining unit via said second communication line and stops transmitting said information to said maximum ratio combining unit when said selection combining unit can perform said selection combining processing to said information.

9. The mobile communications system according to claim 1, wherein
said selection unit including:
a man-machine interface by which an operator can select whether or not to perform a change according to a change request from said plurality of base station apparatuses; and
a base station apparatus control apparatus which selects at least one of said maximum ratio combining unit and said selection combining unit by considering a result of change by said man-machine interface.

10. The mobile communications system according to claim 1, wherein
said selection unit including:
an external apparatus which judges whether or not to perform a change according to a change request from said plurality of base station apparatuses; and
a base station apparatus control apparatus which selects at least one of said maximum ratio combining unit and said selection combining unit by considering a result of a change judgment by said external apparatus.

11. The mobile communications system according to claim 10, wherein
when judging whether or not to perform said change, said external apparatus judges at least one of whether or not said change is required and an order of priority of said change with respect to said plurality of base station apparatuses according to said external factor or an evaluation value about said distribution state of said mobile device under communication.

12. The mobile communications system according to claim 1, wherein
said selection unit including:
said plurality of base station apparatuses which judge whether or not said change request is made and also judge whether or not to perform said change according to a result of said judgment therein; and
a base station apparatus control apparatus which selects at least one of said maximum ratio combining unit and said selection combining unit by considering a result of said change judgment by said plurality of base station apparatuses.

13. The mobile communications system according to claim 1, wherein
a communication rate of said first communication line is at least equal to a communication rate of a code information transmitted in a wireless section between said mobile terminal and said plurality of base station apparatus.

14. The mobile communications system according to claim 1, wherein
said external factor is at least one of a difference in a time zone, a difference in a days of the week and whether an event is held or not.

15. A base station apparatus which performs a wireless communication with a mobile device, comprising:
a communication control module which transmits information by establishing a communication link with at least one of a first communication line used for a communication with a maximum ratio combining unit that performs maximum ratio combining processing and a second communication line used for a communication with a selection combining unit that performs selection combining processing based on information corresponding to a received signal from said mobile device; and
a request module which requests an external apparatus to change a destination of said information corresponding to said received signal from said mobile device to either said maximum ratio combining unit or said selection combining unit according to a change of a distribution state of said mobile device under communication.

16. The base station apparatus according to claim 15, wherein
said change of said distribution state of said mobile device under communication is determined based on an amount of electric power of an up link in a wireless section between said mobile terminal and said base station apparatus.

17. The base station apparatus according to claim 15, wherein
said change of said distribution state of said mobile device under communication is determined based on a rate about an up link in said base station apparatus.

18. The base station apparatus according to claim 15, wherein
said change of said distribution state of said mobile device under communication is determined based on the number of mobile devices under communication that exist in a coverage area of said base station apparatus.

19. The base station apparatus according to claim 15, wherein
when transmitting said information corresponding to said received signal from said mobile device, said information is transmitted either in a form for a transmission to said maximum ratio combining unit or in a form for a transmission to said selection combining unit.

20. The base station apparatus according to claim 15, wherein
when transmitting said information corresponding to said received signal from said mobile device, a form for a transmission to said maximum ratio combining unit and a form for a transmission to said selection combining unit can be dynamically switched.

21. The base station apparatus according to claim 20, wherein
when said base station apparatus changes said form for a transmission to said selection combining unit into said form for a transmission to said maximum ratio combining unit upon transmitting said information corresponding to said received signal from said mobile device, said base station apparatus continues to transmit said information to said selection combining unit via said second communication line, starts to transmit said information to said maximum ratio combining unit via said first communication line and stops transmitting said information to said selection combining unit when said maximum ratio combining unit can perform said maximum ratio combining processing to said information.

22. The base station apparatus according to claim 20, wherein
when said base station apparatus changes said form for a transmission to said maximum ratio combining unit into said form for a transmission to said selection combining unit upon transmitting said information corresponding to said received signal from said mobile device, said base station apparatus continues to transmit said information to said maximum ratio combining unit via said first communication line, starts to transmit said information to said selection combining unit via said second communication line and stops transmitting said information to said maximum ratio combining unit when said selection combining unit can perform said selection combining processing to said information.

23. The base station apparatus according to claim 15, wherein
a communication rate of said first communication line is at least equal to a communication rate of a code information transmitted in a wireless section between said mobile terminal and said base station apparatus.

24. A mobile communications system, comprising:
a plurality of base station apparatuses which are located at geographically dispersed locations and perform a wireless communication with a mobile device;
a maximum ratio combining means which is connectable with said plurality of base station apparatuses for a communication via a first communication line and performs maximum ratio combining processing based on information corresponding to a received signal from said mobile device, said information being transmitted from said plurality of base station apparatuses;
a selection combining means which is connectable with said plurality of base station apparatuses for a communication via a second communication line and performs selection combining processing based on information corresponding to a received signal from said mobile device, said information being transmitted from said plurality of base station apparatuses; and
a selection means which selects one or both of said maximum ratio combining means and said selection combining means according to at least one of an external factor and a change of a distribution state of a mobile device under communication that exists in a coverage area of said plurality of base station apparatuses with which said mobile device performs a wireless communication, when signal combining is performed based on said information corresponding to said received signal from said mobile device, said information being transmitted from said plurality of base station apparatuses, in response to reception of a wireless signal by said plurality of base station apparatuses, said wireless signal being transmitted from one mobile device,
wherein said plurality of base station apparatuses request said selection means to change a destination of said information corresponding to said received signal from said mobile device to either said maximum ratio combining means or said selection combining means according to said change of said distribution state of said mobile device under communication.

25. A base station apparatus which performs a wireless communication with a mobile device, comprising:
a communication control means which transmits information by establishing a communication link with at least one of a first communication line used for a communication with a maximum ratio combining means that performs maximum ratio combining processing and a second communication line used for a communication with a selection combining means that performs selection combining processing based on information corresponding to a received signal from said mobile device; and
a request means which requests an external apparatus to change a destination of said information corresponding to said received signal from said mobile device to either said maximum ratio combining means or said selection combining means according to a change of a distribution state of said mobile device under communication.

26. A control method of a mobile communications system, comprising:
connecting, via a first communication line, a plurality of base station apparatuses which are located at geographically dispersed locations and perform a wireless communication with a mobile device with a maximum ratio combining unit that performs maximum ratio combining processing based on information corresponding to a received signal from said mobile device, said information being transmitted from said plurality of base station apparatuses;
connecting, via a second communication line, said plurality of base station apparatuses with a selection combining unit that performs selection combining processing based on information corresponding to a received signal from said mobile device, said information being transmitted from said plurality of base station apparatuses;
selecting one or both of said maximum ratio combining unit and said selection combining unit according to at least one of an external factor and a change of a distribution state of said mobile device under communication that exists in a coverage area of said plurality of base station apparatuses with which said mobile device performs a wireless communication when performing signal combining based on said information corresponding to said received signal from said mobile device, said information being transmitted from said plurality of base station apparatuses in response to reception of a wireless signal by said plurality of base station apparatuses, said wireless signal being transmitted from one mobile device; and
requesting, by said plurality of base station apparatuses, said selection unit to change a destination of said information corresponding to said received signal from said mobile device to either said maximum ratio combining unit or said selection combining unit according to said change of said distribution state of said mobile device under communication.

27. The control method according to claim 26, wherein
a line in which a communication can be performed at a communication rate that is at least equal to a communication rate of a code information transmitted in a wireless section between said mobile terminal and said plurality of base station apparatuses is used for said first communication line.

28. A non-transitory computer-readable recording medium having embodied thereon a computer program, which when executed by a computer, causes the computer to function as a base station apparatus which performs a wireless communication with a mobile device, said base station apparatus comprising:
a communication control module which transmits information by establishing a communication link with at least one of a first communication line used for a communication with a maximum ratio combining unit that performs maximum ratio combining processing and a second communication line used for a communication with a selection combining unit that performs selection combining processing based on information corresponding to a received signal from said mobile device; and
a request module which requests an external apparatus to change a destination of said information corresponding to said received signal from said mobile device to either said maximum ratio combining unit or said selection combining unit according to a change of a distribution state of said mobile device under communication.

* * * * *